United States Patent
Lee et al.

(10) Patent No.: US 12,022,555 B2
(45) Date of Patent: *Jun. 25, 2024

(54) ELECTRONIC DEVICE FOR DISPLAYING INDICATOR REGARDING NETWORK AND METHOD THEREOF

(71) Applicant: Samsung Electronics Co., Ltd., Gyeonggi-do (KR)

(72) Inventors: Soomin Lee, Gyeonggi-do (KR); Hansung Leem, Gyeonggi-do (KR); Hongju Park, Gyeonggi-do (KR); Jangbok Lee, Gyeonggi-do (KR); Hong Kim, Gyeonggi-do (KR); Kisung Park, Gyeonggi-do (KR); Jookwan Lee, Gyeonggi-do (KR); Wonsuk Chung, Gyeonggi-do (KR); Hyejeong Kim, Gyeonggi-do (KR); Sangho Lee, Gyeonggi-do (KR); Suyoung Park, Gyeonggi-do (KR); Sunmin Hwang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 124 days.

This patent is subject to a terminal disclaimer.

(21) Appl. No.: 17/526,702

(22) Filed: Nov. 15, 2021

(65) Prior Publication Data

US 2022/0078877 A1    Mar. 10, 2022

Related U.S. Application Data

(63) Continuation of application No. 16/521,033, filed on Jul. 24, 2019, now Pat. No. 11,191,124.

(30) Foreign Application Priority Data

| Jul. 24, 2018 | (KR) | .......................... 10-2018-0085916 |
| Apr. 4, 2019 | (KR) | .......................... 10-2019-0039757 |
| May 29, 2019 | (KR) | .......................... 10-2019-0063149 |

(51) Int. Cl.
*H04W 72/231* (2023.01)
*H04B 17/20* (2015.01)
(Continued)

(52) U.S. Cl.
CPC .......... *H04W 76/27* (2018.02); *H04B 17/252* (2023.05); *H04W 36/0069* (2018.08);
(Continued)

(58) Field of Classification Search
CPC ............. H04L 41/0266; H04L 51/043; H04W 72/231; H04W 36/0069; H04W 40/24; H04B 17/252
See application file for complete search history.

(56) References Cited

U.S. PATENT DOCUMENTS

| 8,199,719 B2 | 6/2012 | Taneja |
| 9,237,495 B2 | 1/2016 | Taneja |

(Continued)

FOREIGN PATENT DOCUMENTS

| CN | 104094566 | 10/2014 |
| CN | 104584463 | 4/2015 |

(Continued)

OTHER PUBLICATIONS

R2-1713443, "5G indicator for EN-DC", Nov. 27-Dec. 1, 2017, pp. 1-23 (Year: 2017).*

(Continued)

*Primary Examiner* — Salvador E Rivas
(74) *Attorney, Agent, or Firm* — The Farrell Law Firm, P.C.

(57) ABSTRACT

A portable communication device includes a touch screen display; first communication circuitry configured to support
(Continued)

a long term evolution (LTE) communication; second communication circuitry configured to support a new radio (NR) communication; a memory storing operator information indicating an operator of a mobile network and operator policy information; and at least one processor configured to receive, from an LTE base station corresponding to the mobile network via the first communication circuitry, a system information block (SIB) and a non-access stratum (NAS) message, determine, based on the SIB and the NAS message, whether dual connectivity of the LTE communication and the NR communication is available for the portable communication device, based on the operator information, the operator policy information and determining that the dual connectivity is available for the portable communication device, select an indicator from a first indicator and a second indicator, the first indicator indicating that the portable communication device is connected with the mobile network via the LTE communication, the second indicator indicating that the NR communication is available for the portable communication device to connect with the mobile network, and display the selected indicator via the touch screen display.

18 Claims, 39 Drawing Sheets

(51) Int. Cl.
| | |
|---|---|
| *H04W 36/00* | (2009.01) |
| *H04W 76/15* | (2018.01) |
| *H04W 76/27* | (2018.01) |
| *H04W 28/086* | (2023.01) |
| *H04W 40/24* | (2009.01) |
| *H04W 84/04* | (2009.01) |
| *H04W 88/06* | (2009.01) |

(52) U.S. Cl.
CPC ......... *H04W 72/231* (2023.01); *H04W 76/15* (2018.02); *H04W 28/0865* (2023.05); *H04W 40/24* (2013.01); *H04W 84/042* (2013.01); *H04W 88/06* (2013.01)

(56) References Cited

U.S. PATENT DOCUMENTS

| | | | |
|---|---|---|---|
| 9,332,480 | B2 | 5/2016 | Griot et al. |
| 9,414,274 | B2 | 8/2016 | Taneja |
| 9,497,685 | B2 | 11/2016 | Lee et al. |
| 9,532,376 | B2 | 12/2016 | Jha et al. |
| 9,572,091 | B2 | 2/2017 | Lee et al. |
| 9,622,130 | B2 | 4/2017 | Taneja |
| 9,699,825 | B2 | 7/2017 | Lee et al. |
| 9,801,225 | B2 | 10/2017 | Jha et al. |
| 9,838,917 | B2 | 12/2017 | Vikberg et al. |
| 9,867,069 | B2 | 1/2018 | Susitaival et al. |
| 10,009,911 | B2 | 6/2018 | Zaus |
| 10,015,805 | B2 | 7/2018 | Zhang et al. |
| 10,015,807 | B2 | 7/2018 | Heo et al. |
| 10,075,966 | B2 | 9/2018 | Zitzmann et al. |
| 10,116,685 | B2 | 10/2018 | Basu Mallick et al. |
| 10,136,447 | B2 | 11/2018 | Chatterjee et al. |
| 10,313,323 | B2 | 6/2019 | Forssell et al. |
| 10,321,389 | B2 | 6/2019 | Axmon et al. |
| 10,397,269 | B2 | 8/2019 | Basu Mallick et al. |
| 10,419,961 | B2 | 9/2019 | Lee et al. |
| 10,499,295 | B2 | 12/2019 | Susitaival et al. |
| 10,582,403 | B2 | 3/2020 | Kim et al. |
| 10,750,397 | B2 | 8/2020 | Lee et al. |
| 10,848,518 | B2 | 11/2020 | Basu Mallick et al. |
| 10,959,189 | B2 | 3/2021 | Blankenship et al. |
| 11,172,433 | B2 | 11/2021 | Liu et al. |
| 11,399,407 | B2* | 7/2022 | Lee ...................... H04W 76/27 |
| 2013/0201823 | A1 | 8/2013 | Gupta |
| 2013/0201824 | A1 | 8/2013 | Venkatachalam et al. |
| 2014/0256316 | A1 | 9/2014 | Lee et al. |
| 2015/0215167 | A1 | 7/2015 | Donovan |
| 2015/0282042 | A1 | 10/2015 | Griot et al. |
| 2015/0319801 | A1 | 11/2015 | Lee et al. |
| 2016/0095027 | A1 | 3/2016 | Taneja |
| 2016/0135220 | A1 | 5/2016 | Jha et al. |
| 2016/0255551 | A1 | 9/2016 | Susitaival et al. |
| 2016/0255593 | A1 | 9/2016 | Blankenship et al. |
| 2017/0055309 | A1 | 2/2017 | Jha et al. |
| 2017/0170941 | A1* | 6/2017 | Yang ..................... H04W 24/10 |
| 2017/0264606 | A1 | 9/2017 | Forssell et al. |
| 2017/0280379 | A1 | 9/2017 | Axmon et al. |
| 2018/0077614 | A1 | 3/2018 | Vikberg et al. |
| 2018/0092085 | A1 | 3/2018 | Shaheen et al. |
| 2018/0103402 | A1 | 4/2018 | Susutaival et al. |
| 2018/0146404 | A1* | 5/2018 | Zhang ................... H04W 48/12 |
| 2018/0199225 | A1 | 7/2018 | Kim et al. |
| 2018/0227960 | A1 | 8/2018 | Belghoul et al. |
| 2018/0332659 | A1 | 11/2018 | Hwang et al. |
| 2019/0053160 | A1 | 2/2019 | He |
| 2019/0069205 | A1 | 2/2019 | Lee |
| 2019/0268962 | A1* | 8/2019 | Wang ................... H04B 17/318 |
| 2019/0327667 | A1 | 10/2019 | Liu et al. |
| 2019/0357073 | A1 | 11/2019 | Lee et al. |
| 2020/0037387 | A1 | 1/2020 | Lee et al. |
| 2020/0053586 | A1 | 2/2020 | Kim et al. |
| 2020/0314961 | A1* | 10/2020 | Palat ..................... H04W 48/12 |

FOREIGN PATENT DOCUMENTS

| | | |
|---|---|---|
| CN | 104919735 | 9/2015 |
| CN | 105557051 | 5/2016 |
| CN | 106105143 | 11/2016 |
| CN | 106165466 | 11/2016 |
| CN | 106576242 | 4/2017 |
| CN | 106688280 | 5/2017 |
| CN | 107079512 | 8/2017 |
| CN | 107852634 | 3/2018 |
| CN | 108235828 | 6/2018 |
| KR | 10-2014-0030553 | 3/2014 |
| KR | 10-2014-0111435 | 9/2014 |
| KR | 10-2017-0022933 | 3/2017 |
| WO | WO 2015/171053 | 11/2015 |
| WO | WO 2016/130061 | 8/2016 |
| WO | WO 2018/068483 | 4/2018 |

OTHER PUBLICATIONS

C4-181081, "Condition correction for indicating DCNR to SGW/PGW", Jan. 22-26, 2018, pp. 1-23 (Year: 2018).*
U.S. Notice of Allowance dated Mar. 22, 2022 issued in counterpart U.S. Appl. No. 16/933,677, 10 pages.
R1-1713443, "5G indicator for EN-DC", Nov. 27-Dec. 1, 2017 (Year: 2017).
C4-181081, "Condition correction for indicating DCNR to SGW/PGW", Jan. 22-26, 2018 (Year: 2018).
R2-1705129, "Miscellaneous RRC corrections on mobility enhancement", May 15-19, 2017 (Year: 2017).
3rd Generation Partnership Project; Technical Specification Group Core Network and Terminals; Non-Access-Stratum (NAS) Protocol for Evolved Packet System (EPS); Stage 3 (Release 15), 3GPP TS 24.301 V15.3.0, Jun. 21, 2018.
Liaison Statement, "LS Reply to 3GPP SA2 on Status Icon Related to 5G", S2-180018, SA WG2 Meeting #S2-125, Jan. 22-26, 2018, Nov. 27-Dec. 1, 2017, 4 pages.
Ericsson, "5G Indicator for EN-DC", R2-1713443, 3GPP TSG-RAN WG2 #100, Nov. 27-Dec. 1, 2017, 23 pages.
Samsung, TF160, "Update of Default NAS Messages to Add ENDC IEs", R5-182425, 3GPP TSG RAN WG5#79, May 21-25, 2018, 8 pages.
Qualcomm Incorporated, "Introduction of NR Indication", R2-1713639, 3GPP TSG-RAN WG2 Meeting #100, Nov. 27-Dec. 1, 2017, 8 pages.

(56) References Cited

OTHER PUBLICATIONS

International Search Report dated Nov. 14, 2019 issued in counterpart application No. PCT/KR2019/009129, 12 pages.
European Search Report dated Jan. 8, 2020 issued in counterpart application No. 19188114.3-1214, 13 pages.
U.S. Office Action dated Aug. 19, 2020 issued in counterpart U.S. Appl. No. 16/933,677, 36 pages.
Ericsson, "Introducing 5G Indication in LTE RRC SIB", R2-1710512, 3GPP TSG-RAN WG2 #99bis, Oct. 9-13, 2017, 20 pages.
Chinese Office Action dated Apr. 23, 2021 issued in counterpart application No. 201910673700.X, 22 pages.
Yang Xu et al., "Deployment Mode Selection and Evolution Strategy of 5G Network", China Mobile Group Design Institute, Jun. 20, 2018, 9 pages.
Xiao Hu You et al., "5G Mobile Communication: The Development Trends and Its Emerging Key Techniques", www.scichina.com, May 20, 2014, 13 pages.
Chinese Office Action dated Sep. 23, 2021 issued in counterpart application No. 201910673700.X, 7 pages.
S3-173103, Third Generation Partnership Project (3GPP) Meeting Report for TSG SA WG3 (Security) Meeting: 89, Reno, US, Nov. 27, 2017 to Dec. 1, 2017, 149 pages.
Chinese Office Action dated Sep. 7, 2023 issued in counterpart application No. 202111493240.6, 13 pages.
EP Summons to Attend Oral Proceedings dated Jun. 19, 2023 issued in counterpart application No. 19188114.3-1216, 9 pages.
Korean Office Action dated Aug. 21, 2023 issued in counterpart application No. 10-2019-0063149, 15 pages.
Chinese Office Action dated Sep. 18, 2023 issued in counterpart application No. 202111491104.3, 12 pages.
Vietnamese Office Action dated Oct. 2, 2023 issued in counterpart application No. 1-2020-03338, 3 pages.
Chinese Office Action dated Mar. 22, 2024 issued in counterpart application No. 202111491104.3, 7 pages.
Indian Hearing Notice dated Jan. 24, 2024 issued in counterpart application No. 202017022382, 2 pages.

\* cited by examiner 461-1 461-3

5G  5G UWB

FIG. 4C

ELECTRONIC DEVICE FOR DISPLAYING INDICATOR REGARDING NETWORK AND METHOD THEREOF

CROSS-REFERENCE TO RELATED APPLICATION(S)

This application is a Continuation Application of, and claims priority under 35 U.S.C. § 120 to, U.S. patent application Ser. No. 16/521,033, filed in the U.S. Patent and Trademark Office on Jul. 24, 2019, and issued as U.S. Pat. No. 11,191,124 on Nov. 30, 2021, which is based on and claims priority under 35 U.S.C. § 119 to Korean Patent Application No. 10-2018-0085916, filed on Jul. 24, 2018, in the Korean Intellectual Property Office; Korean Patent Application No. 10-2019-0039757, filed on Apr. 4, 2019, in the Korean Intellectual Property Office; and Korean Patent Application No. 10-2019-0063149, filed on May 29, 2019, in the Korean Intellectual Property Office, the disclosures of which are incorporated by reference herein in their entireties.

BACKGROUND

1. Field

The present disclosure relates generally to an electronic device for displaying an indicator regarding a network and a method thereof.

2. Description of Related Art $3^{rd}$ generation partnership project (3GPP) describes the technology associated with a network connected such that an electronic device performs wireless communication. The network has developed from a $1^{st}$ generation (1G) network to a $2^{nd}$ generation (2G) network, to a $3^{rd}$ generation (3G) network, and to a $4^{th}$ generation (4G) network (or long term evolution (LTE)). Recently, the technology associated with a 5G network (or new radio (NR) network) is being developed.

The 5G network may include a network architecture model different from the 4G network. For example, because components included in a 5G core network may be classified not depending on the physical entity but depending on function, the 5G network may provide an electronic device with a plurality of network services. For example, the network services may be classified into enhanced mobile broadband (eMBB), ultra-reliable and low latency communication (URLLC), or massive machine type communication (mMTC) based on at least one of data transmission speed, latency, the number of electronic devices accessed to a network, access period, average data usage, or reliability.

The network architecture may include radio access network (RAN) and core network. The RAN may perform wireless communication with an electronic device, and the core network may manage at least one of the registration, authentication, mobility, or policy of the electronic device.

Because the 5G core network is capable of being connected to an electronic device via the 4G RAN as well as the 5G RAN, the electronic device may receive the network service from the 5G core network even through the electronic device is connected to the 4G RAN. Furthermore, the electronic device may be connected to the 4G RAN by the technology of dual connectivity (DC) and may simultaneously receive wireless data from the 5G RAN.

When the electronic device may receive the service from 5G network by means of the compatibility of the 5G core network or the DC technology even though the electronic device is connected to the 4G RAN, the electronic device may need to notify a user of the type of network that provides the service (e.g., the 4G network or the 5G network). Moreover, when the electronic device is connected to the 5G network, the electronic device may need to notify the user of the type of network service (e.g., eMBB, URLLC, or mMTC) provided by the 5G network.

Accordingly, a method in which an electronic device displays the type of network and/or network service(s) provided from a 5G network via a display is needed.

SUMMARY

The present disclosure has been made to address the above-mentioned problems and disadvantages, and to provide at least the advantages described below.

In accordance with an aspect of the present disclosure, an electronic device is provided comprising a touch screen display; a communication module comprising a long-term evolution (LTE) communication circuit and a new radio (NR) communication circuit; a communication processor configured to control the communication module; a memory; and an application processor The memory stores a plurality of operator information and the communication processor is configured to receive, via the LTE communication circuit from an LTE base station, a system information block (SIB) and a restrict DCNR bit, and provide the SIB and the restrict DCNR bit to the application processor. The application processor is configured to identify operator information among the plurality of operator information, and determine to display a LTE indicator or a 5th generation (5G) indicator, based on the identified operator information, the SIB, and the restrict DCNR bit, with the SIB indicates whether the LTE base station being available to an evolved terrestrial radio access network dual connectivity new radio, and with the restrict DCNR bit being included in an attach accept message received from the LTE base station.

In accordance with another aspect of the present disclosure, provided is a method of an electronic device, the method comprising receiving a system information block (SIB) and a restrict DCNR bit; identifying operator information among the plurality of operator information stored in the electronic device; and displaying a long-term evolution (LTE) indicator or a new radio (NR) indicator, based on the identified operator information, the SIB, and the restrict DCNR bit, with the SIB indicates whether the LTE base station being available to an evolved terrestrial radio access network dual connectivity new radio, and with the restrict DCNR bit being included in an attach accept message received from the LTE base station.

In accordance with a further aspect of the present disclosure, provided is a non-transitory computer-readable recording medium storing thereon instructions for, when executed by at least one processor, performing operations that comprise receiving a system information block (SIB) and a restrict DCNR bit, from a long-term evolution (LTE) base station; identifying operator information among a plurality of operator information; and displaying a LTE indicator or a new radio (NR) indicator, based on the identified operator information, the SIB, and the restrict DCNR bit, with the SIB indicates whether the LTE base station being available to an evolved terrestrial radio access network dual connectivity new radio, and with the restrict DCNR bit being included in an attach accept message received from the LTE base station.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4C illustrates an operation environment of an electronic device displaying an indicator, according to an embodiment;

DETAILED DESCRIPTION

Figure 1:
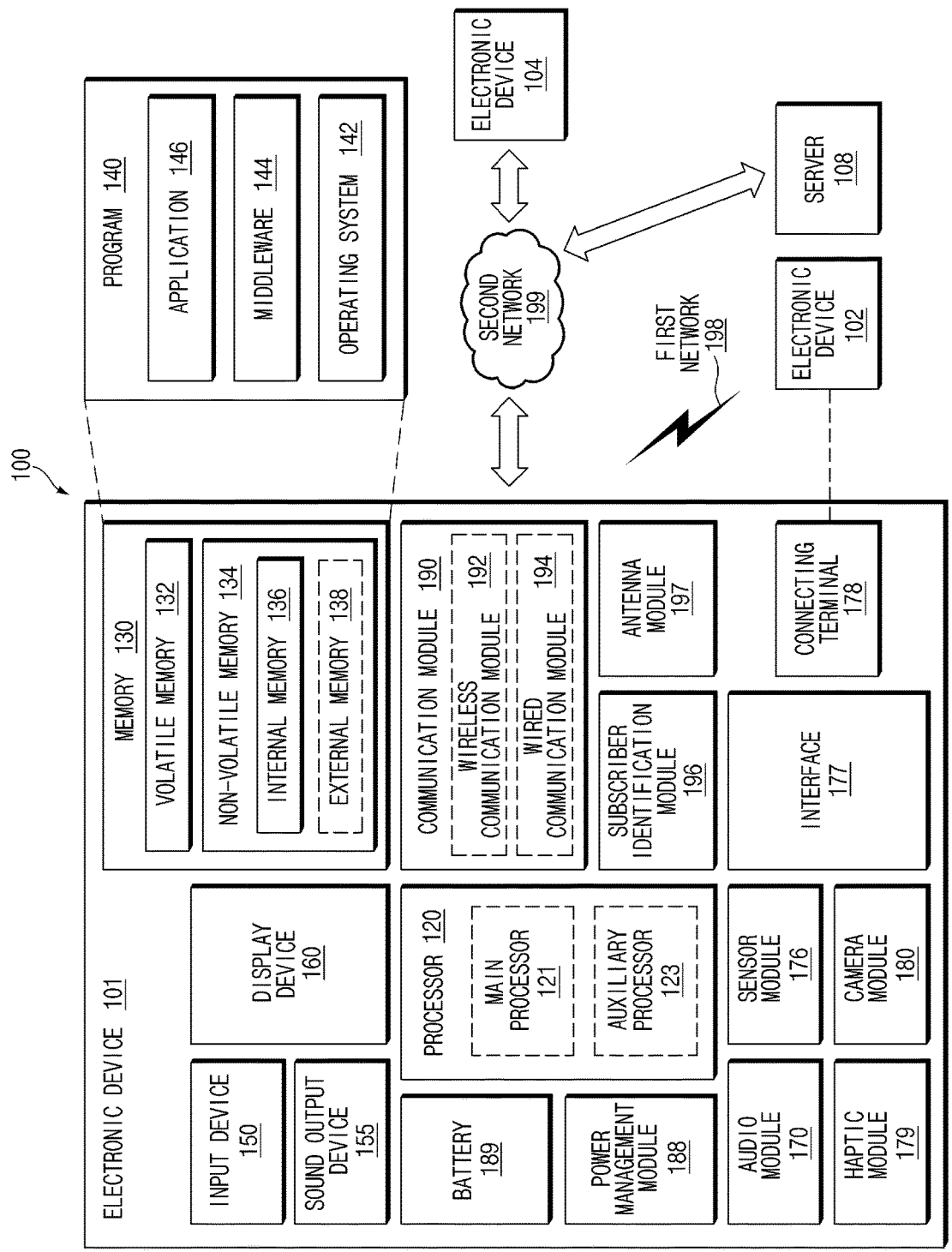
FIG. 1 illustrates a block diagram of an electronic device in a network environment according to various embodiments.

Various embodiments of the present disclosure are described with reference to the accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
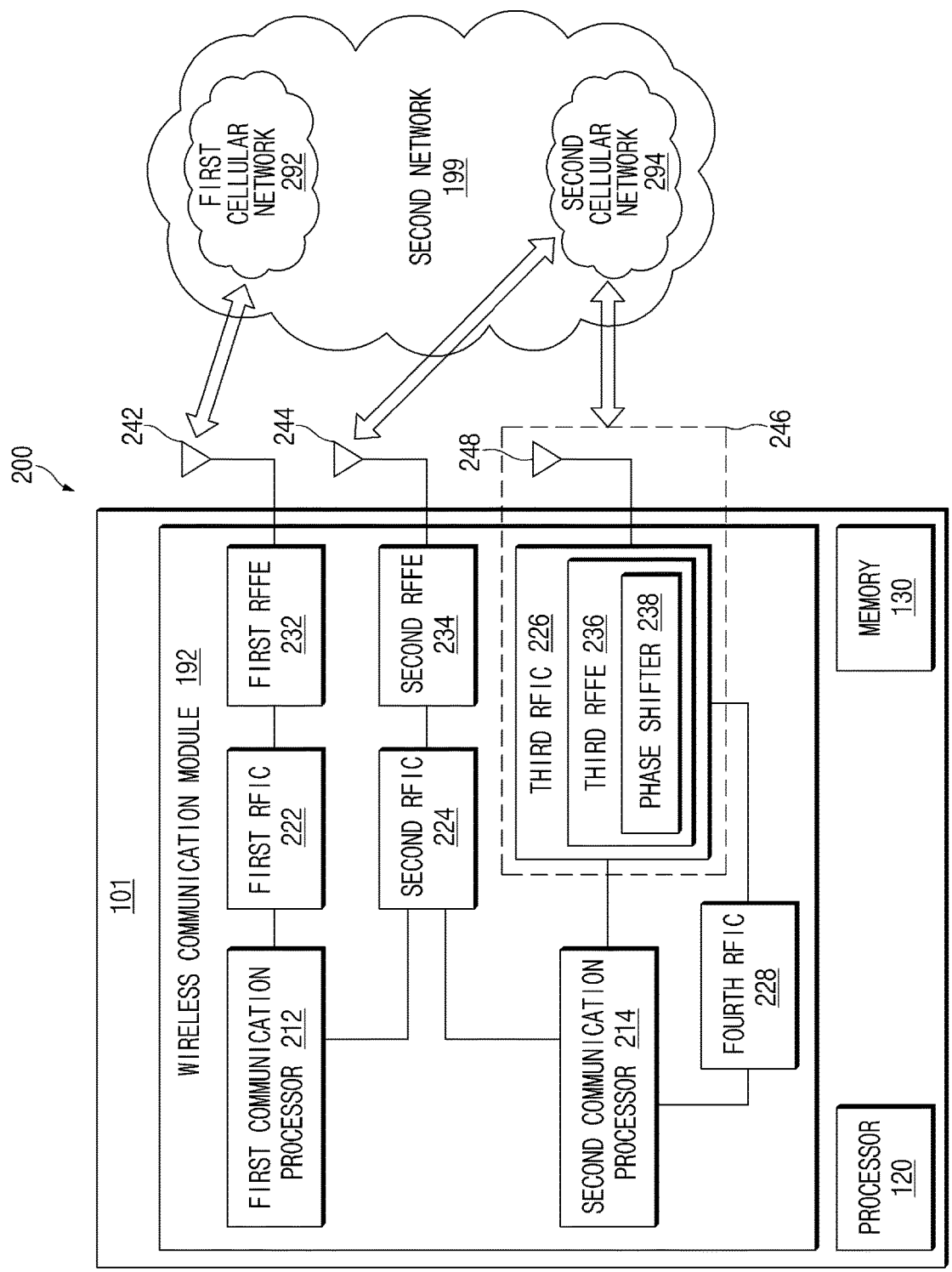
FIG. 2 is a block diagram of an electronic device for supporting legacy network communication and 5G network communication, according to an embodiment.

FIG. 2 is a block diagram 200 of the electronic device 101 for supporting legacy network communication and 5G network communication, according to an embodiment.

Referring to FIG. 2, the electronic device 101 may include a first communication processor 212, a second communication processor 214, a first RFIC 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include the processor 120 and the memory 130. The second network 199 may include a first cellular network 292 and a second cellular network 294. The electronic device 101 may further include at least one of the components described in FIG. 1, and the second network 199 may include at least one other network. The first CP 212, the second CP 214, the first RFIC 222, the second RFIC 224, the fourth RFIC 228, the first RFFE 232, and the second RFFE 234 may form at least part of the wireless communication module 192. The fourth RFIC 228 may be omitted or included as the part of the third RFIC 226.

The first CP 212 may support the establishment of a communication channel of a band (i.e., a frequency band) to be used for wireless communication with the first cellular network 292 and the legacy network communication through the established communication channel. The first cellular network 292 may be a legacy network including 2G, 3G, 4G, and/or an LTE network. The second CP 214 may support the establishment of a communication channel corresponding to a specified band (e.g., 6 GHz~60 GHz) among bands to be used for wireless communication with the second cellular network 294 and the 5G network communication via the established communication channel. The second cellular network 294 may be a 5G network defined in 3GPP. Additionally, the first CP 212 or the second CP 214 may support the establishment of a communication channel corresponding to another specified band (e.g., 6 GHz or less) among bands to be used for wireless communication with the second cellular network 294 and the 5G network communication via the established communication channel. The first CP 212 and the second CP 214 may be implemented within a single chip or a single package. The first CP 212 or the second CP 214 may be implemented within a single chip or a single package with the processor 120, the auxiliary processor 123 of FIG. 1, or the communication module 190 of FIG. 1.

At the time of transmission, the first RFIC 222 may convert a baseband signal generated by the first CP 212 to a radio frequency (RF) signal of about 700 MHz to about 3 GHz used for the first cellular network 292 (e.g., a legacy network). At the time of reception, the RF signal may be obtained from the first cellular network 292 (e.g., a legacy network) via an antenna (e.g., the first antenna module 242) and may be preprocessed via the first RFFE 232. The first RFIC 222 may convert the preprocessed RF signal to a baseband signal so as to be processed by the first CP 212.

At the time of transmission, the second RFIC 224 may convert a baseband signal generated by the first CP 212 or the second CP 214, to an RF signal (hereinafter referred to as a "5G Sub6 RF signal") of a Sub6 band (e.g., about 6 GHz or less) used for the second cellular network 294 (e.g., a 5G network). At the time of reception, the 5G Sub6 RF signal may be obtained from the second cellular network 294 (e.g., 5G network) via an antenna (e.g., the second antenna module 244) and may be preprocessed via RFFE (e.g., the second RFFE 234). The second RFIC 224 may convert the preprocessed 5G Sub6 RF signal to a baseband signal so as to be processed by a CP corresponding to some of the first CP 212 or the second CP 214.

At the time of transmission, the third RFIC 226 may convert a baseband signal generated by the second CP 214, to an RF signal (hereinafter referred to as a "5G Above6 RF signal") of a 5G Above6 band (e.g., 6 GHz~60 GHz) to be used for the second cellular network 294 (e.g., a 5G network). At the time of reception, the 5G Above6 RF signal may be obtained from the second cellular network 294 (e.g., a 5G network) via the antenna 248 and may be preprocessed via a third RFFE 236. For example, the third RFFE 236 may perform preprocessing of a signal, using a phase shifter 238. The third RFIC 226 may convert the preprocessed 5G Above6 RF signal to a baseband signal so as to be processed by the second CP 214. The third RFFE 236 may be formed as the part of the third RFIC 226.

The electronic device 101 may include the fourth RFIC 228 independent of the third RFIC 226 or as at least part thereof. In this case, the fourth RFIC 228 may convert the baseband signal generated by the second CP 214, to an RF signal (hereinafter referred to as an intermediate frequency (IF) signal) of an IF band (e.g., 9 GHz~11 GHz) and then may transmit the IF signal to the third RFIC 226. The third RFIC 226 may convert the IF signal to the 5G Above6 RF signal. At the time of reception, the 5G Above6 RF signal may be received from the second cellular network 294 (e.g., a 5G network) via the antenna 248 and may be converted to the IF signal by the third RFIC 226. The fourth RFIC 228 may convert the IF signal to the baseband signal such that the second CP 214 is capable of processing the baseband signal.

The first RFIC 222 and the second RFIC 224 may be implemented as at least part of a single chip or a single package, and the first RFFE 232 and the second RFFE 234 may be implemented as at least part of a single chip or a single package. At least one antenna module of the first antenna module 242 or the second antenna module 244 may be omitted or may be coupled to another antenna module and then may process RF signals of a plurality of corresponding bands.

The third RFIC 226 and the antenna 248 may be disposed on the same substrate to form a third antenna module 246. For example, the wireless communication module 192 or the processor 120 may be disposed on a first substrate (e.g., a main printed circuit board (PCB)). In this case, the third RFIC 226 may be disposed in a partial region (e.g., a bottom surface) of a second substrate (e.g., sub PCB) independent of the first substrate and the antenna 248 may be disposed in another partial region (e.g., an upper surface), and thus the third antenna module 246 may be formed.

The antenna 248 may include an antenna array capable of being used for beamforming. It is possible to reduce the length of the transmission line between the third RFIC 226 and the antenna 248 by positioning the third RFIC 226 and the antenna 248 on the same substrate. Accordingly, the signal of the high-frequency band (e.g., 6 GHz~60 GHz) used for 5G network communication may be prevented from being lost (e.g., attenuated) by the transmission line. For this reason, the electronic device 101 may improve the quality or speed of communication with the second cellular network 294 (e.g., a 5G network).

The second cellular network 294 (e.g., a 5G network) may be operated (e.g., stand-alone (SA)) independently of the first cellular network 292 (e.g., legacy network) or may be operated (e.g., non-stand alone (NSA)) while being connected to the first cellular network 292. For example, the 5G network may include only an access network (e.g., a 5G radio access network (RAN) or next generation RAN (NG RAN)) but may not include a core network (e.g., next generation core (NGC)). In this case, after the electronic device 101 accesses the access network of the 5G network, the electronic device 101 may access an external network (e.g., Internet) under the control of the core network (e.g., evolved packed core (EPC)) of the legacy network. Protocol information (e.g., LTE protocol information) for communication with the legacy network or protocol information (e.g., NR protocol information) for communication with the 5G network may be stored in the memory 130 and may be accessed by the processor 120, the first CP 212, or the second CP 214.

Figure 3:
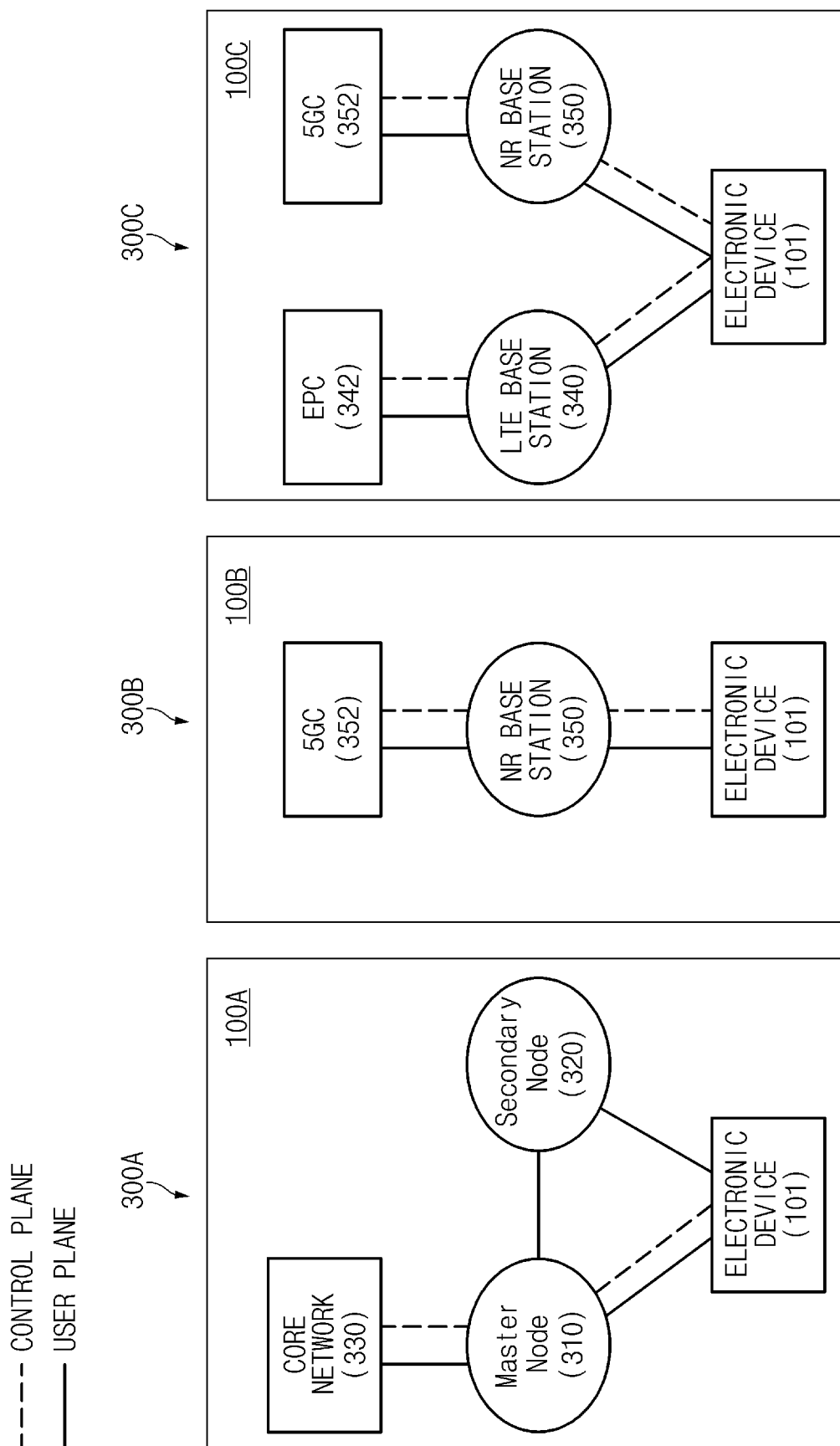
FIG. 3 illustrates wireless communication systems providing a network of legacy communication and/or 5G communication, according to an embodiment.

FIG. 3 illustrates wireless communication systems providing a network of legacy communication and/or 5G communication, according to an embodiment.

Referring to FIG. 3, network environments 100A, 100B, and 100C may include at least one of a legacy network and a 5G network. For example, the legacy network may include a 4G or LTE base station 340 (e.g., eNodeB (eNB)) of the 3GPP standard supporting wireless connection with the electronic device 101 and an EPC 342 managing 4G communication. For example, the 5G network may include an NR base station 350 (e.g., gNodeB (gNB)) supporting wireless access to the electronic device 101 and a 5th generation core (5GC) 352 (or NGC) managing the 5G communication of the electronic device 101. The electronic device 101 may transmit or receive a control message and user data via the legacy communication and/or the 5G communication. For example, the control message may include a message associated with at least one of security control, bearer setup, authentication, registration, or mobility management of the electronic device 101. The user data may mean user data other than the control message transmitted and received between the electronic device 101 and a core network 330 (e.g., the EPC 342).

The architecture indicating the combination of base stations (e.g., the LTE base station 340 or the NR base station 350 and the core network (e.g., EPC 342 or the 5GC 352)) connected to the electronic device 101 may be referred to as a deployment option or an option.

Referring to reference numeral 300A, the electronic device 101 may transmit or receive at least one of the control message or the user data to or from at least part (e.g., the NR base station 350 or the 5GC 352) of the 5G network, using at least part (e.g., the LTE base station 340 or the EPC 342) of the legacy network.

The network environment 100A may provide DC to the LTE base station 340 and the NR base station 350 and may include a network environment for transmitting and receiving the control message to or from the electronic device 101 via the single core network 330 of the EPC 342 or the 5GC 352. For example, the DC may include multi-radio access technology (multi-RAT) dual connectivity (MR-DC)) or EN-DC.

In the DC environment, one base station of the LTE base station 340 or the NR base station 350 may operate as a master node (MN) 310, and the other may operate as a secondary node (SN) 320. The MN 310 may be connected to the core network 330 and may transmit or receive the control message. The MN 310 and the SN 320 may be connected via a network interface and may transmit or receive a message associated with the management of wireless resources (e.g., communication channels) to or from each other.

The MN 310 may be composed of the LTE base station 340; the SN 320 may be composed of the NR base station 350; and the core network 330 may be composed of the EPC 342. For example, the electronic device 101 may transmit or receive the control message via the LTE base station 340 and the EPC 342 and may transmit or receive the user data via the LTE base station 340 and the NR base station 350.

The LTE base station 340 and the NR base station 350 may be connected to the EPC 342 in an NSA mode. When the LTE base station 340 operates as the MN 310, the control plane and the user plane of the LTE base station 340 may be connected to the EPC 342, and the user plane of the NR base station 350 may be connected to the EPC 342, via the LTE base station 340, or may be connected directly. Additionally or alternatively, the NR base station 350 and the LTE base station 340 may be connected to the 5GC 352 in an NSA mode. When the LTE base station 340 operates as the MN 310, the control plane and the user plane of the LTE base station 340 may be connected to the 5GC 352, and the user plane of the NR base station 350 may be connected to the 5GC 352, via the LTE base station 340, or may be connected directly.

Referring to reference numeral 300B, the 5G network may independently transmit or receive the control message and the user data to or from the electronic device 101.

Referring to reference numeral 300C, each of the legacy network and the 5G network may independently provide data transmission and reception. For example, the electronic device 101 and the EPC 342 may transmit or receive the control message and the user data via the LTE base station 340. Additionally or alternatively, the electronic device 101 and the 5GC 352 may transmit or receive the control message and the user data via the NR base station 350.

The electronic device 101 may be registered in at least one of the EPC 342 or the 5GC 352 and may transmit or receive the control message.

The EPC 342 or the 5GC 352 may interwork with each other and may manage the communication of the electronic device 101. For example, the movement information of the electronic device 101 may be transmitted or received via the interface between the EPC 342 and the 5GC 352.

Figure 4A:
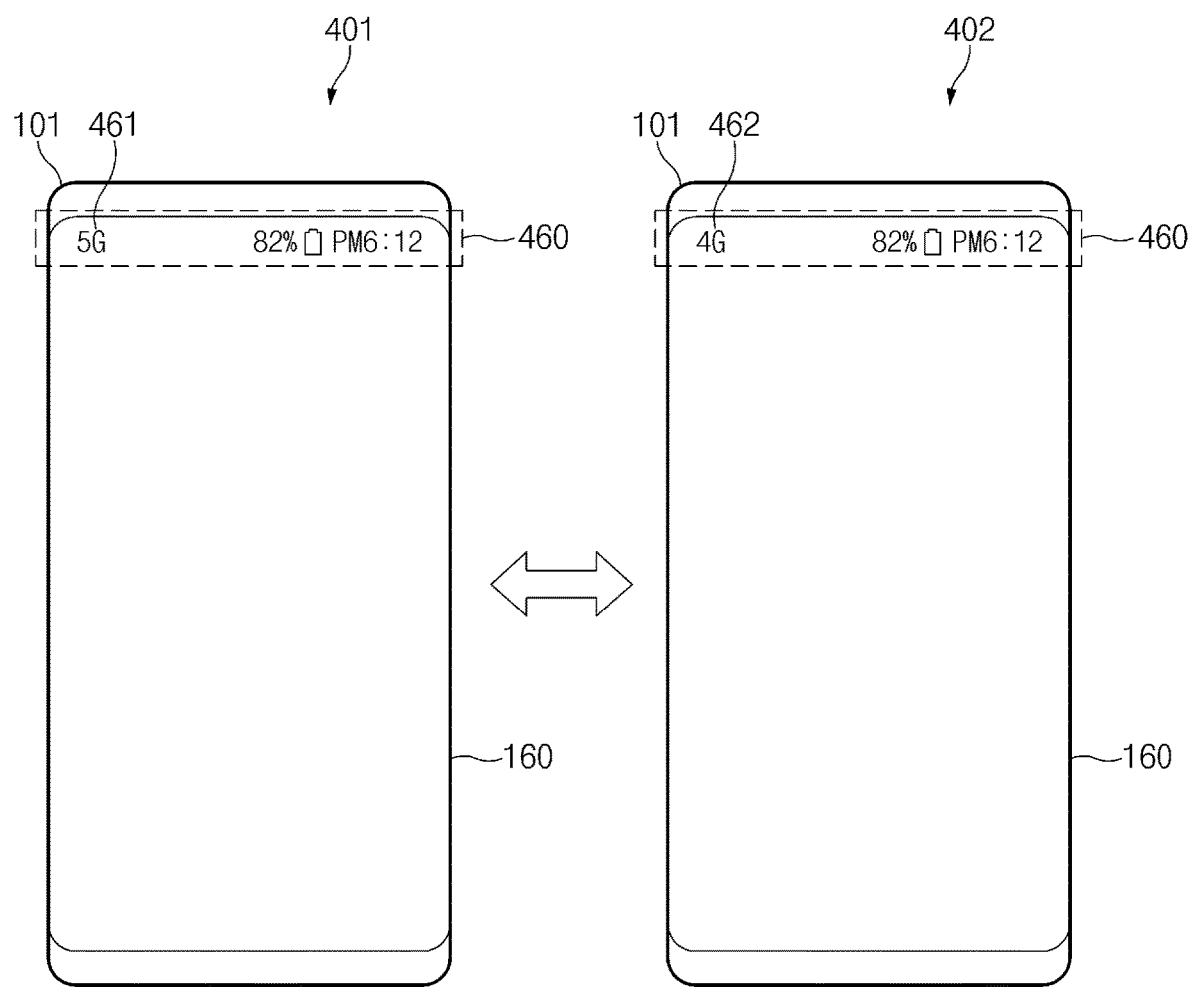
FIG. 4A illustrates an operation environment of an electronic device displaying an indicator, according to an embodiment.
Figure 4B:
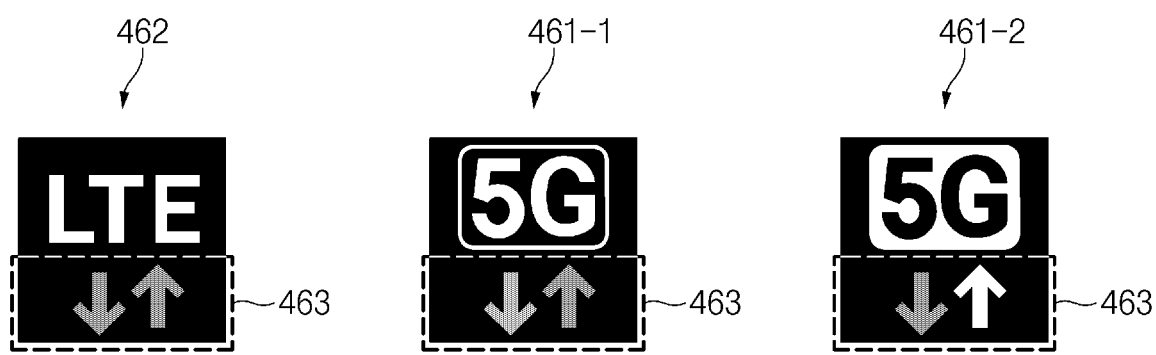
FIG. 4B illustrates an operation environment of an electronic device displaying an indicator, according to an embodiment.
Figure 4C:
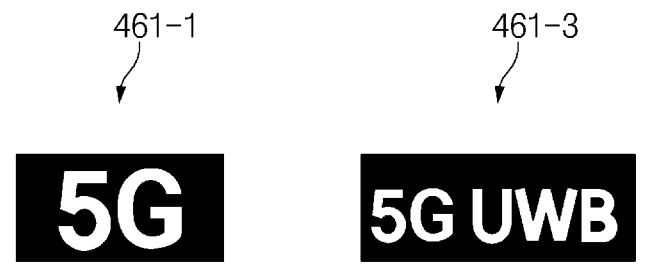

FIGS. 4A to 4C illustrate one or more operation environments of the electronic device 101 displaying an indicator, according to various embodiments.

Referring to FIG. 4A, the electronic device 101 may display a first indicator 461 or a second indicator 462 associated with the network accessed by the electronic device 101, on the partial region of the display device 160. For example, the electronic device 101 may display a status bar 460 indicating the state of the electronic device 101, on the partial region (e.g., the upper end) of the display device 160. For example, the state of the electronic device 101 may include at least one of the state (e.g., whether it is possible to make a call) of the network, the level of a battery, or time. The electronic device 101 may display the indicator associated with the network, on the partial region of the status bar 460. The electronic device 101 may display the indicator associated with the network in another region other than the status bar 460 in the form of an icon or a pop-up.

The indicator may indicate the type of core network accessed by the electronic device 101. The electronic device 101 may identify the accessed core network type to display an indicator indicating at least one of the legacy network (e.g., the 4G network) or the 5G network.

The indicator may indicate the type Radio Access Network (RAN) of the base station accessed by the electronic device 101. The electronic device 101 may identify the type (RAN) of the accessed base station and may display an indicator indicating at least one of the legacy network (e.g., 4G network) or the 5G network.

The indicator may indicate the availability of at least one of the legacy network (e.g., the 4G network) or the 5G network. For example, when at least one of the base station or the core network is capable of providing a 5G service to the electronic device 101, in operation 401, the electronic device 101 may display a first indicator 461 associated with the availability of the 5G network. FIG. 4A illustrates the first indicator 461 indicating "5G". However, the first indicator 461 may alternatively indicate "NR". The first indicator 461 may be in the transparent or non-shaded form, may have a specified color, or may be in the shaded state.

When the electronic device 101 receives a 4G service via at least one of the base station or the core network, in operation 402, the electronic device 101 may display a second indicator 462 associated with the availability of the 4G network. FIG. 4A illustrates the second indicator 462 indicating "4G". However, the second indicator 462 may indicate "LTE".

When there is no network to which the electronic device 101 is connected, the electronic device 101 may not display an indicator on the status bar 460.

The electronic device 101 may display an indicator based on the information received from the network. The information received from the network may include information defined by the 3GPP standard specification. In the disclosure, the information received from a network may be referred to as "network capability information". For example, the information received from the network may include information received via a non-access stratum (NAS) layer and information received via an access stratum (AS) layer.

The information received via the NAS layer may include a restrict DCNR bit, the RAT type in a UE capability inquiry message, or restrict RAT information. The information received via the NAS layer may include network information such as an access point name (APN) or public land mobile network (PLMN). The restrict DCNR bit may be included in an attach accept message received from the LTE base station 340. The restrict DCNR bit may indicate whether EN-DC is possible in the LTE base station 340. For example, when the restrict DCNR bit value is "1", it may indicate that the EN-DC is not possible. When the restrict DCNR bit value is "0", it may indicate that the EN-DC is possible. The UE capability inquiry message may be transmitted for the LTE base station 340 to inquiry the capability of the electronic device 101. When the RAT type included in the UE capability inquiry message includes evolved universal terrestrial radio access (EUTRA)-NR, it may indicate that EN-DC is possible in the LTE base station 340. When the RAT type included in the UE capability inquiry message includes NR, it may indicate that NR communication is possible in the corresponding base station. The restrict RAT information may indicate the type of RAT in which the connection of the electronic device 101 is restricted.

The information received via an AS layer may include information (e.g., upper layer indication) included in broadcast information, information (e.g., a measurement object (MO)) included in measurement setup information of a base station, history information (e.g., detected NR cell information) stored in the electronic device 101, or information (e.g., core network information or band information) included in setup information received from the LTE base station 340. The upper layer indication may be included in system information (e.g., system information block 2 (SIB2)) broadcast from the LTE base station 340. When the bit value of the upper layer indication is "1", it may indicate that EN-DC is possible in the LTE base station 340. When the bit value of the upper layer indication is "0", it may indicate that EN-DC is impossible in the LTE base station 340. The MO may be included in the measurement setup information received by the electronic device 101 from the LTE base station 340 or the NR base station 350 and may indicate frequency information that the electronic device 101 needs to measure. When information associated with the NR base station 350 is included in the MO received from the LTE base station 340, the electronic device 101 may determine that EN-DC is possible in the LTE base station 340. For example, the MO received from the LTE base station 340 may include information about resources (e.g., time or frequency) used when the electronic device 101 detects the NR base station 350. The detected NR cell information may indicate information about the detected NR cell through NR cell searching. The core network information may indicate information about the core network to which cell in which the electronic device 101 camps on is connected. The term "camp on a cell" may mean that a UE (e.g. the electronic device 101) has completed the cell selection/reselection process and has chosen a cell. The UE may monitor system information and paging information. The electronic device 101 may identify whether a specified condition is satisfied, based on the information (e.g., network capability information) received from the network; when the specified condition is satisfied, the electronic device 101 may display the first indicator 461. The specified condition for displaying the first indicator 461 may be referred to as a "first indicator displaying condition". For example, the first indicator displaying condition may be designated by at least one of an operator's policy, information (e.g., factory setting) stored in the electronic device 101, the operation mode of the electronic device 101, information stored in at least part of the subscriber identity module (SIM) 196 card installed in the electronic device 101, or user settings.

The electronic device 101 may display an indicator based on network availability. The network availability may be determined based on the structure (or deployment option or option) of the network architecture. For example, the electronic device 101 may display an indicator corresponding to the type (e.g., the LTE base station 340 or the NR base station 350) of the base station, to which the electronic device 101 is connected, or the type (e.g., the EPC 342 or the 5GC 352) of core network. Additionally or alternatively, the electronic device 101 may display the indicator corresponding to the type (e.g., an LTE cell or an NR cell) of the cell to which the electronic device 101 is connected. In this case, the network capability information may include at least one of information indicating the network type of the core network, cell barred information, or information indicating whether the DC of a serving cell (or neighboring cell) is available.

Even though the MN of the electronic device 101 is the LTE base station 340 when the electronic device 101 supports the DC mode for the NR, the electronic device 101 may display the first indicator 461 when at least one of the three specified conditions described below is satisfied.

1) A case where an NR cell is detected (hereinafter, the first condition)
2) A case where the NR cell is used for the SN (hereinafter, the second condition)
3) A case where a cell (i.e., an LTE cell) at which the electronic device 101 is positioned is capable of EN-DC (hereinafter, the third condition)

When one condition of the first condition, the second condition, and the third condition is satisfied, or when at least two or more conditions are satisfied, the electronic device 101 may display the first indicator 461. The electronic device 101 may receive information indicating that "one or more of the first condition, the second condition, or the third condition should be used", via the LTE base station 340 or the NR base station 350. The electronic device 101 may store the information indicating that "one or more of the first condition, the second condition, or the third condition should be used", in a SIM card.

The information indicating that "one or more of the first condition, the second condition, or the third condition should be used", may be stored in the memory 130 of the electronic device 101. At least a piece or pieces of information indicating that "one or more of the first condition, the second condition, or the third condition should be used", may be stored in the electronic device 101 or the SIM card, and the electronic device 101 may select at least one of the first condition, the second condition, and the third condition, based on at least a piece or pieces of information associated with the LTE base station 340 to which the electronic device 101 is connected. At least a piece or pieces of information indicating that "one or more of the first condition, the second condition, or the third condition should be used", may be stored in the electronic device 101 or the SIM card, and the electronic device 101 may select at least one of the first condition, the second condition, and the third condition, based on at least a piece or pieces of information associated with the NR base station 350 to which the electronic device 101 is connected.

In the procedure of performing the determination for displaying at least one of the first indicator 461 or the second indicator 462 under the first to third conditions, the electronic device 101 may identify whether the type of network of a base station is the same as the type of network of a core network connected to the base station (hereinafter the fourth condition). For example, the electronic device 101 may receive the first system information block (e.g., SIB1) and the second system information block (e.g., SIB2) from the base station (e.g., the LTE base station 340). The information (e.g., PLMN) included in the first system information may indicate the type of core network of a cell broadcasting the first system information. The information (e.g., upper layer indication) included in the second system information may indicate whether a cell broadcasting the second system information is capable of EN-DC. The information included in the first system information may indicate that the cell is connected to the EPC 342, and the electronic device 101 may display the first indicator 461 when the information included in the second system indicates that EN-DC is possible. The electronic device 101 may display the first indicator 461 based on the fourth condition and at least one of the first condition, the second condition, or the third condition and may display the first indicator 461 based on only the fourth condition.

Referring to FIG. 4B, the electronic device 101 may display the first indicator 461 associated with the availability of the 5G network in a different manner from that of FIG. 4A, based on the state of the connection to the base station to which the electronic device 101 is connected.

For example, the electronic device 101 may display the second indicator 462, before the electronic device 101 is connected to the 4G base station capable of connecting to the 5G base station (e.g., the case where the LTE cell is found), before the electronic device 101 finds the connectable 5G base station, or before the first indicator displaying condition is satisfied.

Additionally or alternatively, when the first indicator displaying condition is satisfied, when the electronic device 101 is connected to the 4G base station capable of connecting to the 5G base station, or when the electronic device 101 finds the connectable 5G base station, the electronic device 101 may display a first indicator 461-1 indicating "NR" (or "5G") in a transparent (or non-shaded) form.

Additionally or alternatively, when the first indicator displaying condition is satisfied, when the electronic device 101 camps on the 5G base station, or when the electronic device 101 exchanges data with the 5G base station, the electronic device 101 may display a first indicator 461-1, in which an icon including "NR" (or "5G") having a specified color or in which shading is processed. The first indicator 461-1, in which an icon including 'NR' (or '5G') having a specified color or in which shading is processed may be referred to as a "third indicator 461-2".

The first indicator 461-1, the second indicator 462, and the third indicator 461-2 may further include a fourth indicator 463 indicating a plurality of arrows to indicate whether the electronic device 101 exchanges data with the 5G base station. In this case, when the electronic device 101 exchanges data with the 5G base station, the electronic device 101 may control a part of a plurality of arrows included in the fourth indicator 463 to have a color or to be shaded.

FIG. 4B illustrates embodiments of using three indicators 461-1, 461-2, and 462. However, the electronic device 101 may use only two indicators. For example, as illustrated in FIG. 4A, the electronic device 101 may use the first indicator 461-1 and the second indicator 462. Additionally or alternatively, the electronic device 101 may use the second indicator 462 and the third indicator 461-2. In this case, only when the electronic device 101 exchanges data with the 5G base station, the electronic device 101 may display the third indicator 461-2; otherwise, the electronic device 101 may display the second indicator 462.

FIG. 4C illustrates another operation environment of the electronic device 101 displaying an indicator, according to an embodiment.

Referring to FIG. 4C, the electronic device 101 may display the first indicator 461-1 associated with the availability of the 5G network, based on the operating frequency of the base station to which the electronic device 101 is connected. For example, when the electronic device 101 is connected to the 4G base station connectable to the 5G base station operating in the frequency band of 6 GHz or less, when the electronic device 101 finds the connectable 5G base station operating in the frequency band of 6 GHz or less, then when the electronic device 101 camps on the 5G base station operating in the frequency band of 6 GHz or less, when the electronic device 101 exchanges data with the 5G base station operating in the frequency band of 6 GHz or less, or when the 5G base station satisfying the first indicator displaying condition operates in the frequency band of 6 GHz or less, the electronic device 101 may display the first indicator 461-1 indicating only "NR" (or "5G"), or may display a first indicator further including at least one of "16", or "below 6" at the location (e.g., right) adjacent to an icon indicating "NR" (or "5G").

Additionally or alternatively, when the electronic device 101 is connected to the 4G base station connectable to the 5G base station operating in the frequency band of 6 GHz or more, when the electronic device 101 finds the connectable 5G base station operating in the frequency band of 6 GHz or more, when the electronic device 101 camps on the 5G base station operating in the frequency band of 6 GHz or more, when the electronic device 101 exchanges data with the 5G base station operating in the frequency band of 6 GHz or more, or when the 5G base station satisfying the first indicator displaying condition operates in the frequency band of 6 GHz or more, the electronic device 101 may display the first indicator 461-1 further including at least one of "UWB" (i.e., ultrawideband), "+", "↑6", or "above 6" at the location adjacent to an icon indicating the "NR" (or "5G"). In this case, the first indicator 461-1 displayed when the frequency at which the 5G base station operates is not less than 6 GHz and may be referred to as a fifth indicator 461-3.

The electronic device 101 may display at least two or more of the first indicator 461-1, the second indicator 462, and the fifth indicator 461-3 at the same time. For example, when the electronic device 101 exchanges data with the 5G base station in the frequency band of 6 GHz or more in a state where first indicator displaying condition is satisfied, the electronic device 101 may display the first indicator 461-1 and the fifth indicator 461-3 together. In this case, the electronic device 101 may display the fifth indicator 461-3 at the location adjacent to the first indicator 461-1. Additionally or alternatively, the electronic device 101 may display the second indicator 462 and the fifth indicator 461-3 together. In this case, the electronic device 101 may display the fifth indicator 461-3 at the location adjacent to the second indicator 462.

The electronic device 101 may display at least one of the first indicator 461-1, the second indicator 462, the third indicator 461-2, and the fifth indicator 461-3, based on both the operating frequency and the connection state. For example, when the electronic device 101 is connected to the 4G base station connectable to the 5G base station operating in the frequency band of 6 GHz or more, when the electronic device 101 finds the connectable 5G base station operating in the frequency band of 6 GHz or more, or when the operating frequency of the 5G base station satisfying the first indicator displaying condition is not less than 6 GHz or more, the electronic device 101 may display the first indicator 461-1 or the fifth indicator 461-3, or may display the first indicator 461-1 and the fifth indicator 461-3 together.

Additionally or alternatively, when the first indicator displaying condition is satisfied, when the electronic device 101 camps on the 5G base station operating in the frequency band of 6 GHz or more, or when the electronic device 101 exchanges data with the 5G base station operating in the frequency band of 6 GHz or more, the electronic device 101 may display the third indicator 461-2 or the fifth indicator 461-3, or may display the third indicator 461-2 and the fifth indicator 461-3 together.

The electronic device 101 may display the first indicator 461-1 and the second indicator 462 at the same time.

Figure 5A:
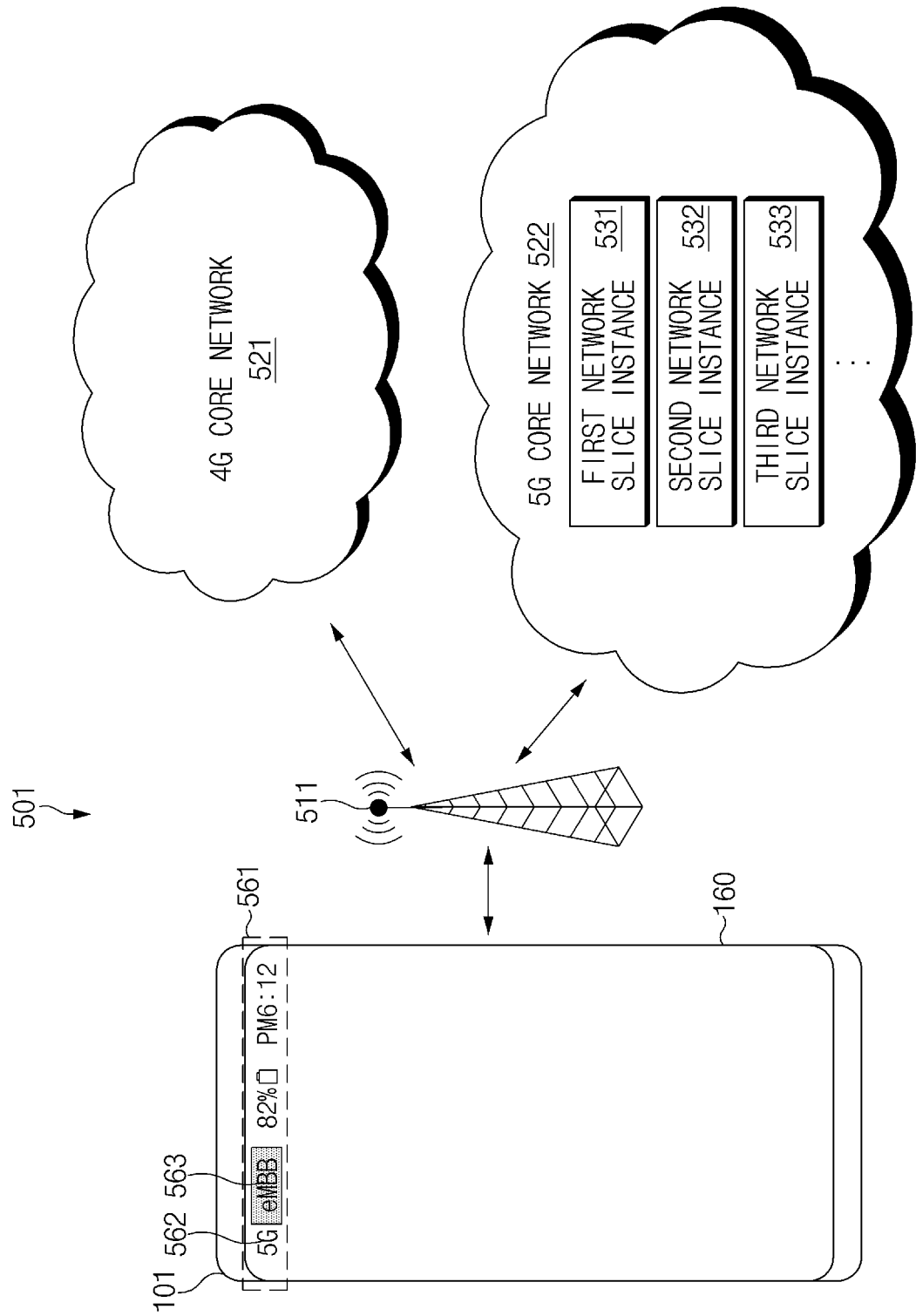
FIG. 5A illustrates an electronic device supporting a plurality of core networks in a network environment, according to an embodiment.
Figure 5B:
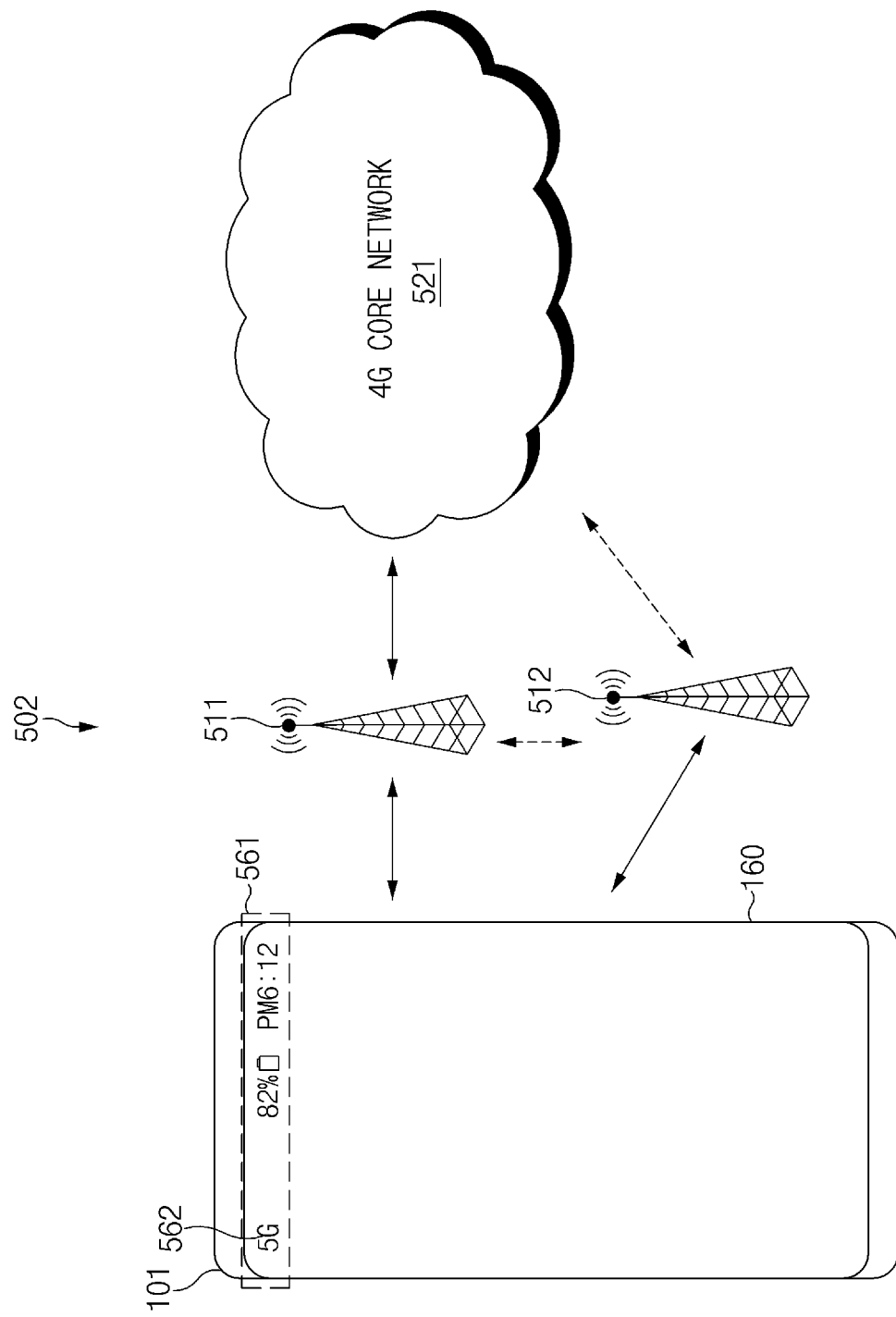
FIG. 5B illustrates an electronic device connected to a plurality of base stations in a network environment, according to an embodiment.

FIGS. 5A to 5B illustrate the electronic device 101 connected to a 5G network in network environments 501 and 502, according to an embodiment. FIG. 5A illustrates the electronic device 101 supporting a plurality of core networks 521 and 522. FIG. 5B illustrates the electronic device 101 connected to a plurality of base stations 511 and 512.

Referring to FIG. 5A, in the network environment 501, the electronic device 101 may mean a device employed by a user. For example, the electronic device 101 may mean a terminal, user equipment (UE), a mobile station, a subscriber station, a remote terminal, a wireless terminal, or a user device.

The first base station 511 (e.g., the LTE base station 340 of FIG. 3) may provide a channel for wireless communication. The first base station 511 may support the 4G network (or 4G protocol) defined in 3GPP. The first base station 511 may mean an RAN, a 4G RAN, an eNB, or an eLTE.

The 4G core network 521 may support the 4G protocol (or LTE protocol). The 4G core network 521 may mean an EPC. The 5G core network 522 may support the 5G protocol (or NR protocol). The 5G core network 522 may mean an NGC.

Because the 5G core network 522 is capable of establishing the different plurality of logical networks through pieces of the same physical equipment by using network function virtualization (NFV) or software defined networking (SDN), the 5G core network 522 may provide the electronic device 101 with a plurality of network services through a plurality of network slice instances 531, 532, and 533 included in the 5G core network 522. The network slice instance may mean a logical network connection unit for data transmission. The type of network service received by the electronic device 101 may include at least one of eMBB, URLLC, or mMTC. For example, the network service type may be divided based on at least one of data transmission speed, latency, the number of electronic devices accessed to a network, access period, average data usage, or reliability.

The electronic device 101 may display an indicator associated with the network, on the partial region of the display device 160. The indicator associated with the network may include at least one of a network indicator 562 or a service indicator 563. For example, the network indicator 562 may correspond to the first indicator 461 or the second indicator 462 illustrated in FIG. 4A.

The network indicator 562 may be based on the type (or network availability) of network providing the electronic device 101 with a service. FIG. 5A illustrates one option of various deployment options, and the deployment option for describing the architecture structure will be described in Table 1.

The electronic device 101 may determine whether the core network to which the electronic device 101 is connected is the 4G core network 521 or the 5G core network 522, based at least partly on network capability information. In this case, the network capability information may include information about the first base station 511 or information about the core network (e.g., the 4G core network 521 or the 5G core network 522). The electronic device 101 may display the network indicator 562 based on the determined type (or network availability) of the network.

For example, when the electronic device 101 is connected to the 5G core network 522, the network indicator 562 may be displayed as "5G" or "NR" (e.g., the first indicator 461-1 of FIG. 4A). Additionally or alternatively, when the electronic device 101 transmits or receives data (e.g., control plane data or user plane data) over the core network 522, the network indicator 562 may be displayed as "5G" or "NR". When the electronic device 101 is connected to the 4G core network 521, the network indicator 562 may be displayed as "4G" or "LTE" to indicate that the electronic device 101 is connected to the 4G network (e.g., the second indicator 462 of FIG. 4A).

In FIG. 5A, as the electronic device 101 displays the network indicator 562 based on the core network. However, as illustrated in FIG. 5B, the electronic device 101 displays the network indicator 562, based on whether the electronic device 101 camps on the second base station 512 (i.e., the 5G base station) or is connected to the 5G base station.

The service indicator 563 may indicate the type (or service availability) of a network service received by the electronic device 101. The service availability may include, for example, eMBB, URLLC, or mMTC. The electronic device 101 may determine the network slice instance or the type of network service, based at least partly on network slice information (e.g., network slice selection assistance information (NSSAI)). The electronic device 101 may display the service indicator 563 indicating the determined type (or service availability) of network service.

For example, when the electronic device 101 is connected to the first network slice instance 531 supporting the eMBB service, the service indicator 563 may be displayed as "eMBB". The service indicator 563 may be displayed as "URLLC" or "mMTC", depending on the type of network service received by the electronic device 101.

The electronic device 101 may display a first indicator 562 or a second indicator 563 associated with the network on a status bar 561 positioned in one region (e.g., the upper end of a display) of the display device 160. The shape of the status bar 561 occupied on the display device 160, the location of the status bar 561 occupied on the display device 160, the ratio of a size that the status bar 561 occupied on the display device 160, and the location of the indicator 562 displayed on the status bar 561 are not limited to that which is illustrated in FIG. 5A. Accordingly, the electronic device 101 may display the indicator 562 associated with the network in another region other than the status bar 561 in the form of an icon or a pop-up.

Referring to FIG. 5B, in the network environment 502, the first base station 511 may support the 4G network 521, and the second base station 512 may support the 5G network. The second base station 512 may mean access network (AN), RAN, 5G RAN, 5G node, transmission/reception point (TRP), 5$^{th}$ generation NodeB (5GNB), or gNodeB (gNB).

The electronic device 101 may be connected to the first base station 511 and the second base station 512, using the DC. The DC may mean a function capable of using an additional resource in an SN while the electronic device 101 is connected to an MN. The first base station 511 may be an MN, and the second base station 512 may be an SN.

When the electronic device 101 camps on the second base station 512 by using the DC or is connected to the second base station 512 by using the DC, the electronic device 101 may display the network indicator 562 displayed as "5G" or "NR", on one region of the display device 160. Alternatively, when the electronic device 101 transmits or receives data (e.g., user plane data) via the second base station 512 by using the DC, the electronic device 101 may display the network indicator 562 displayed as "5G" or "NR", on one region of the display device 160. When the electronic device 101 is connected to the first base station 511 and the 4G core network 521 without being connected to the second base station 512, the electronic device 101 may display the network indicator 562 displayed as "4G" or "LTE", on one region of the display device 160.

In addition to FIGS. 5A and 5B, the network operator may determine the structure (or a deployment option or an option) of the network architecture based on the network types of a base station (or RAN) and a core network. For example, the deployment option may be expressed according to Table 1 below.

TABLE 1

|  | LTE base station | | NR base station | | Note |
| --- | --- | --- | --- | --- | --- |
|  | EPC | NGC | EPC | NGC |  |
| Option 1 | 1 | 0 |  |  |  |
| Option 2 | — | — | 0 | 1 |  |
| Option 3 | 1 | 0 | 1 | 0 | DC available |
| Option 4 | 0 | 1 | 0 | 1 | DC available |
| Option 5 | 0 | 1 |  |  |  |
| Option 6 | — | — | 1 | 0 |  |
| Option 7 | 0 | 1 | 0 | 1 | DC available |
| Option 2 + Option 7 | 0 | 1 | 0 | 1 |  |
| Option 3 + Option 7 | 1 | 1 | 1 | 1 |  |

According to an embodiment, the deployment option illustrated in Table 1 may be expressed as a bit map. Option 1 in Table 1 may indicate that an LTE base station (e.g., the first base station 511) is connected to the EPC (e.g., the 4G core network 521). Option 2 may indicate that an NR base station (e.g., the second base station 512) is connected to the NGC (e.g., the 5G core network 522). Option 3 may indicate that the LTE base station and the NR base station are connected to the EPC in a non-standalone mode (NSA). The user plane of the NR base station may be connected to the EPC via the LTE base station, or connected to the EPC directly. Option 4 may indicate that the NR base station and the LTE base station are connected to the NGC in an NSA mode. In this case, the control plane and the user plane of the NR base station may be connected to the NGC, and the user plane of the LTE base station may be connected to the NGC via the NR base station, or connected to the NGC directly. Option 5 may indicate that the LTE base station is connected to the NGC. Option 6 may indicate that the NR base station is connected to the EPC. Option 7 may indicate that the NR base station and the LTE base station are connected to the NGC in an NSA mode. In this case, the control plane and the user plane of the LTE base station may be connected to the NGC, and the user plane of the NR base station may be connected to the NGC via the NR base station, or connected to the NGC directly. In Table 1, Options 3, 4, and 7 may indicate that the DC is available.

The electronic device 101 may determine the deployment option of the network based on the network capability information and may display the network indicator 562 via the display device 160 based at least partly on the determined deployment option. In this case, the network capability information may include at least one of information indicating the network type of the core network, cell barred information, or information indicating whether the DC of a serving cell (or neighboring cell) is available.

The electronic device 101 may determine whether to display an indicator associated with the network, based at least on the policy information (e.g., at least one of an operator's policy or the policy of an electronic device) previously stored in the memory 130 of the electronic device 101. The policy information may be determined based on home public land mobile network (HPLMN) of the SIM being used by the electronic device 101 or public land mobile network (PLMN) connected by the electronic device 101. For example, an operation of displaying the indicator associated with the network may be performed under four conditions (A-D) described below A. A case where the electronic device 101 camps on the cell of the 4G base station (e.g., the first base station 511 of FIG. 1) supporting the DC.

B. A case where the electronic device 101 performs data transmission at the cell of the 4G base station supporting the DC.

C. A case where the electronic device 101 camps on the cell of the 4G base station and is positioned within the cell coverage of the 5G base station (e.g., the second base station 512) by the DC.

D. A case where the electronic device 101 performs data transmission in the cell coverage of the 5G base station.

The camp-on operation may mean an operation of selecting a cell before the electronic device 101 sets up RRC connection to a base station and then synchronizing with the control channel of the selected cell. In the camp-on state, the electronic device 101 may receive system information or paging information from the cell or the base station. When the PLMN of the SIM being used by the electronic device 101 is HPLMN, the electronic device 101 may display the indicator associated with the network in the case of at least one of the four conditions A, B, C, and D. When the PLMN of the SIM being used by the electronic device 101 is not HPLMN, the electronic device 101 may display the indicator associated with the network in the case of at least one of the conditions C and D.

Figure 6:
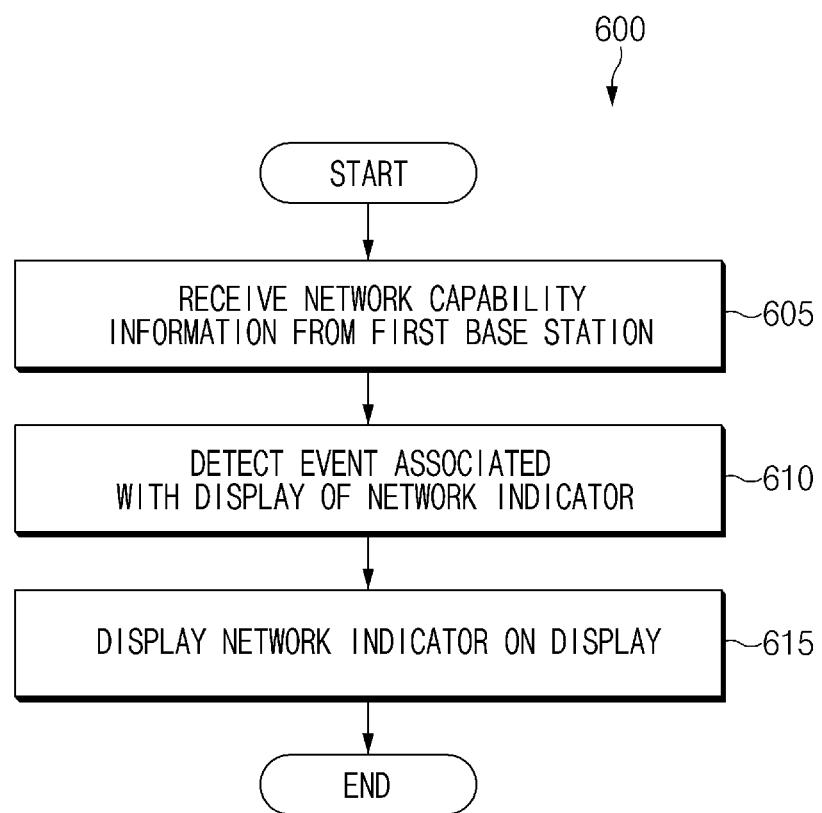
FIG. 6 illustrates an operation flowchart of an electronic device displaying a network indicator, according to an embodiment.

FIG. 6 illustrates an operation flowchart of the electronic device 101 displaying the network indicator 562, according to an embodiment. For example, an operations illustrated in FIG. 6 may be performed by the electronic device 101 or the component (e.g., the processor 120 of FIG. 1) of the electronic device 101.

Referring to FIG. 6, in step 605 of a method 600, the electronic device 101 receives network capability information from the first base station 511. The network capability information may include information about a base station or a core network. For example, the network capability information may include at least one of the bit map information of Table 1, information indicating the network type of the core network, cell barred information, or information indicating whether the DC of a serving cell (or neighboring cell) is available.

For example, the network capability information may be included in at least one of system information (e.g., master information block (MIB) or system information block (SIB)) broadcast by the first base station 511, a message (e.g., an RRC setup message) associated with RRC connection, a message associated with registration, or a message associated with a protocol data unit (PDU) session. The message associated with registration may include the attach accept message defined in 3GPP. In this case, the attach accept message may include information indicating that the connection of the electronic device 101 to the 5G base station (e.g., the second base station 512) via the DC is restricted.

In step 610, the electronic device 101 detects the event associated with the display of a network indicator. The event associated with the display of the network indicator may include at least one piece of information (conditions A, B, C, and D) designated by the policy information previously stored in the memory 130 of the electronic device 101.

In step 615, the electronic device 101 displays the network indicator 562 on the partial region of the display device 160. When detecting the event associated with the display of the network indicator 562, the electronic device 101 may display the network indicator 562, on the status bar 561 or as an icon or pop-up form. When the application associated with the 5G network is installed in the electronic device 101, the electronic device 101 may be activated or deactivated based on whether an application installed according to network capability information is capable of being executed, or the electronic device 101 may change the shape or color of the icon of the application.

Figure 7:
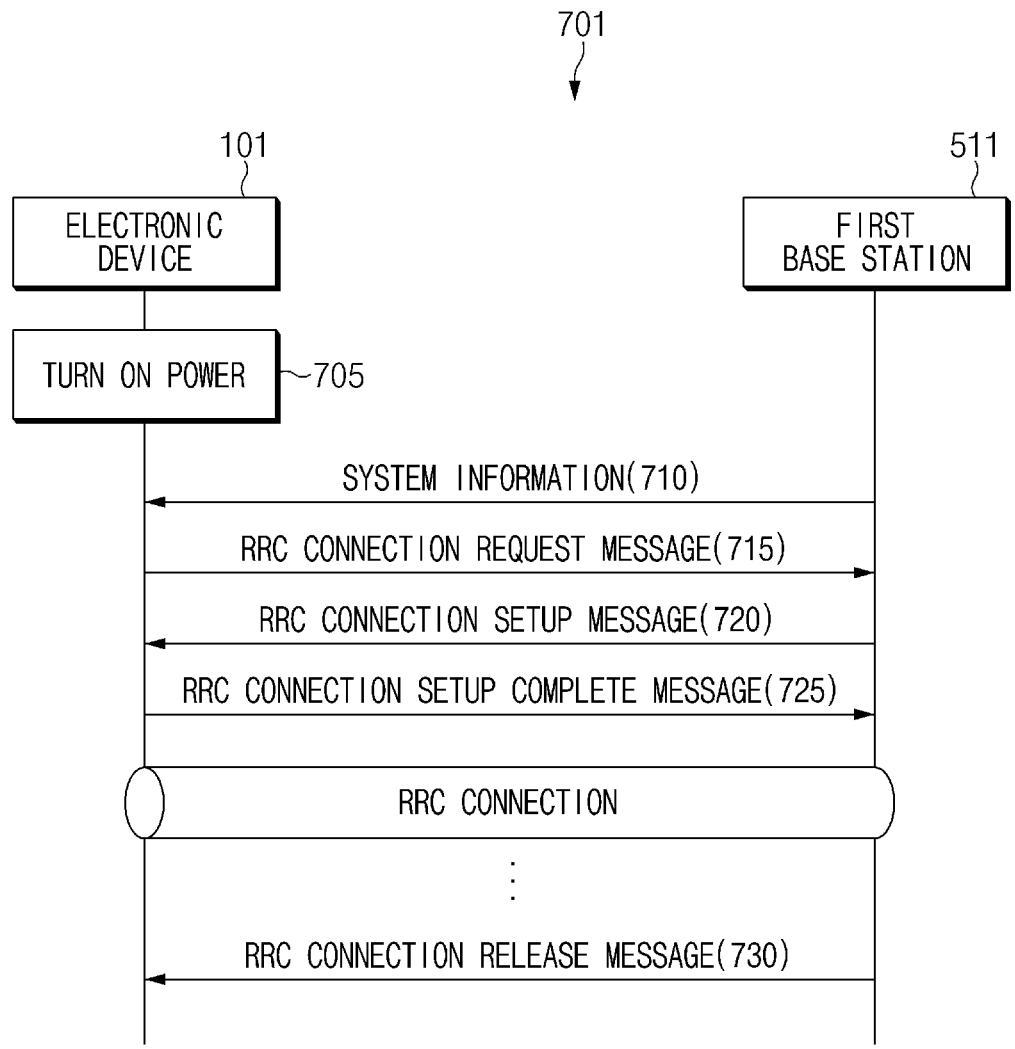
FIG. 7 illustrates a signal flowchart associated with an RRC connection, according to an embodiment.

FIG. 7 illustrates a signal flowchart associated with an RRC connection, according to an embodiment.

Referring to FIG. 7, in step 705 of a network environment 701, the electronic device 101 turns on power.

In step 710, the electronic device 101 receives system information from the first base station 511. The first base station 511 may broadcast system information, which may include at least one of MIB or SIB. When the first base station 511 connected to the 4G core network 521 supports the 5G NR base station (e.g., the second base station 512 of FIG. 5B) by using the DC, the broadcast system information may include information indicating that the first base station 511 is capable of accessing the 5G NR base station. The system information broadcast by the first base station 511 connected to the 5G core network 522 may include information indicating that the first base station 511 is capable of accessing the 5G core network 522. FIG. 7 illustrates an example in which the system information is transmitted before the RRC connection between the electronic device 101 and the first base station 511 is set up. However, the system information such as SIB may be periodically or randomly received from the first base station 511 after the RRC connection is set up.

In step 715, the electronic device 101 transmits an RRC connection request message to the first base station 511, based on the system information received to set up the RRC connection to the first base station 511. The RRC connection may mean a path on which a message is transmitted and received via the RRC layer between the electronic device 101 and the first base station 511 and may be used such that the NAS message between the electronic device 101 and a core network is transmitted.

In step 720, the first base station 511 allocates the resource dedicated to the electronic device 101 in response to an RRC connection request message and transmits an RRC connection setup message including information about the allocated resource.

In step 725, the electronic device 101 transmits an RRC connection setup complete message indicating that RRC connection setup is completed, to the first base station 511 in response to the RRC connection setup message.

After the RRC connection between the electronic device 101 and the first base station 511 is set up, in step 730, the first base station 511 transmits an RRC connection release message to the electronic device 101 to release the RRC connection.

Because the network capability information is included in at least one of the system information, the RRC connection setup message, or the RRC connection release message, the electronic device 101 may determine the network availability or the service availability based on the network capability information included in at least one of the system information, the RRC connection setup message, or the RRC connection release message and may display the indicator associated with a network.

The operations illustrated in FIG. 7 need not be performed continuously, and an additional operation may be performed between the operations illustrated in FIG. 7. For example, the electronic device 101 may perform an operation of camping on the cell of the first base station 511 between step 705 and step 710.

Figure 8:
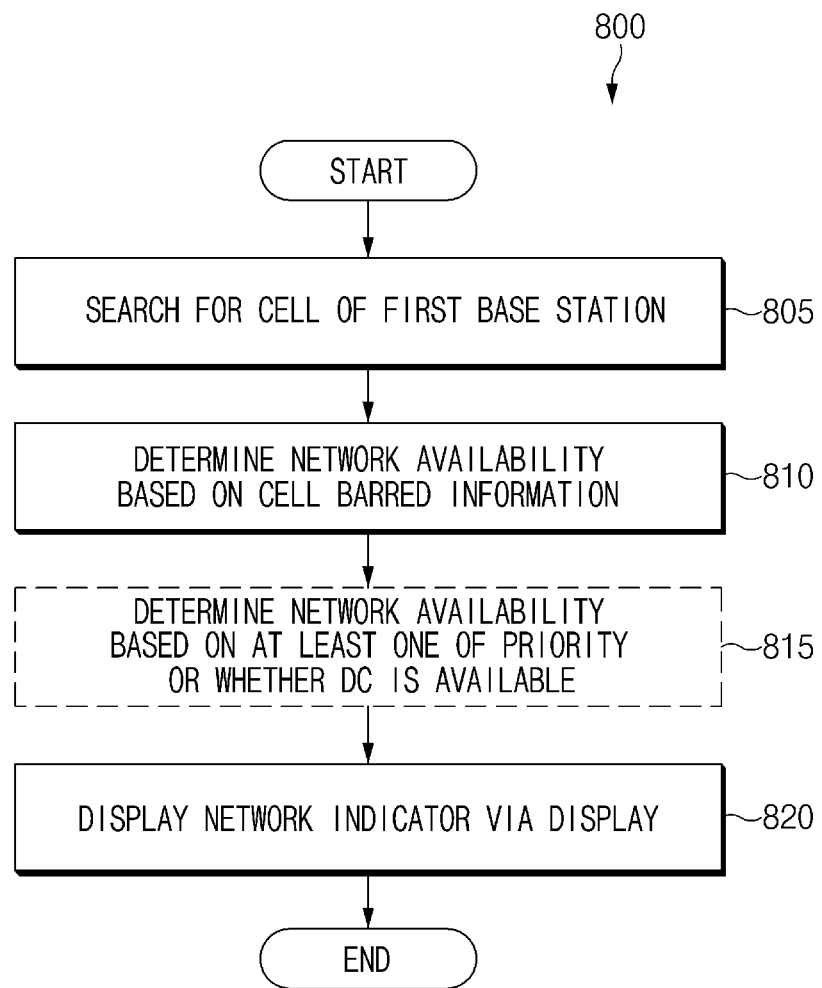
FIG. 8 illustrates an operation flowchart of an electronic device displaying a network indicator based on cell barred information, according to an embodiment.

FIG. 8 illustrates an operation flowchart of the electronic device 101 displaying the network indicator 562 based on cell barred information, according to an embodiment.

Referring to FIG. 8, in step 805 of a method 800, the electronic device 101 searches for the cell of a first base station 511. For example, the first base station 511 may support the 4G network (or 4G protocol) defined in 3GPP. The electronic device 101 may receive system information (e.g., at least one of SIM or MIB) including network capability information, from the cell of the first base station 511.

In step 810, the electronic device 101 determines network availability based at least on cell barred information. The cell barred information may be information included in the network capability information. The cell barred information may indicate whether the cell of a base station bars the access to a specific terminal (e.g., the 4G terminal or the 5G terminal). For example, when being connected to the 5G core network 522 of the first base station 511 (e.g., option 5), the cell of the first base station 511 may bar the 4G terminal supporting only the 4G core network 511 from being accessed; when the cell of the first base station 511 is connected to the 4G core network 521 (e.g., option 1 or 3), the cell of the first base station 511 may bar the 5G terminal supporting only the 5G core network 522.

When the cell barred information indicates that the access to the 4G terminal is barred, the electronic device 101 may attempt to connect to the 5G core network 522. When the electronic device 101 is connected to the 5G core network 522, because the electronic device 101 is connected to the first base station 511 and the 5G core network 522 in FIG. 5A (e.g., option 5 in Table 1), the electronic device 101 may skip step 815 and may perform step 820.

When the cell barred information indicates that the access by the 5G terminal is barred, the electronic device 101 may attempt to connect to the 4G core network 521. Because the electronic device 101 is connected to the 5G base station by the DC, even though the electronic device 101 is connected to the 4G core network 521, the electronic device 101 may perform step 815.

When the cell barred information indicates that the access to the 5G cell and 4G cell of the electronic device 101 is not barred, the electronic device 101 may perform step 815 to determine the type of core network based on priority.

In step 815, the electronic device 101 determines the network availability based on at least one of the priority or information indicating whether the DC is available.

When it is possible for the electronic device 101 to access the 5G cell and the 4G cell, the electronic device 101 may determine the core network based on the priority. The priority may be determined by user settings or may be determined by the network usage history of the electronic device 101. When the 5G core network 522 is determined based on the priority, in step 820, the electronic device 101 may display the network indicator 562 (e.g., the first indicator 461-1 of FIG. 4A) indicating "5G" or "NR", via the display device 160.

When the electronic device 101 is barred from accessing the 5G cell, the electronic device 101 may identify whether the electronic device 101 is capable of being connected to the second base station 512 via the DC. In step 820, the electronic device 101 displays the network indicator 562 (e.g., the second indicator 462) indicating "4G" or "LTE" when it is not possible to be connected to the second base station 512 and displays the network indicator 562 indicating "5G" or "NR" when it is possible to be connected to the second base station 512.

Figure 9:
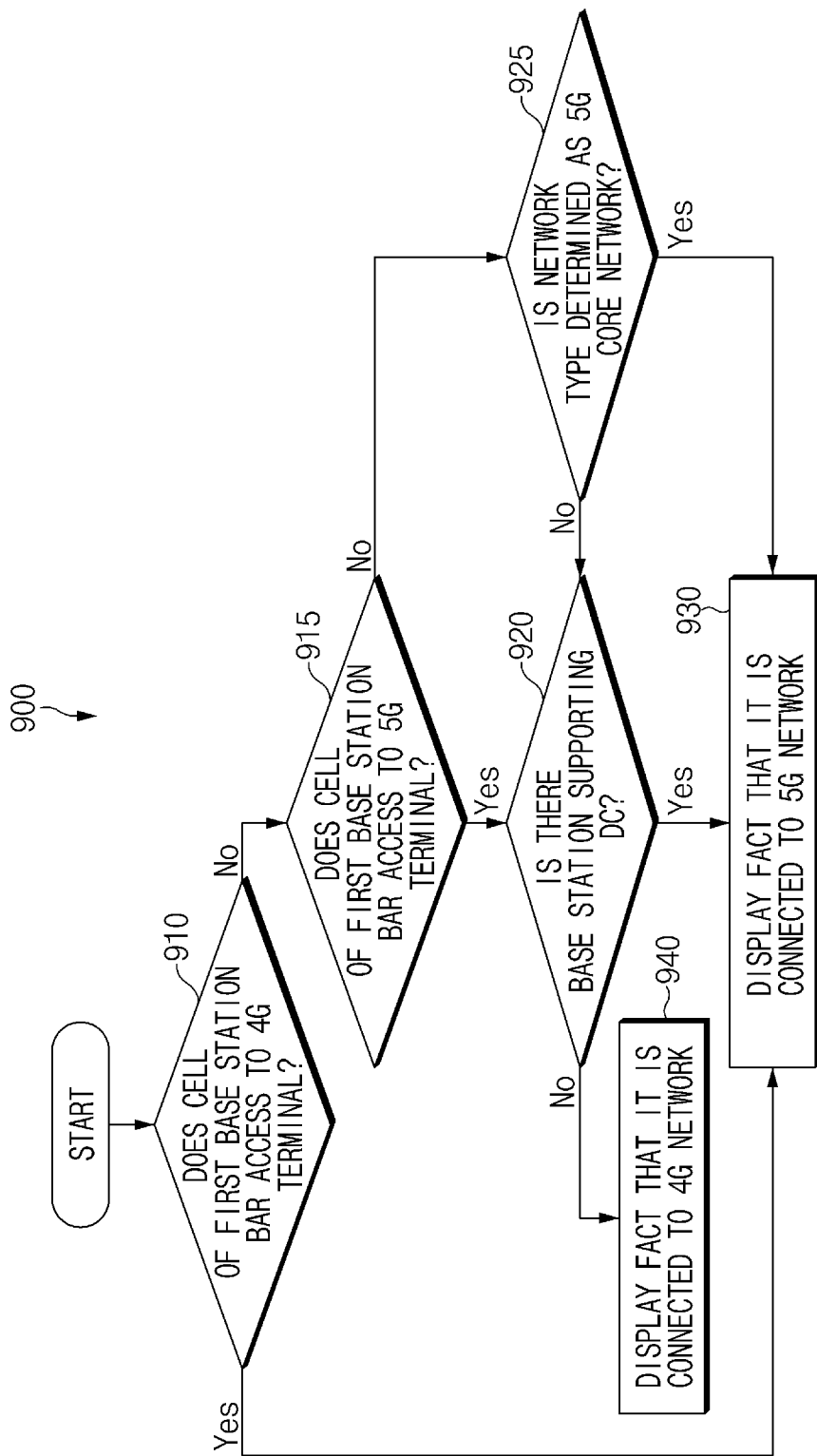
FIG. 9 illustrates an operation flowchart of an electronic device displaying a network indicator based on cell barred information, according to an embodiment.

FIG. 9 illustrates another operation flowchart of the electronic device 101 displaying the network indicator 562 based on cell barred information, according to an embodiment. The operations illustrated in FIG. 9 may encompass operations in which step 810 to step 820 are performed.

Referring to FIG. 9, in step 910 of the method 900, the electronic device 101 identifies whether a cell of the first base station 511 bars access to the 4G terminal, based at least on cell barred information included in network capability information (e.g., SIB). When being connected to the 5G core network 522 of the first base station 511 (e.g., option 5), the cell of the first base station 511 may bar the 4G terminal supporting only the 4G core network 511 from being accessed ("Yes" in step 910). In this case, the electronic device 101 may be connected to the 5G core network 522; in step 930, the electronic device 101 may display the network indicator 562 indicating that a network type is 5G.

When the cell of the first base station 511 does not bar the access to the 4G terminal ("No" in step 910), in step 915, the electronic device 101 identifies whether the cell of the first base station 511 bars access to the 5G terminal, based at least on cell barred information. When the cell of the first base station 511 is connected to the 4G core network 521 (e.g., option 1 or 3), the cell of the first base station 511 may restrict the 5G terminal supporting only the 5G core network 522 ("Yes" in step 915). In this case, the electronic device 101 may be connected to the 4G core network 521.

Even when the electronic device 101 is connected to the 4G core network 521, as illustrated in FIG. 5B (i.e., option 3), because the electronic device 101 is capable of being connected to the second base station 512 supporting the 5G RAN via the DC, in step 920, the electronic device 101 identifies whether there is a base station supporting the DC. When there is no base station supporting the DC ("No" in step 920), the electronic device 101 determines that a deployment option corresponds to option 1; in step 940, the electronic device 101 displays the network indicator 562 indicating that a network type is 4G. When the base station supporting the DC is present ("Yes" in step 920), the electronic device 101 determines that a deployment option corresponds to option 3; in step 930, the electronic device 101 displays the network indicator 562 indicating that a network type is 5G.

When the cell of the first base station 511 does not bar the access to the 5G terminal ("No" in step 915), because the cell of the first base station 511 is capable of being connected to the 4G core network 521 and the 5G core network 522 (e.g., option 3 or option 7, hereinafter referred to as a "dual core"), in step 925, the electronic device 101 determines the network type of a core network based on the pre-stored priority or a user input. When it is determined that the network type of the core network is the 5G core network 522, in step 930, the electronic device 101 may display the network indicator 562 indicating that the network type is 5G.

Figure 10:
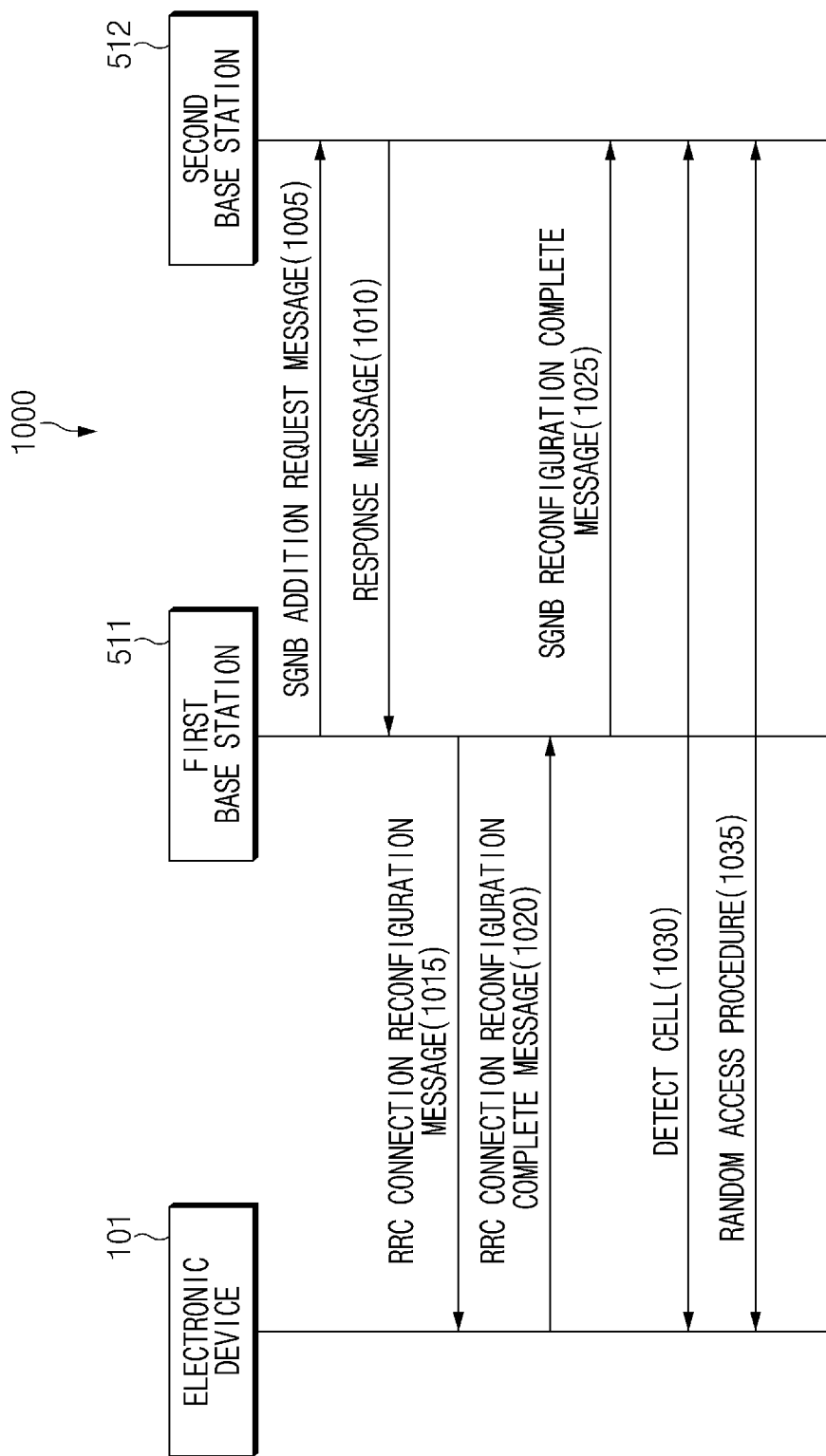
FIG. 10 illustrates a signal flowchart for adding a secondary node (SN), according to an embodiment.

FIG. 10 illustrates a signal flowchart for adding SN, according to an embodiment.

Referring to FIG. 10, in step 1005 of a network environment 1000, the first base station 511 transmits a secondary gNB (SgNB) addition request message to the second base station 512 to add the second base station 512 as SN. The addition request message may include the capability information of the electronic device 101.

In step 1010, the second base station 512 transmits a response message (Acknowledgment) responding to the SgNB addition request message.

In step 1015, the first base station 511 transmits an RRC connection reconfiguration message to the electronic device 101. According to an embodiment, the RRC connection reconfiguration message may include network capability information. For example, the network capability information may include at least one of cell barred information indicating whether the cell of the second base station 512 or the second base station 512 bars access to the 4G terminal or the 5G terminal, information indicating the network type of a core network to which the second base station 512 is connected, information indicating whether the second base station 512 supports DC, or the identification information of the second base station 512.

In step 1020, the electronic device 101 transmits an RRC connection reconfiguration complete message to the first base station 511 in response to the RRC connection reconfiguration message.

In step 1025, the first base station 511 transmits the SgNB reconfiguration complete message indicating that the electronic device 101 completes the procedure of RRC connection reconfiguration, to the second base station 512 in response to receiving the RRC connection reconfiguration complete message.

In step 1030, the electronic device 101 detects the cell of the second base station 512 based at least on information included in the RRC connection reconfiguration message. For example, the electronic device 101 may detect the cell of the second base station 512 based on at least one of a primary synchronization signal (PSS), a secondary synchronization signal (SSS), or a physical broadcast channel (PBCH) of the second base station 512.

In step 1035, the electronic device 101 may set up a random access channel (RACH) by performing a random access procedure with the second base station 512 based at least on the detected cell of the second base station 512. The electronic device 101 may set up the RRC connection with the second base station 512 based on the set RACH as illustrated in FIG. 7.

According to the above-described method, because the electronic device 101 is capable of being connected to the second base station 512 while being connected to the first base station 511, the electronic device 101 may receive a 5G network service from the second base station 512. The electronic device 101 may display the network indicator 562 indicating that the electronic device 101 is connected to the 5G network, via the display device 160.

The electronic device 101 may display the network indicator 562 based at least on the pre-stored policy information (e.g., at least one of an operator's policy or the policy of an electronic device). The policy information may be determined based on HPLMN of the SIM being used by the electronic device 101 or PLMN to which the electronic device 101 is connected. For example, the operation of displaying an indicator associated with a network may be performed under at least one condition of the following conditions A, B, C, or D.

- A. a case where the electronic device 101 camps on the cell of the 4G base station (e.g., the first base station 511 of FIG. 5) supporting the DC (e.g., before step 1005).
- B. a case where the electronic device 101 performs data transmission at the cell of the 4G base station supporting the DC (e.g., before step 1005).
- C. a case where the electronic device 101 camps on the cell of the 4G base station and is positioned within the cell coverage of the 5G base station (e.g., the second base station 512) by the DC (e.g., identified through a cell measurement operation in step 1030).
- D. a case where the electronic device 101 performs data transmission in the cell coverage of the 5G base station.

As illustrated in FIG. 5A, when the electronic device 101 is connected to the 5G core network 522, the electronic device 101 may receive at least one network service by being connected to at least one network slice instance of a plurality of network slice instances (e.g., 531, 532, and 533). Hereinafter, FIGS. 11 to 13 describe an embodiment in which the electronic device 101 displays a network service type.

Figure 11:
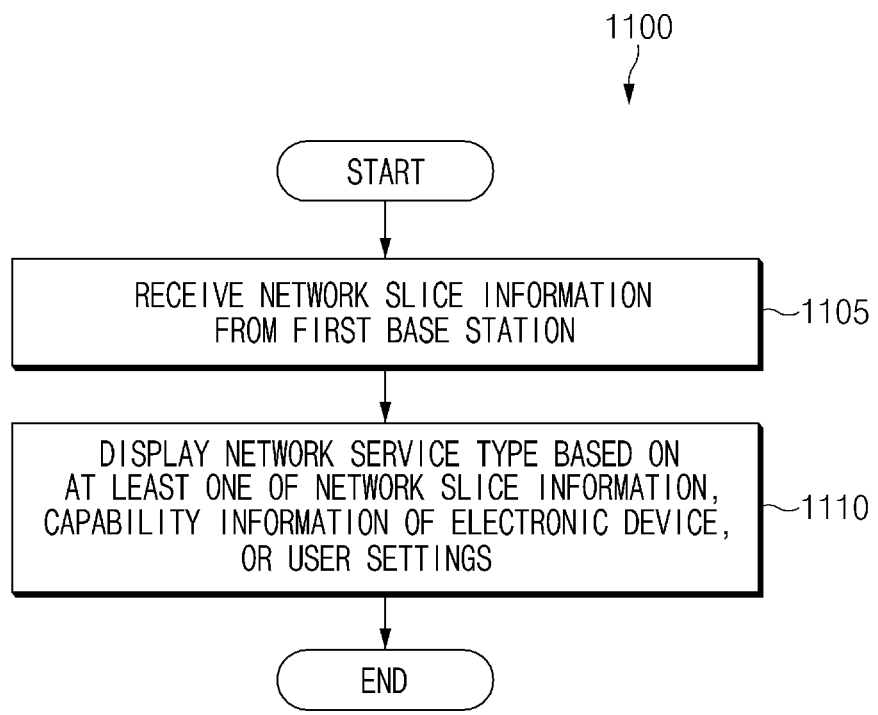
FIG. 11 illustrates an operation flowchart of an electronic device displaying a service indicator, according to an embodiment.

FIG. 11 describes an operation flowchart of the electronic device 101 displaying the service indicator 563, according to an embodiment.

Referring to FIG. 11, in step 1105 of a method 1100, the electronic device 101 receives network slice information from a first base station 511. The network slice information may be information used to select a network slice instance. The network slice information may mean NSSAI. The NSSAI may include pieces of single-NSSAI (S-NSSAI). For example, NSSAI or S-NSSAI may include a slice/service type (SST) and slice differentiator (SD). The SST may indicate a network service type, and the SD may indicate information associated with the performance of a network slice instance.

In step 1110, the electronic device 101 may display a network service type based on at least one of network slice information, capability information of the electronic device 101, or user settings. The capability information of the electronic device 101 may display a network service type (e.g., the service indicator 563 of FIG. 5A) capable of being supported by the electronic device 101.

For example, the electronic device 101 requires eMBB, URLLC, and mMTC services. However, when the network slice information indicates that it is not possible to allow URLLC and mMTC, the electronic device 101 may display the fact that the eMBB service is possible. Additionally or alternatively, when the electronic device 101 does not support the mMTC service and the network slice information indicates that it is impossible to allow URLLC, the electronic device 101 may display the fact that the eMBB service is possible. Additionally or alternatively, when the mMTC service is turned off by user settings and the network slice information indicates that it is impossible to allow URLLC, the electronic device 101 may display the fact that the eMBB service is possible.

Figure 12:
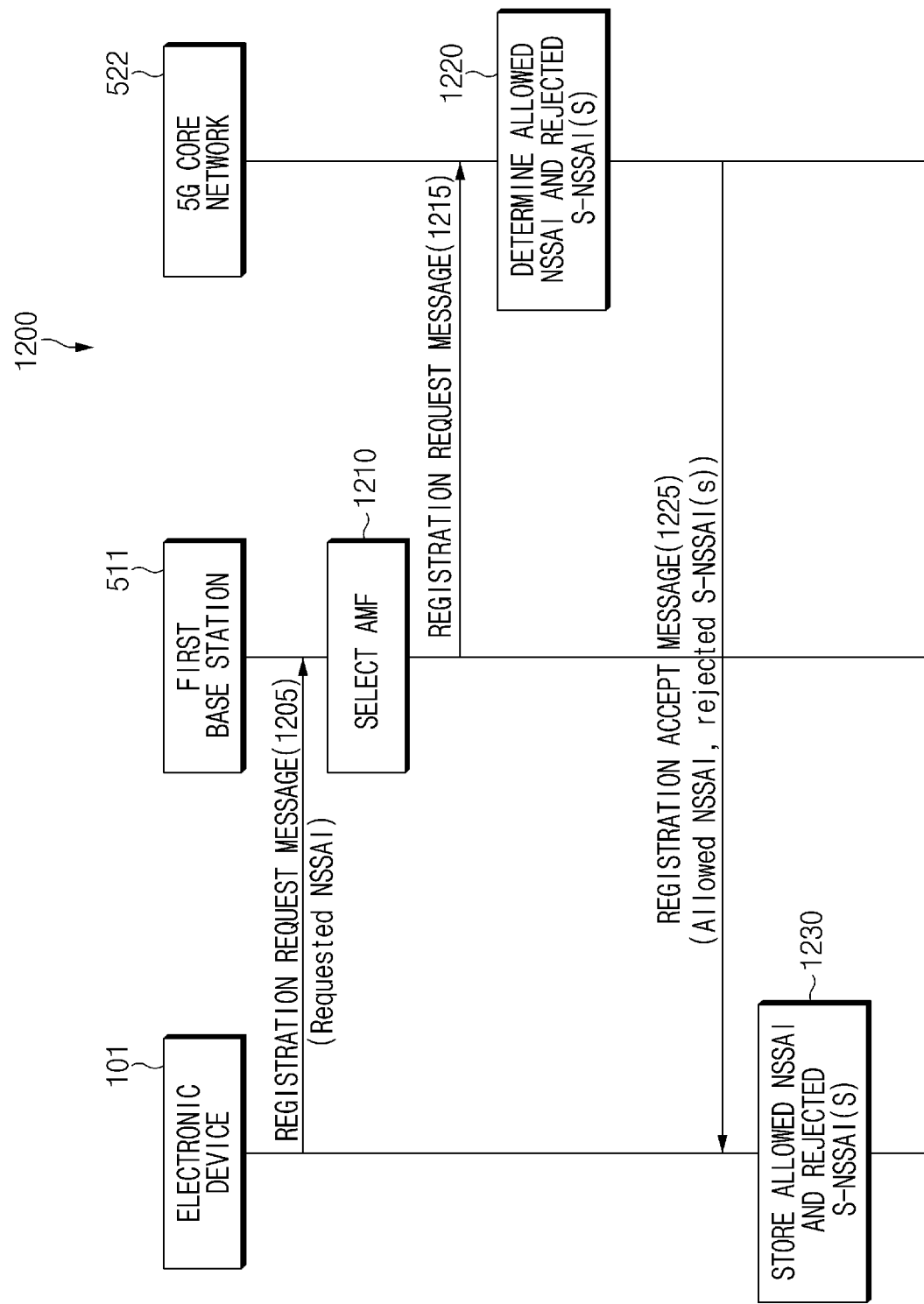
FIG. 12 illustrates a signal flowchart for transmitting information about a network slice instance, according to an embodiment.

FIG. 12 illustrates a signal flowchart for transmitting information about a network slice instance, according to an embodiment.

Referring to FIG. 12, in step 1205 of a network environment 1200, the electronic device 101 transmits a registration request message to the first base station 511. The registration request message may include information (e.g., the requested NSSAI) about the network slice instance requested by the electronic device 101.

The electronic device 101 may generate the requested NSSAI based on at least one of the configured NSSAI or the allowed NSSAI. The configured NSSAI may mean the NSSAI provisioned from an electronic device 101 applicable to one or more PLMNs. The configured NSSAI may be designated by an operator. The allowed NSSAI may mean the NSSAI provided by a serving PLMN. For example, in the case of a registration procedure, the allowed NSSAI may mean NSSAI capable of being used in the registered PLMN by the electronic device 101.

In step 1210, the first base station 511 selects an access & mobility management function (AMF) included in the 5G core network 522, based at least on the requested NSSAI. For example, the AMF may manage information associated with the access authorization for the 5G core network 522 of the electronic device 101 and the mobility of the electronic device 101.

In step 1215, the first base station 511 forwards the registration request message received from the electronic device 101, to the 5G core network 522. For example, the first base station 511 may transmit the registration request message to the selected AMF.

In step 1220, the 5G core network 522 determines the allowed NSSAI and at least one rejected S-NSSAI, based at least on the requested NSSAI included in the registration request message, the information (e.g., subscriber information) of the electronic device 101 stored in the 5G core network 522, or the location information (e.g., TA information) of the electronic device 101. The rejected S-NSSAI may indicate a network slice instance that is not allowed on the electronic device 101.

In step 1225, the 5G core network 522 may transmit a registration accept message including the allowed NSSAI and the at least one rejected S-NSSAI, toward the electronic device 101 via the first base station 511.

In step 1230, the electronic device 101 stores the allowed NSSAI and the at least one rejected S-NSSAI included in the registration accept message, in the memory 130. Network slice instances indicated by pieces of S-NSSAI included in the allowed NSSAI may be used in the PLMN in which the electronic device 101 receives the registration accept message. The electronic device 101 may display the network service type via the display device 160 based at least partly on the stored allowed NSSAI and the stored at least one rejected S-NSSAI.

Figure 13:
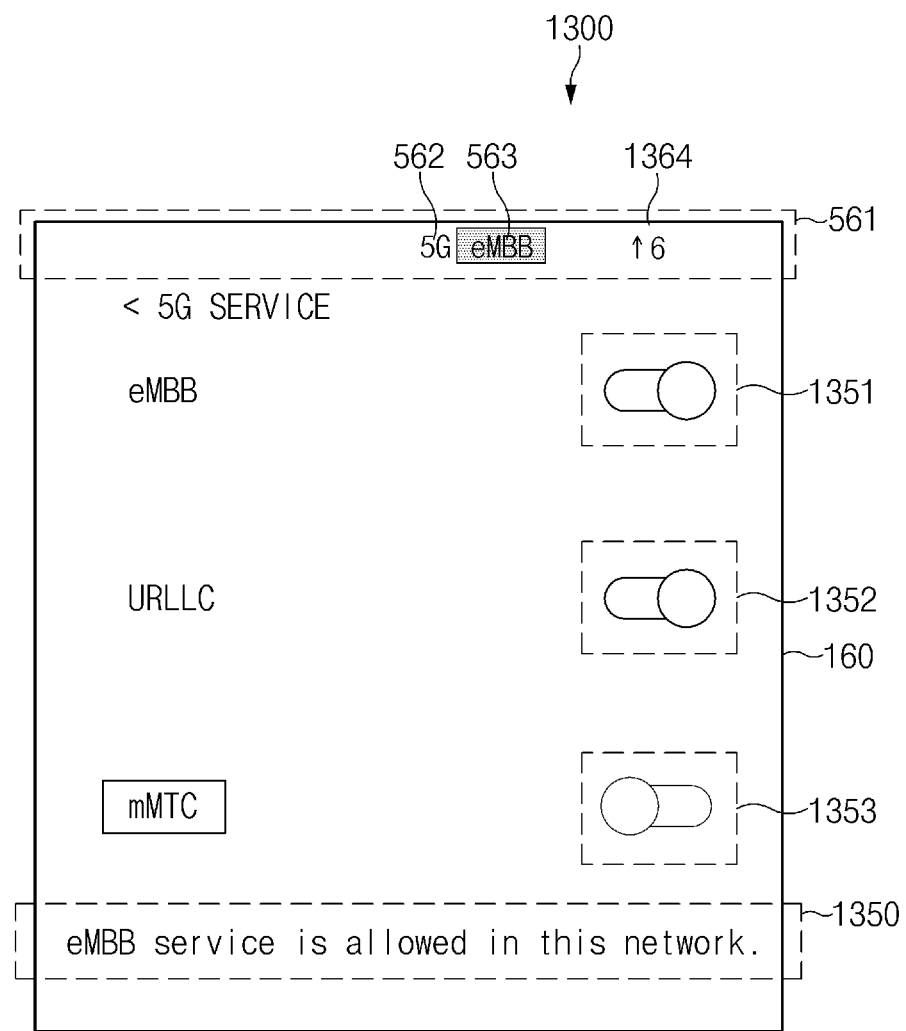
FIG. 13 illustrates a screen for displaying a service indicator, according to an embodiment.

FIG. 13 describes a screen 1300 for displaying the service indicator 563, according to an embodiment. FIG. 13 illustrates an embodiment in which an electronic device 101 uses an eMBB service of a plurality of network services. However, an embodiment in which the electronic device 101 uses another network service may be applied based on the same principle.

Referring to a screen 1300 of FIG. 13, the electronic device 101 may determine the network service type or service availability based on at least one of network slice information or user settings. For example, the electronic device 101 may display activation buttons 1351, 1352, and 1353 for selecting the network service type, on the screen 1300 for setting up the network service type. The electronic device 101 may receive a user input to turn off the use of the mMTC service on the activation button 1353 and may receive a user input to turn on the use of the eMBB service and the URLLC service on the activation buttons 1351 and 1352. The electronic device 101 may determine the eMBB service and the URLLC service based on user settings. When the rejected S-NSSAI indicates a network slice instance providing the URLLC service, the electronic device 101 may display the fact that eMBB is available.

The electronic device 101 may display the service indicator 563 indicating a network service type (e.g., eMBB) capable of being used by the electronic device 101, via the display device 160. The electronic device 101 may display the service indicator 563 on the status bar 561. For example, the electronic device 101 may display the service indicator 563 at a location adjacent to the network indicator 562. Additionally, the electronic device 101 may display the network service type capable of being used by the electronic device 101, in a region other than the status bar 561 in the icon or pop-up form. In addition, the electronic device 101 may display the network service type capable of being used by the electronic device 101, in one region 1350 of a screen 1300 for setting up the network service type, with a text.

The electronic device 101 may display a frequency indicator 1364 (e.g., the fifth indicator 461-3 of FIG. 4C) indicating a frequency band used to perform wireless communication with a base station (e.g., the first base station 511 or the second base station 512). For example, the frequency indicator 1364 may indicate whether a frequency band used by the electronic device 101 is not less than 6 gigahertz (GHz). For example, when the frequency band is not less than 6 GHz, the frequency indicator 1364 may be displayed as "16", "above 6", or "UWB"; when the frequency band is less than 6 GHz, the frequency indicator 1364 may be displayed as "16" or "below 6", or not displayed. The electronic device 101 may display the frequency indicator on the status bar 561.

Figure 14:
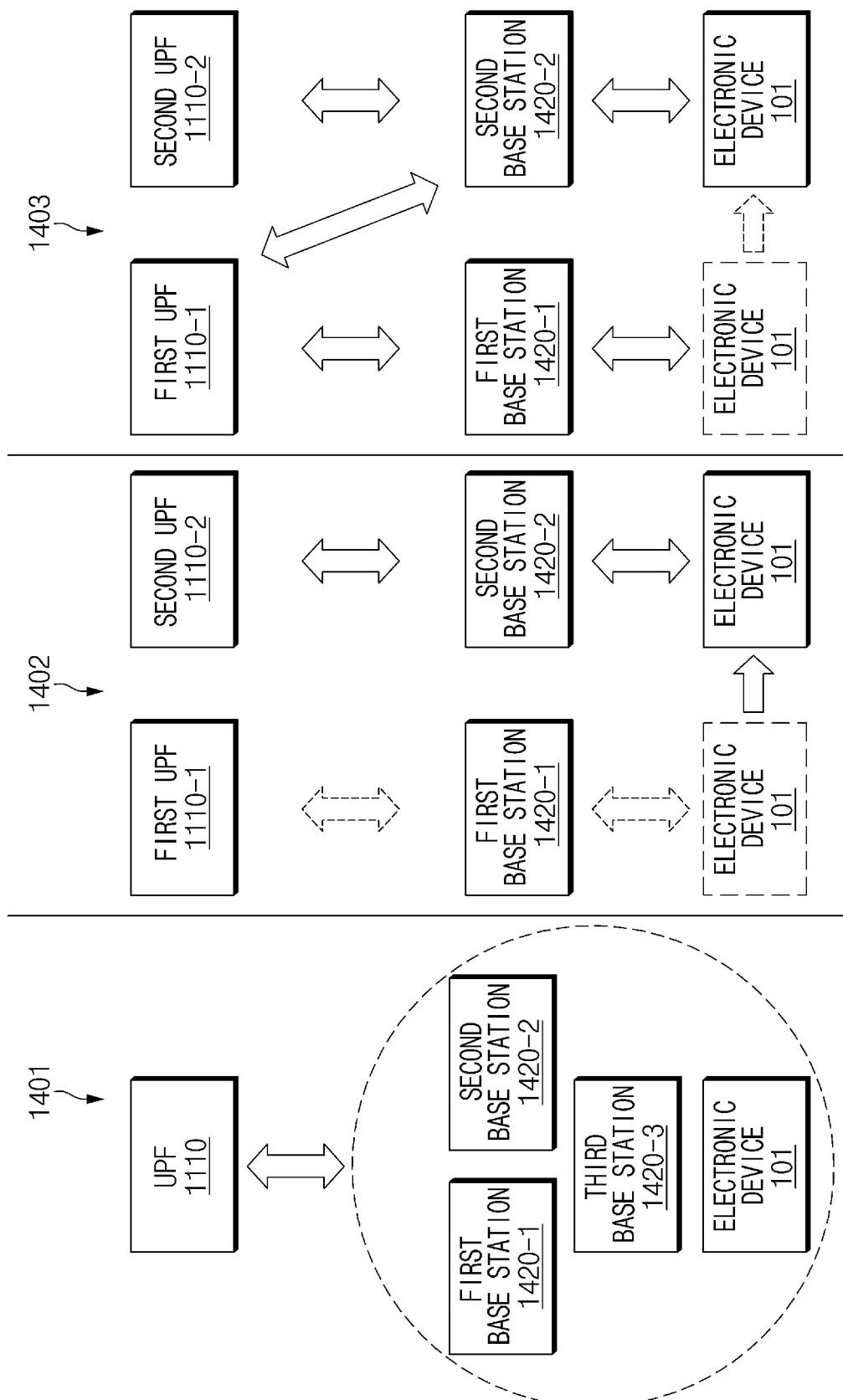
FIG. 14 illustrates a diagram for describing a session and service continuity (SSC) mode in a 5G network, according to an embodiment.

FIG. 14 describes an SSC mode in a 5G network, according to an embodiment.

A 5G core network 522 may include at least one user plane function (UPF) (e.g., 1110, 1110-1, or 1110-2). The UPF may mean a node at least partly performing the function of packet data network gateway (P-GW) and serving gateway (S-GW) of a 4G core network 521. For example, the UPF may perform a routing function such that data is transmitted or received between the electronic device 101 and data network on a user plane and may perform an anchor function to allocate an Internet protocol (IP) address. Because a plurality of UPFs are positioned while being distributed in the 5G core network 522, the electronic device 101 may perform UPF re-location by changing a UPF based on the mobility of the electronic device 101.

Referring to FIG. 14, in SSC mode 1 1401, the electronic device 101 may change base stations (e.g., 1420-1, 1420-2, or 1420-3) connected to an electronic device, based on the mobility, and the UPF 1410 connected to the electronic device 101 may not be changed. In SSC mode 2 1402 and SSC mode 3 1403, the electronic device 101 may perform UPF re-location of changing UPF based on the mobility of the electronic device 101. The end-to-end latency may be reduced by the UPF re-location. However, because the IP address is changed, the electronic device 101 needs to generate a session with another UPF for the purpose of the continuity of a PDU session. In SSC mode 2 1402, after the electronic device 101 releases the preset session with the first base station 1420-1 and the first UPF 1410-1, the electronic device 101 may generate a session with the second base station 1420-2 and the second UPF 1410-2. In SSC mode 3 1403, before the electronic device 101 releases the preset session with the first UPF 1410-1, the electronic device 101 may generate the session with the second UPF 1410-2 via the first base station 1420-1 and the second base station 1420-2.

When the preset PDU session is released, the electronic device 101 may display whether the network service is available, based on the fact that the PDU session is released by SSC mode 2 1402. For example, when the preset PDU session is released by SSC mode 2 1402, because the PDU session different from another UPF (e.g., the second UPF 1410-2) is set, the electronic device 101 may display the fact that the network service is available. Additionally or alternatively, when the PDU session is released by another cause, because the electronic device 101 is in a state where the electronic device 101 is not capable of receiving a network service from the 5G core network 522, the electronic device 101 may display the fact that the network service is not available.

Figure 15:
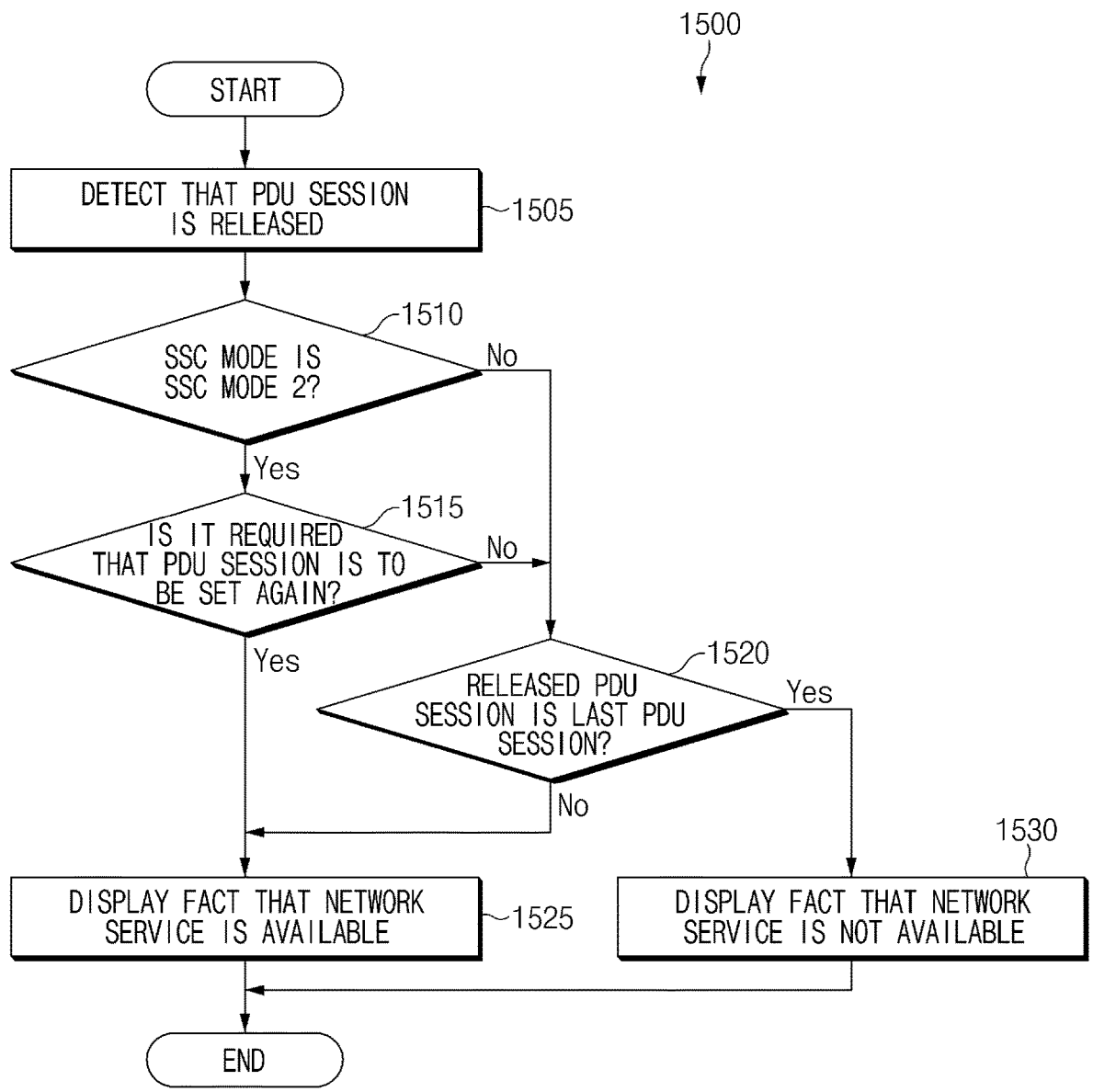
FIG. 15 illustrates an operation flowchart of an electronic device displaying that a network service is available based on an SSC mode, according to an embodiment.

FIG. 15 illustrates an operation flowchart of the electronic device 101 displaying the fact that a network service is available based on an SSC mode, according to an embodiment. The operations illustrated in FIG. 15 may be performed after step 615 of FIG. 6 or may be performed independently of the operations of FIG. 6.

Referring to FIG. 15, after the PDU session is set up, in step 1505 of a method 1500, the electronic device 101 detects that the preset PDU session is released.

In step 1510, the electronic device 101 identifies whether the SSC mode of the electronic device 101 is SSC mode 2 1402. When the SSC mode is SSC mode 2 1402, in step 1515, the electronic device 101 identifies whether the PDU session must be set again. When the PDU session must be set again, because the released PDU session must be set again to another PDU session by UPF re-location in SSC mode 2 1402, in step 1525, the electronic device 101 displays the fact that the network service is available.

When the SSC mode is not SSC mode 2 1402 in step 1510 or when the PDU session must not be set again in step 1515, because the electronic device 101 does not receive a network service via the released PDU session, the electronic device 101 may perform step 1520.

In step 1520, the electronic device 101 identifies whether the released PDU session is the last PDU session. When the released PDU session is not the last PDU session, because the electronic device 101 is capable of receiving a network service from the 5G core network 522 via another PDU session, in step 1525, the electronic device 101 displays the fact that the network service is available. When the released PDU session is the last PDU session, because the electronic device 101 is not capable of receiving a network service from the 5G core network 522, in step 1530, the electronic device 101 displays the fact that the network service is not available.

Figure 16:
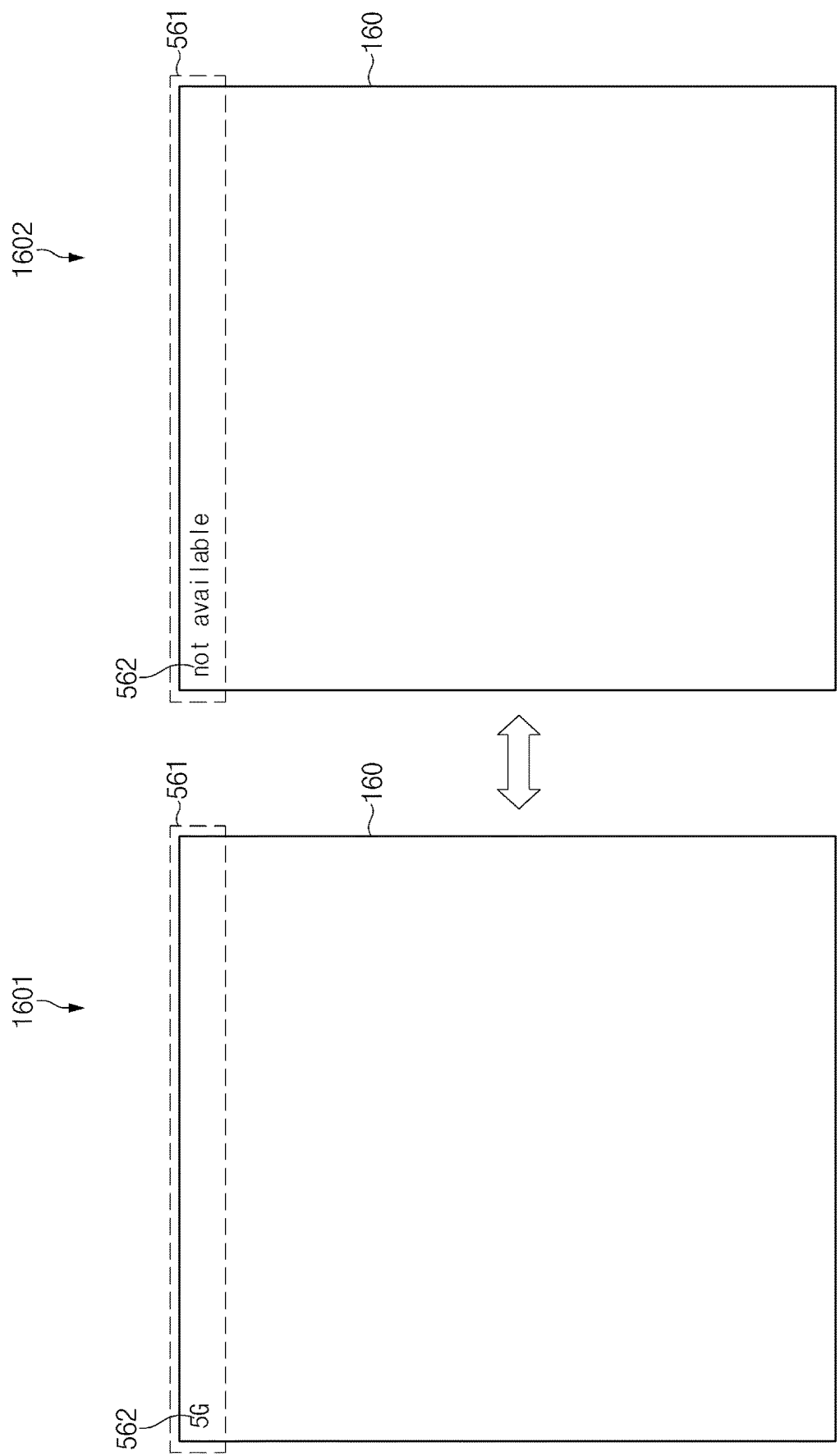
FIG. 16 illustrates a screen for displaying that a network service is available based on an SSC mode, according to an embodiment.

FIG. 16 illustrates a screen for displaying the fact that a network service is available based on an SSC mode, according to an embodiment.

Referring to a screen 1601 of FIG. 16, an electronic device 101 may display that a network service is available, via the display device 160. For example, the electronic device 101 may control the network indicator 562 to indicate a network type (e.g., one of 5G or 4G).

Referring to a screen 1602 of FIG. 16, the electronic device may display that a network service is not available, via the display device 160. For example, the electronic device 101 may control the network indicator 562 displayed on the status bar 561 to indicate that a network service is not available.

Figure 17:
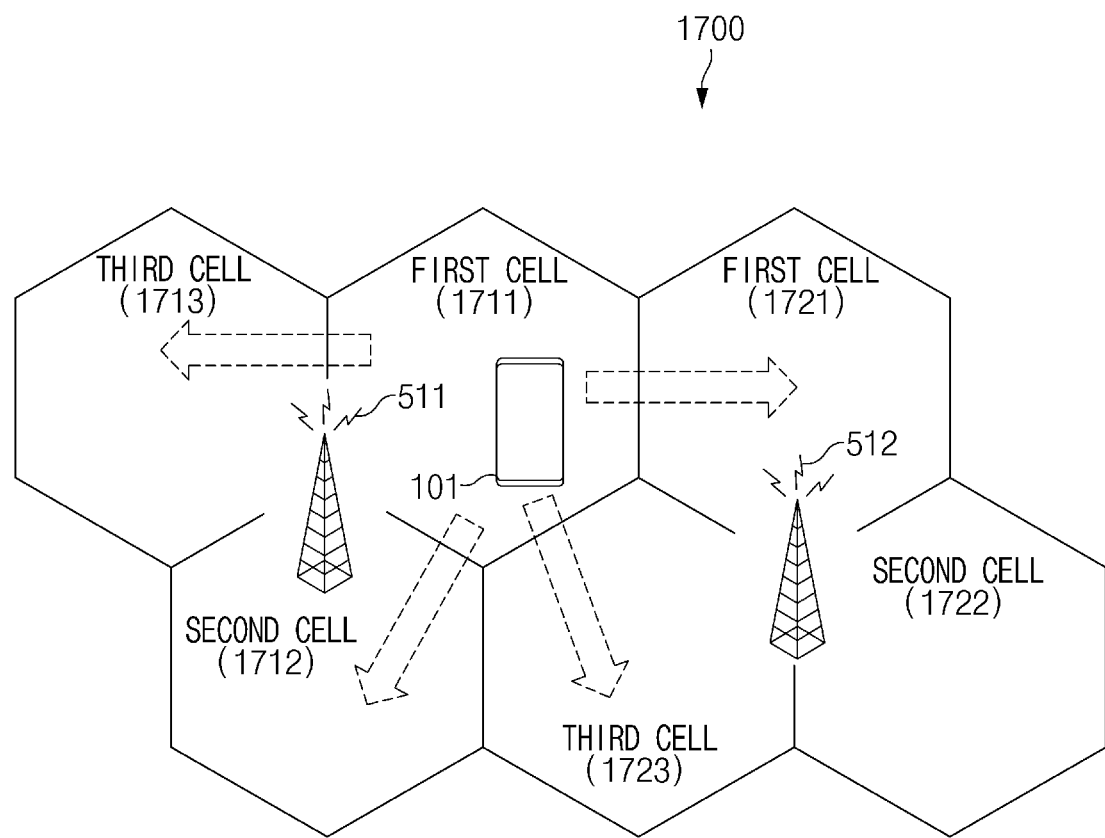
FIG. 17 illustrates a cell reselection procedure, according to an embodiment.

FIG. 17 describes a cell reselection procedure, according to an embodiment. The number of cells or the shape of a cell may not be limited to the exemplification illustrated in FIG. 17.

Referring to FIG. 17, in a network environment 1700, the electronic device 101 may camp on a first cell 1711 of the first base station 511 and then may move to a neighbor cell. Because the state of the wireless channel for each of cells is changed based on the mobility of the electronic device 101, the electronic device 101 may perform a cell reselection procedure of changing the cell to which the electronic device 101 is connected. For example, the electronic device 101 may reselect another cell (e.g., a second cell 1712 of the first base station 511 or a third cell 1713 of the first base station 511) of the same base station (e.g., the first base station 511) as the cell or may reselect the cell (e.g., a first cell 1721 of the second base station 512 or a third cell 1723 of the second base station 512) of another base station (e.g., the second base station 512) as the cell.

Figure 18:
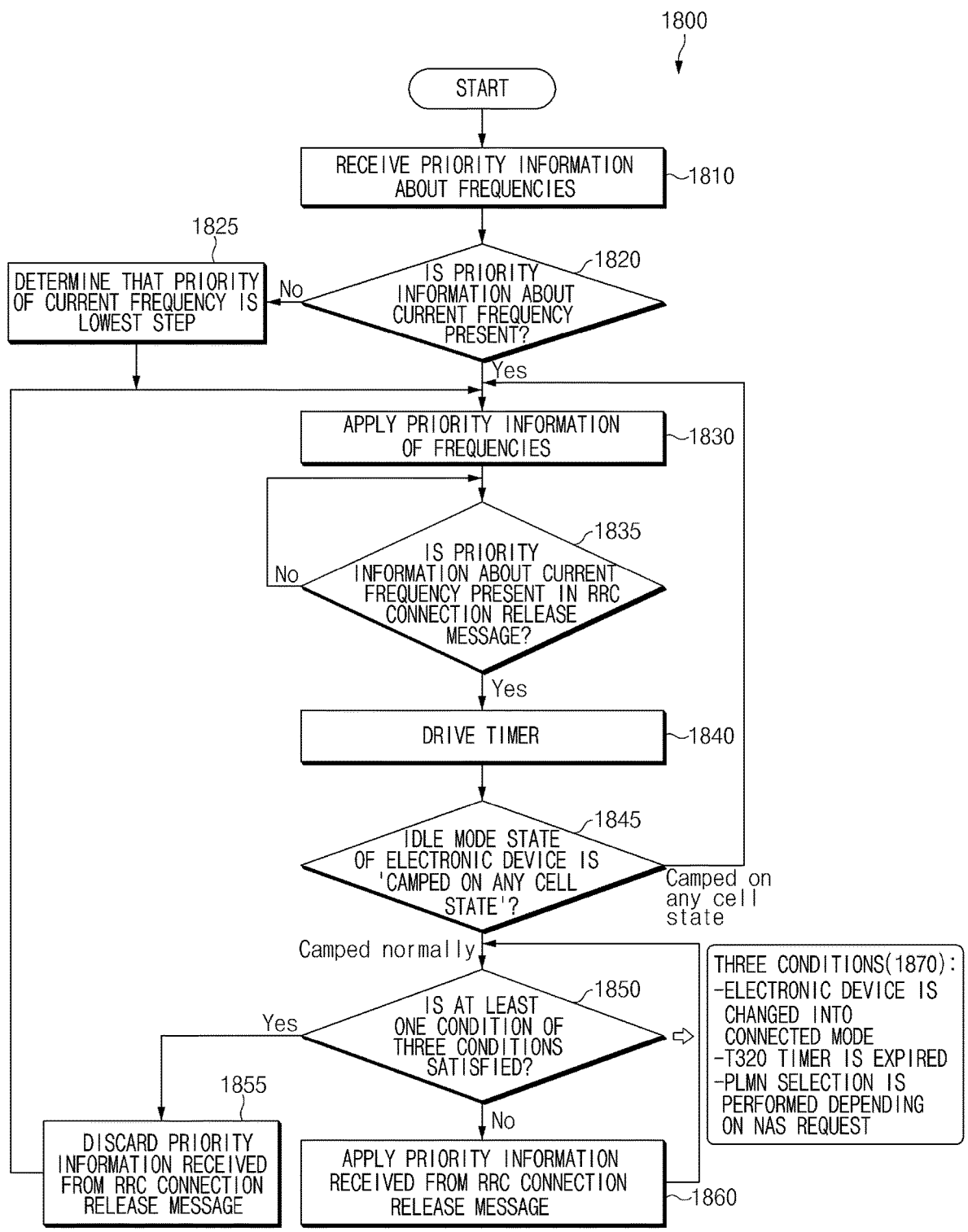
FIG. 18 illustrates an operation flowchart of an electronic device performing a cell reselection procedure, according to an embodiment.

FIG. 18 illustrates an operation flowchart of the electronic device 101 performing a cell reselection procedure, according to an embodiment.

A network (e.g., at least one the 4G core network 521 or the 5G core network 522 of FIG. 5A) may assign a priority to the electronic device 101 for each frequency to control the cell reselection of the electronic device 101 in an idle mode. For example, the electronic device 101 may receive priority information about two frequencies f1 and f2; when frequency f1 has higher priority than frequency f2, the electronic device 101 may be more likely to remain at frequency f1. Furthermore, even if the electronic device 101 remains at frequency f, when the channel state of frequency f2 is not good, the electronic device 101 may attempt to change the frequency to f1.

The priority information about a frequency may be broadcast through system information or may be provided to the electronic device 101 through an RRC connection release message that is for dedicated RRC signaling. Even though the electronic device 101 already has the priority information about frequencies through the system information, when the electronic device 101 receives UE-specific priority information through RRC signaling, the priority information of SIB may be ignored. The priority information of each frequency may be transmitted to the electronic device 101 through a cell reselection priority information element (cellReselectionPriority IE), and each frequency may receive, for example, a priority corresponding to one of eight steps. The frequencies between RATs may not receive the same priority. When the idle state of the electronic device 101 is "camped on any cell state", the electronic device 101 may apply frequency priority information received through the system information, and the priority information received through RRC signaling may be stored without being used.

The "cellReselectionPriority IE" may be optional IE and may not be present. In this case, the priority information about a frequency may not be assigned. At this time, the electronic device 101 may regard the priority of the corresponding frequency as the lowest step.

Referring to FIG. 18, in step 1810 of a method 1800, the electronic device 101 receives priority information about frequencies used for a plurality of base stations (or cells), via the system information. However, the priority information is not necessarily provided for all frequencies. For example, the priority information about the frequency of a serving cell on which the electronic device 101 currently camps may not be provided.

In step 1820, the electronic device 101 identifies the received priority information and whether the priority information about the frequency of the current serving cell is present. When the priority information about the frequency of the current serving cell is not provided to the electronic device 101, in step 1825, the electronic device 101 determines that the priority of the frequency of the serving cell is the lowest step. In step 1830, the electronic device 101 applies priority information for each of the frequencies.

When the electronic device 101 receives an RRC connection release message from the first base station 511, the electronic device 101 may change a connected mode to an idle mode. The priority information of a frequency may be included in an RRC message. The priority information may be different information depending on the electronic device 101 and may be applied preferentially to frequency priority information provided from the SIB. Accordingly, in step 1835, the electronic device 101 identifies whether the frequency priority information is present in the RRC message. When the frequency priority information is present, in step 1840, the electronic device 101 applies time value (or, referred as T320 defined by standard specification TS (technical specification) 36.331) included in the RRC message together to drive a single timer.

In step 1845, the electronic device 101 identifies whether the current idle mode state is "camped on any cell state" or "camped normally state". The "camped normally state" may mean a state where the electronic device 101 camps on a suitable cell. The suitable cell may be a cell capable of providing a normal service to the electronic device 101 and may include a cell that satisfies the following conditions.

A cell that corresponds to the selected PLMN, the registered PLMN, or one PLMN in an equivalent PLMN list.

A cell that is not barred.

A cell that satisfies a cell selection criterion.

A cell having the corresponding closed subscriber group (CSG) ID in the whitelist of a terminal in the case of a CSG cell.

A cell having the corresponding service ID in the whitelist of a terminal in the case of a cell designated such that a specific service is possible.

"Camped on any cell state" may mean a state where the electronic device 101 fails to camp on a suitable cell and camps on an acceptable cell. The normal service is impossible in the acceptable cell, and the electronic device 101 may try an emergency call. The acceptable cell may be a cell that satisfies the following conditions.

A cell that is not barred.

A cell that satisfies the cell selection criterion.

When the electronic device 101 is in the "camped on any cell state" idle state, the electronic device 101 may return to step 1830 and apply frequency priority information received from the SIB, instead of priority information received from an RRC connection release message. When the electronic device 101 is in the "camped normally" idle state, in step 1850, the electronic device 101 may determine whether at least one condition of the following three conditions 1870 is satisfied.

The three conditions 1870 include:
a condition that the electronic device 101 is changed into the connected mode,
a condition that T320 timer is expired, and
a condition that a PLMN selection procedure is performed depending on an NAS request.

When satisfying one condition of the above-described conditions, in step 1855, the electronic device 101 discards the priority information received from the RRC connection release message and returns to step 1830 to apply the frequency priority information received from the SIB. Otherwise, when none of the conditions are satisfied, in step 1860, the electronic device 101 applies the priority information received from the RRC connection release message.

Figure 19:
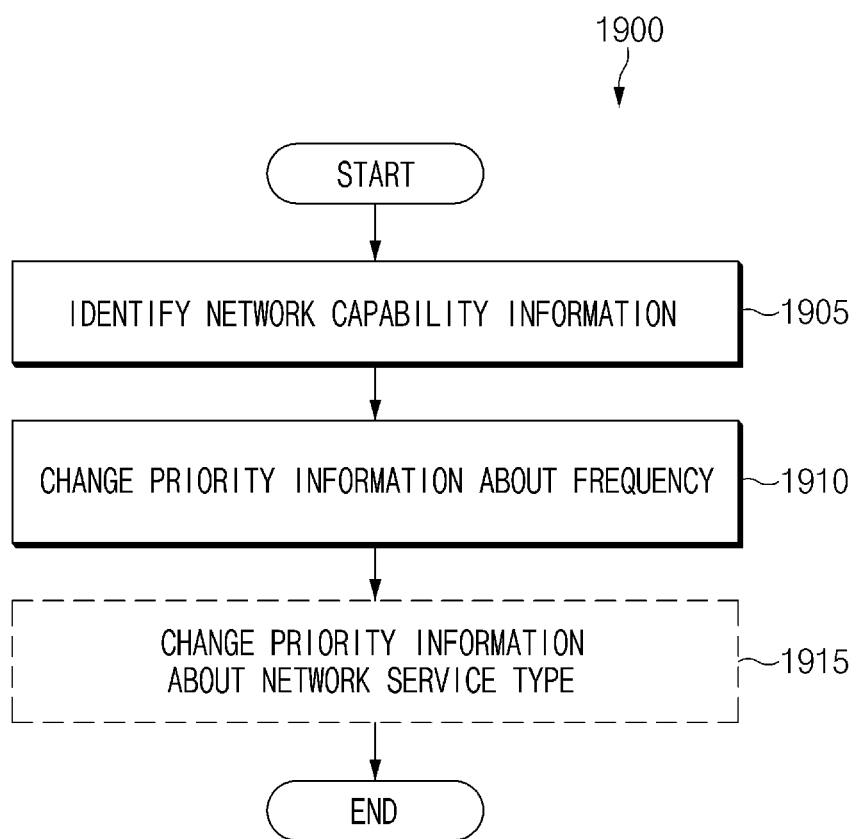
FIG. 19 illustrates an operation flowchart of an electronic device changing priority information, according to an embodiment.

FIG. 19 illustrates an operation flowchart of the electronic device 101 changing priority information, according to an embodiment. FIG. 19 may illustrate an operation after the electronic device 101 receives the priority information described in FIG. 18.

Referring to FIG. 19, in step 1905 of a method 1900, the electronic device 101 identifies network capability information. For example, the network capability information may be included in the SIB. The network capability information may further include information about a neighboring cell in addition to information described in FIG. 4A. The information about a neighboring cell may include a core network indicator of a neighboring cell. For example, the core network indicator may indicate that the neighboring cell is connected to the 4G core network 521, the 5G core network 522, or both the 4G core network 521 and the 5G core network 522. The core network indicator may be composed of a bit map. The bit map may comply with the values defined in Table 1 above. The information about a neighboring cell may indicate the core network to which the neighboring cell is connected in units of PLMN. A cell including the PLMN connected to the 5G core network 522 or a frequency list may be included in the SIB.

The information about a neighboring cell may further include network slice information of the neighboring cell. For example, the network slice information of the information about a neighboring cell may indicate a service, which the neighboring cell is capable of providing, from among eMBB, URLLC, and mMTC services. The network slice information may indicate the service defined by an operator in addition to the network slice defined by the 3GPP standard. The network slice information of the neighboring cell may be composed of a bit map. The bit map may comply with the values defined in Table 2 below.

TABLE 2

|     | eMBB | URLLC | mMTC |
| --- | --- | --- | --- |
| gNB | 0/1 | 0/1 | 0/1 |

In another embodiment, when the information indicating the service defined by the operator is included in the network slice information, a separate IE may be added.

In step 1910, the electronic device 101 changes priority information about a frequency (or cell). The electronic device 101 may change priority information based at least on a core network indicator. The priority of the first cell among neighboring cells may be higher than the priority of the second cell; the first cell may be connected to the 4G core network 521, and the second cell may be connected to the 5G core network 522. When the electronic device 101 prefers the 5G core network 522 by user settings or network settings, the electronic device 101 may identify the network type of a connectable core network based on the core network indicator of neighboring cells and may change priority information such that the priority of the second cell is higher than the priority of the first cell. When the serving cell in which the electronic device 101 is positioned is connected to the 5G core network 522, the electronic device 101 may prefer the 5G core network 522 to reduce an NAS procedure. The electronic device 101 may change the priority of the second cell to be the same as the priority of the serving cell or may change the priority of the second cell to be higher than the priority of the serving cell. The electronic device 101 may change the priority of the second cell to the highest priority. On the same principle, when the electronic device 101 prefers the 4G core network 521, the electronic device 101 may change the priority of the first cell to be high.

When the electronic device 101 camps on the cell supporting the 5G core network 522 by performing cell reselection, in step 1915, the electronic device 101 changes the priority information about the network service type. When the electronic device 101 camps on the cell supporting the 4G core network 521, the electronic device 101 may not perform step 1915.

In step 1915, the electronic device changes the priority information about the network service type or the priority information about a frequency (or cell), based on the network slice information. For example, when the electronic device 101 is registered as an eMBB service, the electronic device 101 may identify the cell supporting the eMBB service based on the network slice information and may change the priority of the identified cell to be high. The electronic device 101 may change the priority of the cell supporting the eMBB service to be the same as the priority of the serving cell or may change the priority of the cell supporting the eMBB service to be higher than the priority of the serving cell. The electronic device 101 may change the priority of the cell supporting the eMBB service to the highest priority.

In step 1910, the electronic device 101 changes priority information about a frequency (or cell). The electronic device 101 may change priority information based at least on the network slice information of the neighboring cell. For example, the priority of the first cell among neighboring cells may be higher than the priority of the second cell, and the first cell may provide the eMBB service and the second cell may provide the eMBB and URLLC services. When the electronic device 101 prefers the URLLC service by user settings or network settings, the electronic device 101 may identify a providable network slice type based on the network slice information of neighboring cells and may change priority information such that the priority of the second cell is higher than the priority of the first cell. When the serving cell in which the electronic device 101 is positioned is capable of providing the URLLC service, the electronic device 101 may prefer a cell capable of providing the URLLC service to reduce the NAS procedure. The electronic device 101 may change the priority of the second cell to be the same as the priority of the serving cell or may change the priority of the second cell to be higher than the priority of the serving cell. The electronic device 101 may change the priority of the second cell to the highest priority.

Additionally or alternatively, when the electronic device 101 prefers the eMBB service, the electronic device 101 may change the priorities of the first cell and the second cell to be high.

The electronic device 101 performing an operation of changing the priority of a frequency (or cell) based on the network slice information in step 1910 may not perform step 1915.

Figure 20:
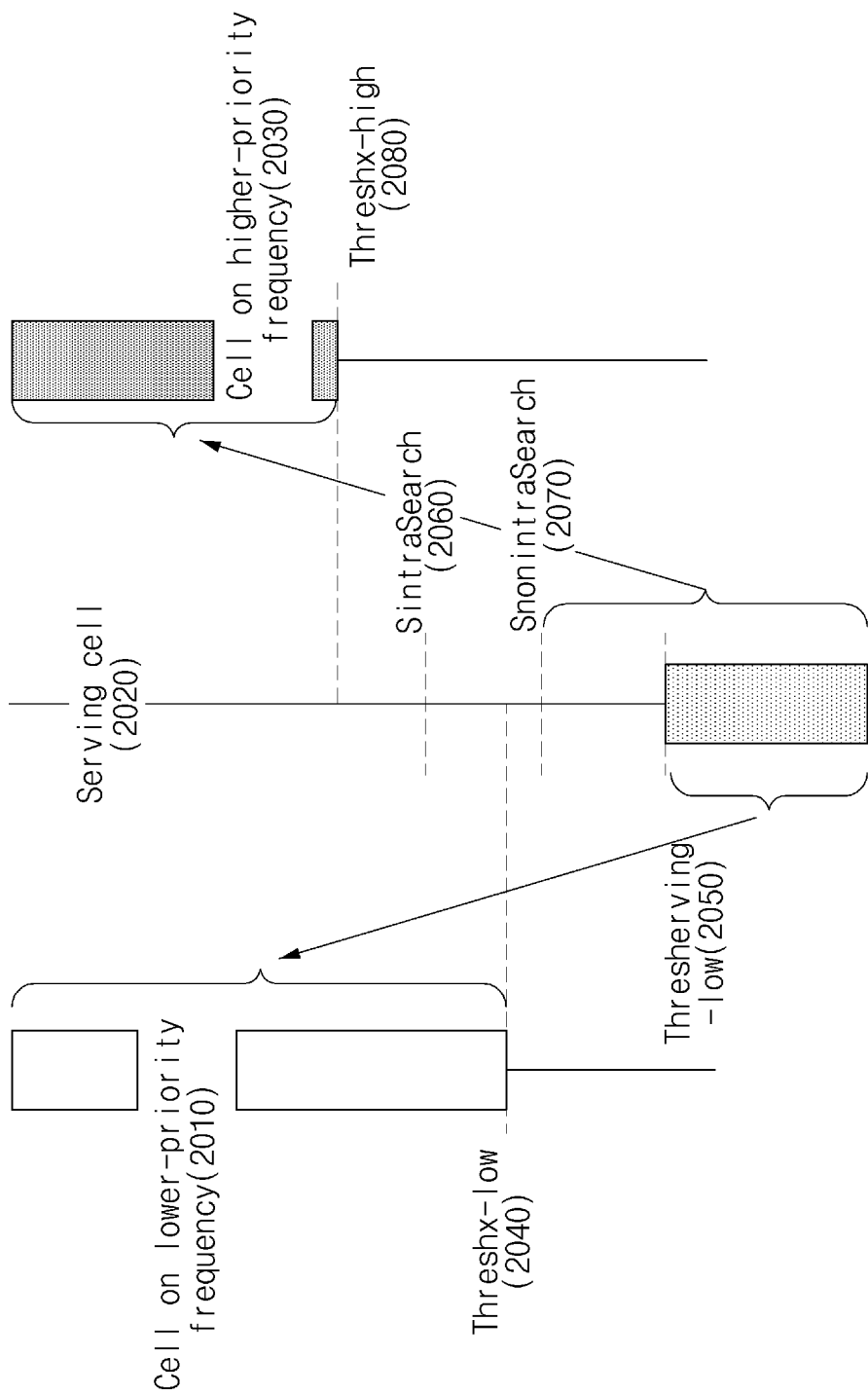
FIG. 20 illustrates one example of measuring a frequency, according to an embodiment.
Figure 21A:
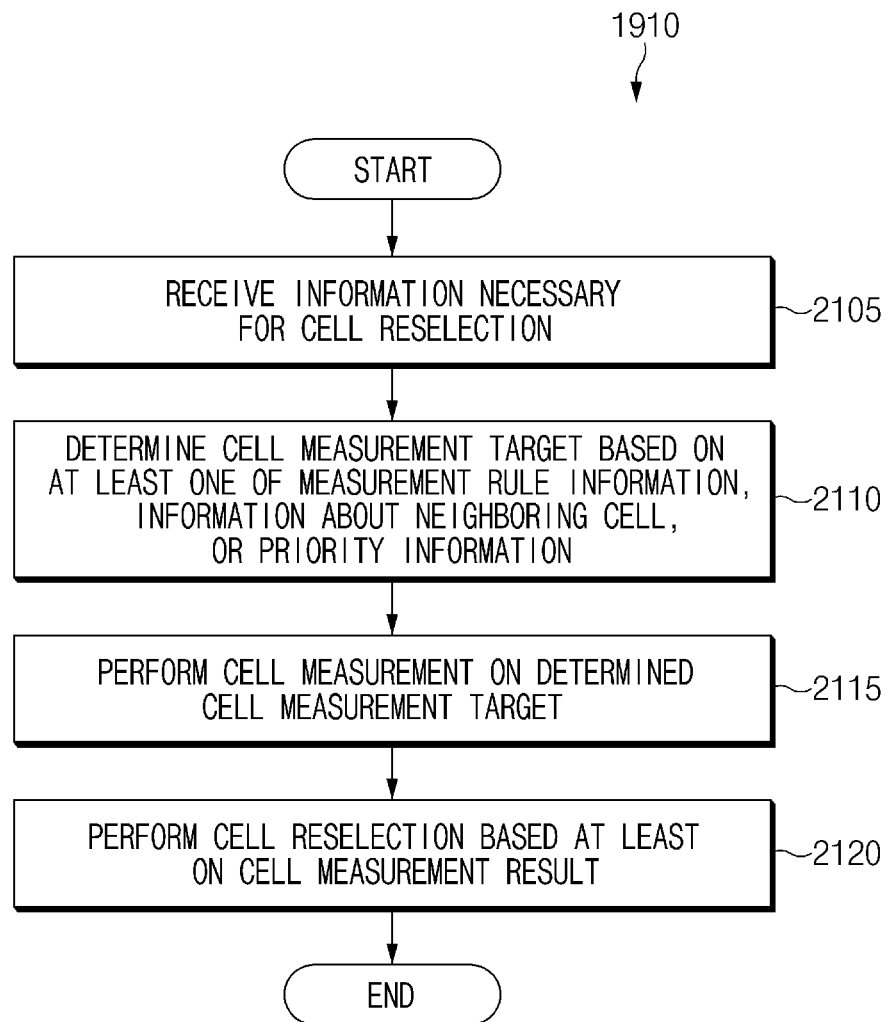
FIG. 21A illustrates an operation flowchart of an electronic device performing cell measurement on a cell measurement target, according to an embodiment.
Figure 21B:
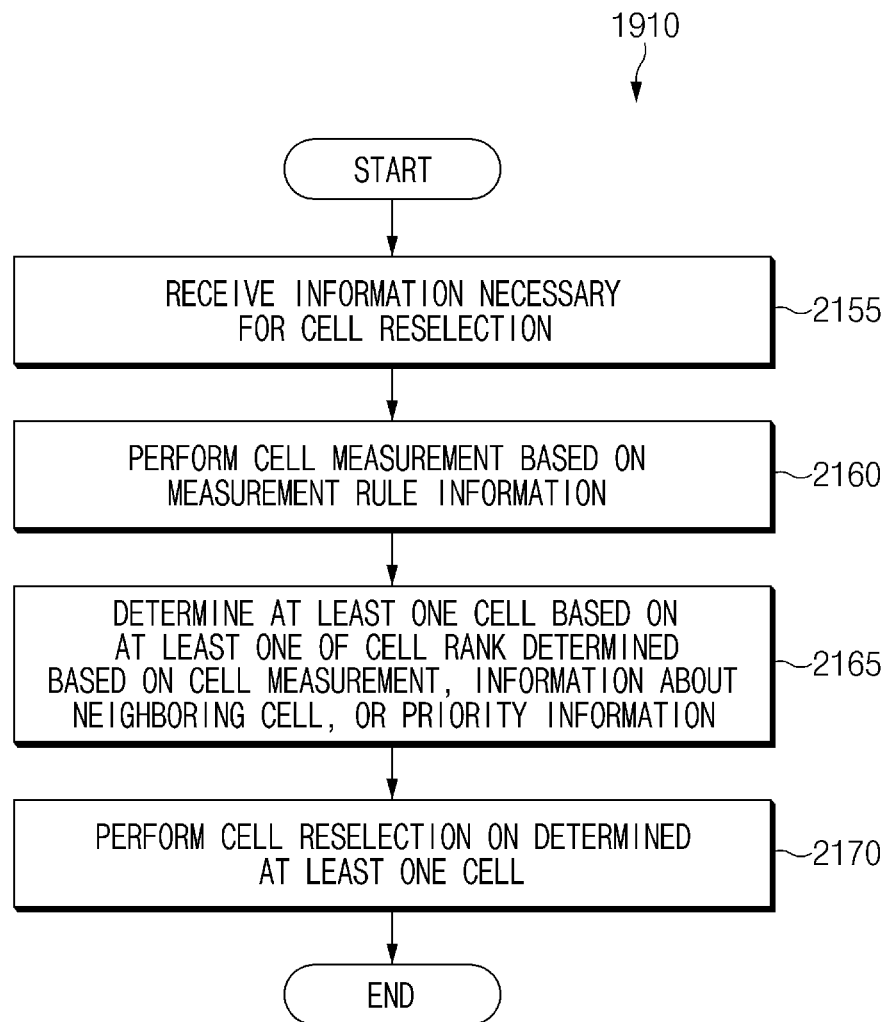
FIG. 21B illustrates an operation flowchart of an electronic device determining at least one cell based on cell measurement, according to an embodiment.

The electronic device 101 may reselect a cell based on not only the network capability information but also signal strength, in the cell reselection procedure of FIGS. 20 to 21B, which describe reselecting a cell based on signal strength.

FIG. 20 illustrates an example of measuring a frequency, according to an embodiment.

Referring to FIG. 20, frequency priority information may affect the measurement of the specific frequency of the electronic device 101. The terminal may always perform measurement on a frequency 2030 having a priority higher than a current serving cell 2020. In the case in which the priority of the frequency is the same as the frequency of the serving cell 2020 or the other frequency 2010 (intra-frequency), the priority of which is not higher than the frequency of the serving cell 2020, the measurement may not always be performed on the corresponding frequency to save the power of the electronic device 101. At this time, the frequency 2010, the priority of which is not higher than the frequency of the serving cell 2020 may be measured when the quality of service (QoS) channel of the serving cell 2020 is not less than a specific threshold value. For example, the cell reselection may be performed to move to a cell in which a channel state is good; when the channel QoS of the current serving cell 2020 is good, there may be no reason to move to the frequency 2010 having the same or lower priority. Accordingly, for the purpose of reducing the power consumption of the electronic device 101 due to unnecessary channel measurement, it may be possible to determine whether to perform a measurement based on a specific threshold value. In the case of the frequency being the same as the frequency of the serving cell 2020 (intra-frequency), when the QoS of the serving cell 2020 is not higher than the specific first threshold value (e.g., Sintrasearch) 2060, the electronic device 101 may perform a channel measurement on other cells of the intra-frequency. Moreover, with respect to the other frequency 2010, the priority of which is not higher than the frequency of the serving cell 2020, when the QoS of the serving cell is not higher than the specific second threshold value (e.g., Snonintrasearch) 2070, the electronic device 101 may perform channel measurement on the cells 2010 of the corresponding other frequencies. For example, the channel QoS may consider reference signal received power (RSRP) and reference signal received quality (RSRQ).

When the channel QoS of a cell 2030 of a frequency with a high priority during channel measurement is higher than a specific third threshold value (e.g., ThreshX-high) 2080, the electronic device 101 may reselect the cell of a frequency with a high priority as a serving cell. When the QoS channel of the cell 2010 of a frequency with a low priority is higher than the specific fourth threshold value (e.g., ThreshX-low) 2040 and the QoS of the serving cell 2020 is lower than the specific fifth threshold value (e.g., ThreshServing-low) 2050, the electronic device 101 may reselect the cell 2010 of a frequency with a low priority as a serving cell. For example, the electronic device 101 may always perform inter-frequency/RAT measurement on a frequency with a high priority or RAT 2030 regardless of measurement signal strength for the serving cell 2020. When the measurement signal strength for the serving cell 2020 is lower than SintraSearch 2060, the electronic device 101 may perform intra-frequency measurement. When the measurement signal strength for the serving cell 2020 is lower than SnonintraSearch 2070, the electronic device 101 may perform the inter-frequency/RAT measurement on the frequency 2010, the priority of which is equal to or lower than the frequency of the current serving cell. The measurement may be stepwise triggered to reduce the power consumption of the electronic device 101 due to the measurement of the surrounding cells. When the channel QoS of the cell 2030 of a frequency with a high priority is higher than the specific threshold value ThreshX-high 2080, the electronic device 101 may reselect the cell 2030 of a frequency with a high priority as the serving cell. When the channel QoS of the cell 2010 of a frequency with a low priority is higher than the specific threshold value ThreshX-low 2040 and the QoS of the serving cell 2020 is lower than the ThreshServing-low 2050, the electronic device 101 may reselect the cell of a frequency with a low priority as the serving cell.

RSRP or RSRQ may be considered during cell reselection. In the case of using RSRQ, a base station may separately provide a threshold value such as Threshserving-lowQ, ThreshX-lowQ, or ThreshX-highQ, to the electronic device 101 in a broadcast manner. When RSRP is used, Threshserving-lowP, ThreshX-lowP, and ThreshX-highP parameters may be used to distinguish from the variables in the disclosure.

FIG. 21A illustrates an operation flowchart of the electronic device 101 performing cell measurement on a cell measurement target, according to an embodiment.

Referring to FIG. 21A, in step 2105, the electronic device 101 receives information necessary for cell reselection, from the first cell 1711. Information necessary for cell reselection may include measurement rule information used to determine a cell measurement target. The measurement rule information may indicate the priority for the cell reselection determined by the network to which the electronic device 101 is connected, or may include the priority determined by the network during inter-frequency measurement and intra-frequency measurement. The information necessary for cell reselection may include information about a neighboring cell. The information about a neighboring cell may include at least one or more of frequency information of a neighboring cell, radio access information (e.g., at least one of global system for mobile communications (GSM), wideband coded division multiple access (WCDMA), coded division multiple access 2000x (CDMA 2000x), LTE, or 5G as information about a communication scheme between a base station and a terminal) of a neighboring cell, network service type information capable of being supported by a neighboring cell, and the core network indicator of a neighboring cell.

In step 2110, the electronic device 101 determines the cell measurement target based on at least one of the measurement rule information, the information about a neighboring cell, or the priority information. For example, when the electronic device 101 supports only the 4G core network 521 or the 5G core network 522, the electronic device 101 may determine a cell supporting the 4G core network 521 or the 5G core network 522 among cells satisfying the measurement rule as the cell measurement target. Additionally or alternatively, when the electronic device 101 supports both the 4G core network 521 and the 5G core network 522, the electronic device 101 may determine the cell measurement target based on the priority information about a frequency described in FIG. 19. Further, the electronic device 101 may determine at least one cell based on the service preferred by the electronic device 101. When the electronic device 101 prefers the URLLC service, the electronic device 101 may determine at least one cell measurement target, based on the priority information about a frequency described in FIG. 19.

In step 2115, the electronic device 101 performs cell measurement on the determined cell measurement target, based on the priority information determined in FIG. 18. For example, the electronic device 101 may change the priority information based on the method described in FIG. 18. The electronic device 101 may measure the strength of the signal received from cells corresponding to the cell measurement target.

In step 2120, the electronic device 101 performs cell reselection based at least on the cell measurement result. For example, the electronic device 101 may determine a cell rank based on the cell measurement result and may perform cell reselection based on the cell rank and the measurement rule received in step 2105.

FIG. 21B illustrates an operation flowchart of the electronic device 101 determining at least one cell based on cell measurement, according to an embodiment.

Referring to FIG. 21B, in step 2155, the electronic device 101 receives information necessary for cell reselection from the first cell 1711. Information necessary for cell reselection may include measurement rule information used to determine a cell measurement target. The measurement rule information may indicate the priority for the cell reselection determined by the network to which the electronic device 101 is connected, or may include the priority determined by the network during inter-frequency measurement and intra-frequency measurement. The information necessary for cell reselection may include information about a neighboring cell. The information about a neighboring cell may include at least one or more of frequency information of a neighboring cell, radio access information (e.g., at least one of GSM, WCDMA, CDMA 2000x, LTE, or 5G as information about a communication scheme between a base station and a terminal) of a neighboring cell, network service type information capable of being supported by a neighboring cell, and the core network indicator of a neighboring cell.

In step 2160, the electronic device 101 performs cell measurement based on measurement rule information.

In step 2165, the electronic device 101 determines at least one cell based on at least one of the cell rank determined based on the cell measurement, the information about a neighboring cell, or the priority information. For example, the electronic device 101 may determine at least one cell based on the core network capable of being supported by the electronic device 101. When the electronic device 101 supports both the 4G core network 511 and the 5G core network 522, the electronic device 101 may determine at least one cell based on the priority information about the frequency described in FIG. 19. Additionally or alternatively, the electronic device 101 may determine at least one cell based on the service preferred by the electronic device 101. When the electronic device 101 prefers the URLLC service, the electronic device 101 may determine at least one cell measurement target, based on the priority information about a frequency described in FIG. 19.

In step 2170, the electronic device 101 performs cell reselection on the determined at least one cell. Before performing the cell reselection, the electronic device 101 may select a cell supporting the 5G core network 522 based on the method illustrated in FIGS. 21A and 21B.

Figure 22:
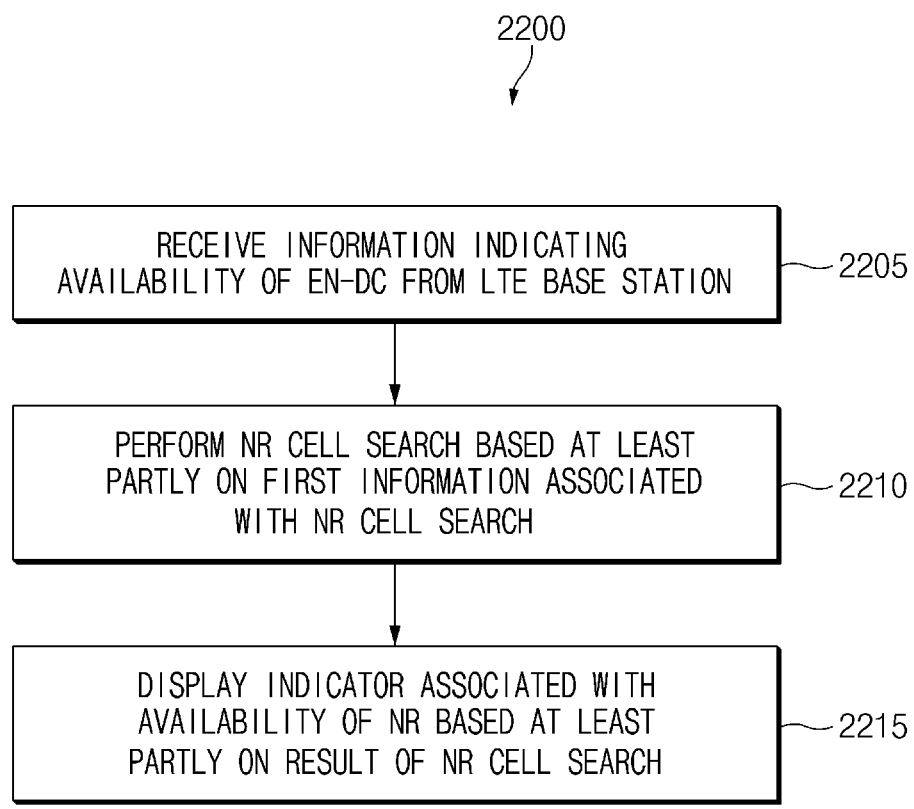
FIG. 22 illustrates an operation flowchart of an electronic device displaying an indicator based on an NR cell searching result, according to an embodiment.
Figure 23:
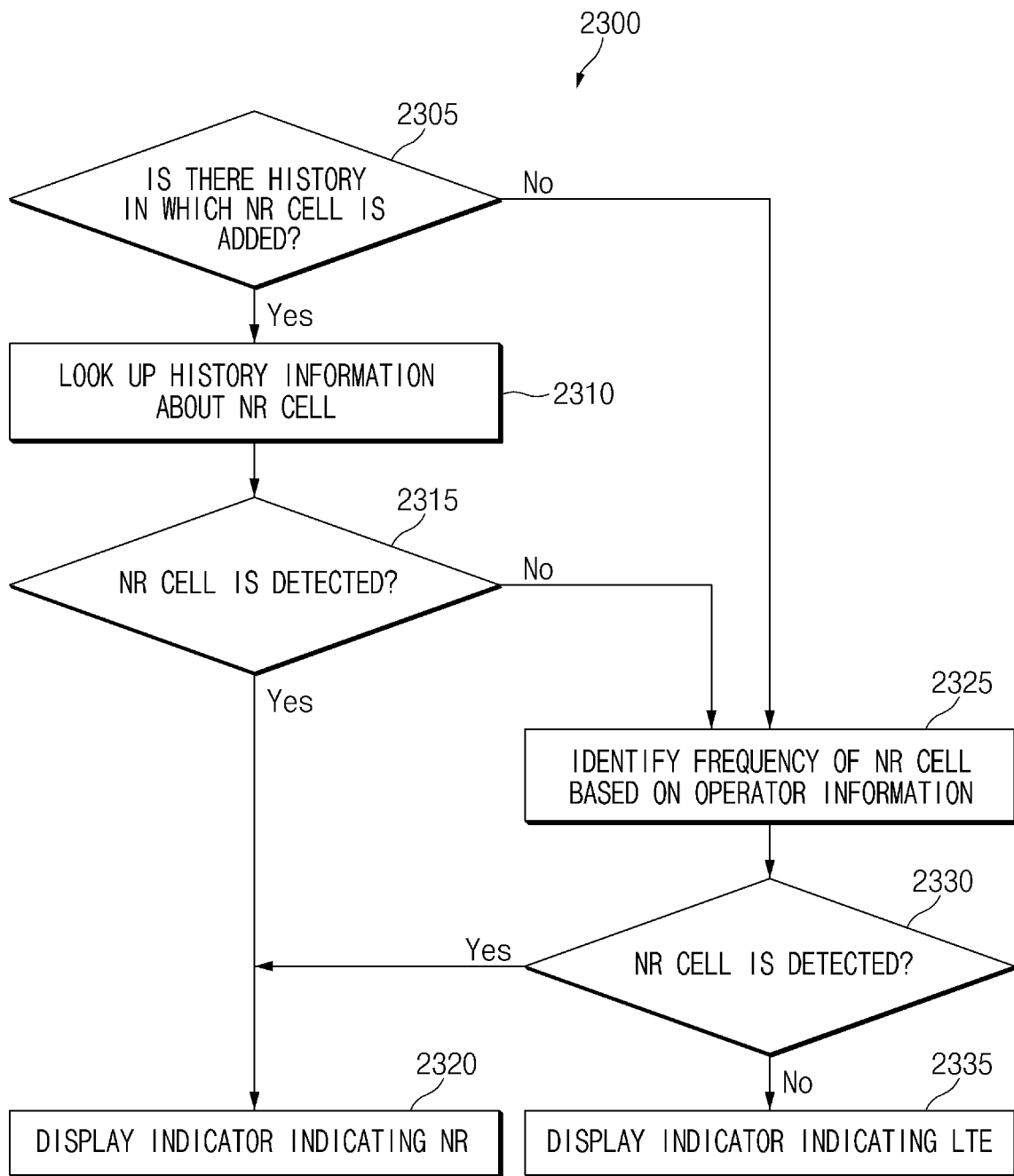
FIG. 23 illustrates an operation flowchart of an electronic device displaying an indicator based on an NR cell searching result, according to an embodiment.
Figure 24:
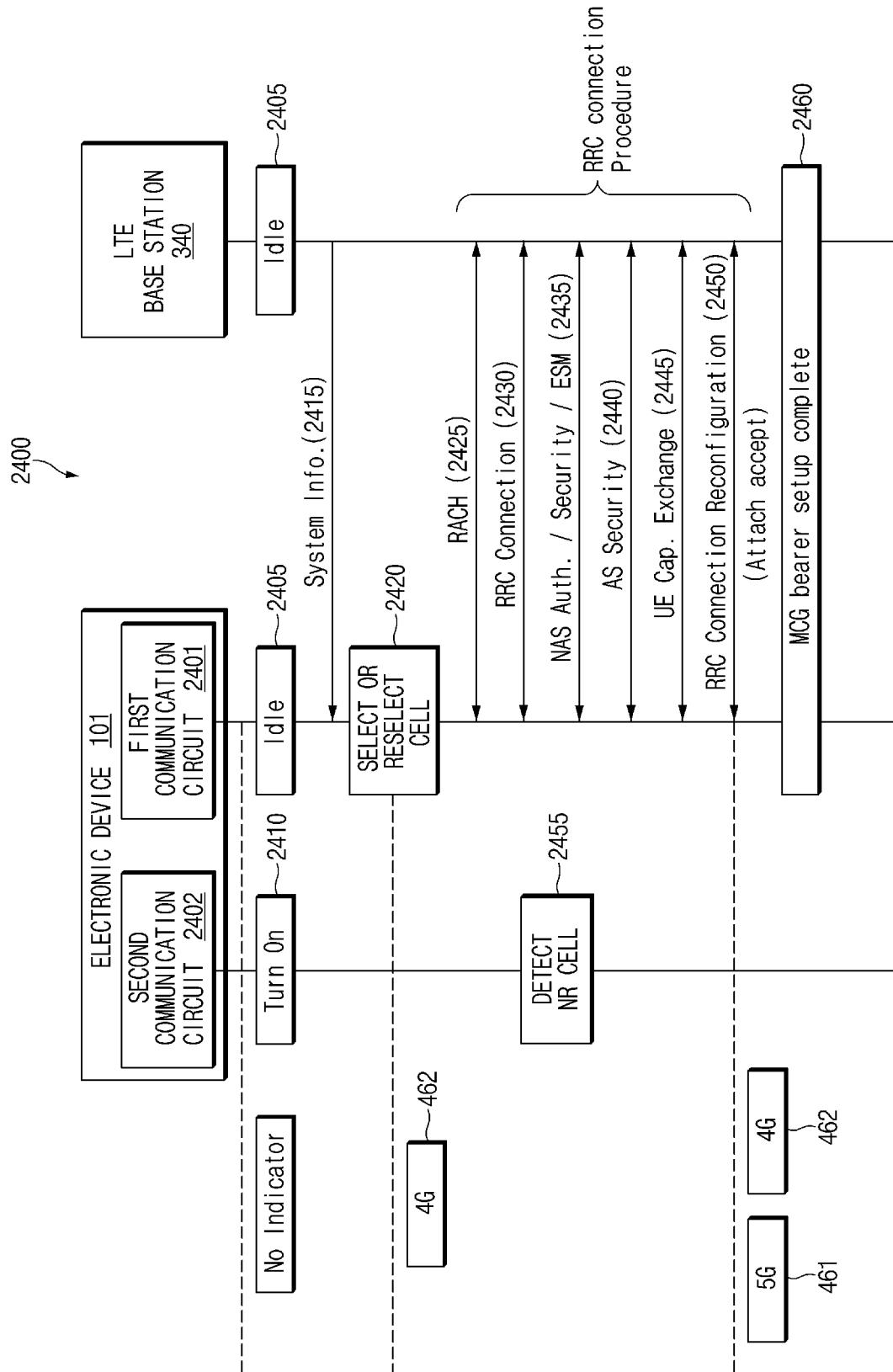
FIG. 24 illustrates a signal flowchart for displaying an indicator based on an NR cell searching result, according to an embodiment.

FIGS. 22 to 24 describe embodiments of displaying an indicator based on the first condition described in FIG. 4A.

FIG. 22 illustrates an operation flowchart 2200 of the electronic device 101 displaying an indicator based on the NR cell searching result, according to an embodiment. The operations included in the operation flowchart 2200 and other operation flowcharts may be performed by the electronic device 101; alternatively, the processor 120 may execute instructions stored in the memory 130 of the electronic device 101, and thus the operations may be performed.

Referring to FIG. 22, in step 2205, the electronic device 101 receives information indicating the availability of EN-DC from the LTE base station 340 (or the first base station 511 of FIG. 5A). For example, the information indicating the availability of EN-DC may include the upper layer indication included in SIB2.

In step 2210, the electronic device 101 performs NR cell searching based at least partly on first information associated with the NR cell searching, which is pre-stored in the memory 130. When the electronic device 101 is in an RRC_CONNECTED state with the LTE base station 340 or an RRC_IDLE state, the electronic device 101 performs the NR cell searching. For example, the first information may include at least one MO included in the measurement setup information received from the existing LTE base station 340 or the NR base station 350 (or the second base station 512 of FIG. 5B). The electronic device 101 may search for an NR cell based on resource information indicated by MO.

In step 2215, the electronic device 101 displays an indicator (e.g., the first indicator 461-1 of FIG. 4A) associated with the availability of NR, based at least partly on the result of the NR cell searching. For example, the electronic device 101 may display the indicator associated with the availability of NR on a display in response to the fact that the NR cell is detected.

FIG. 23 illustrates an operation flowchart 2300 of the electronic device 101 displaying an indicator based on the NR cell searching result, according to an embodiment.

The first information may include other pieces of information in addition to at least one MO included in the measurement setup information received from the existing LTE base station 340 or the NR base station 350. For example, when there is an NR base station history that has been detected or added based on the LTE base station 340 to which the electronic device 101 was connected, the first information may further include history information about the NR cell that was previously detected or added. Additionally or alternatively, the first information may further include information associated with the operator of the LTE network. The history information about the NR cell and the information associated with the operator may include information illustrated in Table 3 below.

TABLE 3

| History information | Operator information |
|---|---|
| LTE cell identifier: Identifier of NR cell, which has been used as EN-DC in LTE cell; Information (e.g., MO) for signal measurement of NR cell; and Signal measurement result of NR cell | Communication operator information associated with NR cell; Frequency information of NR cell; Band information of NR cell; and Channel information (e.g., absolute radio-frequency channel number (ARFCN) and Global Synchronization Raster Channel (GSCN)) about an NR cell |

Referring to FIG. 23, in step 2305, the electronic device 101 identifies whether there is a history in which an NR cell is added. According to another embodiment, in step 2305, the electronic device 101 identifies history information based on the LTE base station 340 to which the electronic device 101 is connected. For example, when the LTE base station 340 is connected as MN, the electronic device 101 identifies information of the NR base station 350 that has been connected as SN.

When the history in which an NR cell is added is present, in step 2310, the electronic device 101 identifies information (e.g., the identifier of an NR cell or the frequency indicated by an MO) included in the history information by looking up the history information illustrated in Table 3 among first information. When the history in which an NR cell is added is not present ("NO"), in step 2325, the electronic device 101 identifies the frequency of the NR cell based on the operator information illustrated in Table 1.

In step 2315, the electronic device 101 attempts to detect the NR cell based on the found history information and identifies whether the NR cell is detected.

When NR cell is detected ("YES"), in step 2320, the electronic device 101 displays an indicator (e.g., the first indicator 461-1 of FIG. 4A) indicating NR. The electronic device 101 may display the first indicator 461-1 differently based on the operating frequency of the detected NR cell. For example, the electronic device 101 may display the first indicator 461-1 or the fifth indicator 461-3 of FIG. 4C based on whether the operating frequency of the detected NR cell When the NR cell is not detected ("NO"), in step 2325, the electronic device 101 identifies the frequency of an NR cell based on the operator information.

In step 2330, the electronic device 101 attempts to detect the NR cell, using the frequency of the NR cell identified through the operator information and identifies whether the NR cell is detected. When the NR cell is detected ("YES"), in step 2320, the electronic device 101 displays an indicator indicating NR. When the NR cell is not detected ("NO"), in step 2335, the electronic device 101 displays an indicator (e.g., the second indicator 462 of FIG. 4A) indicating LTE.

The electronic device 101 may use a piece of information of the MO, history information, and operator information included in the first information or may sequentially use two or more pieces of information of the MO, history information, and operator information included in the first information. The electronic device 101 may select at least a piece of information used for cell searching, based on at least one of the complexity of cell searching or the battery requirement of the electronic device 101.

The electronic device 101 may store the second information associated with an indicator display policy in addition to the first information, in the memory 130. The second information may define the condition for displaying an indicator. The first table information that defines the condition for displaying an indicator based on the first condition in the second information may be expressed as Table 4 below.

TABLE 4

| | | | | | Operator's policy | | | |
|---|---|---|---|---|---|---|---|---|
| | | | | | Upper Layer Indication is used | | Upper Layer Indication is not used | |
| | | | | | Operation of electronic device | | | |
| | | | | | NR measurement in RRC_IDLE is not supported | NR measurement in RRC_IDLE is supported | NR measurement in RRC_IDLE is not supported | NR measurement in RRC_IDLE is supported |
| State 1 | | Restricted DCNR bit = 1 | | | 4G | 4G | 4G | 4G |
| State 2 | Restricted | Upper Layer Indication = 0 | | | 4G | 4G | — | — |
| State 3 | DCNR = 0 | Upper Layer Indication = 1 | RRC_IDLE | No detection of NR cell | 4G | 4G | 4G | 4G |
| State 4 | | | | detection of NR cell | — | 5G | — | 5G |
| State 5 | | | RRC_Connected | no detection of NR cell | 4G | 4G | 4G | 4G |
| State 6 | | | | detection of NR cell | No SN addition | 5G | 5G | 5G | 5G |
| State 7 | | | | | SN addition | 5G | 5G | 5G | 5G | is greater than 6 GHz. The electronic device 101 may display the first indicator 461 differently based on whether to camp on the detected NR cell or whether data is exchanged in the detected NR cell by displaying the first indicator 461-1 or the third indicator 461-2 of FIG. 4B. The electronic device 101 may display a plurality of first indicators 461-1 based on the operating frequency of the detected NR cell and whether the electronic device 101 camps on the detected NR cell or whether the electronic device 101 exchanges data in the detected NR cell. Additionally, the electronic device 101 may display the fifth indicator 461-3 and the first indicator 461-1 or the third indicator 461-2, in combination and/or together.

Referring to Table 4, the electronic device 101 may identify the value indicated by a restrict DCNR bit. When the restrict DCNR bit is "1" (state 1), because EN-DC is not possible in the LTE base station 340, the electronic device 101 may display the second indicator 462 indicating 4G, regardless of other information.

When the restrict DCNR bit is "0", the electronic device 101 may identify the value indicated by the upper layer indication. When the bit value of the upper layer indication is "0" (state 2) and the upper layer indication is used by the operator's policy, the electronic device 101 may display the second indicator 462 indicating 4G, regardless of other information.

When the restrict DCNR bit is "0" and the bit value of the upper layer indication is "1", the electronic device 101 may identify whether the electronic device 101 supports NR cell measurement in an RRC_IDLE state. Even though the electronic device 101 supports NR cell measurement in the RRC_IDLE state, when the NR cell is not detected in the RRC_IDLE state (state 3), the electronic device 101 may display the second indicator 462 indicating 4G. When the electronic device 101 supports NR cell measurement in the RRC_IDLE state and the NR cell is detected in the RRC_IDLE state (state 4), the electronic device 101 may display the first indicator 461 indicating 5G. The electronic device 101 may detect (or search for) the NR cell based on the first information.

Even though the electronic device 101 does not support NR cell measurement in the RRC_IDLE state, the electronic device 101 may display an indicator based on whether the NR cell is detected in the RRC_CONNECTED state. For example, when the NR cell is not detected in the RRC_CO-NNECTED state, the electronic device 101 may display the second indicator 462 indicating 4G; when an NR cell is detected in the RRC_CONNECTED state, the electronic device 101 may display the first indicator 461-1 indicating 5G.

FIG. 24 illustrates a signal flowchart 2400 for displaying an indicator based on an NR cell searching result, according to an embodiment.

Referring to FIG. 24, the electronic device 101 includes a first communication circuit 2401 and a second communication circuit 2402. The first communication circuit 2401 may support the 4G network. For example, the first communication circuit 2401 may include at least one of the first CP 212, the first RFIC 222, the first RFFE 232, the second RFIC 224, or the second RFFE 234 of FIG. 2. The second communication circuit 2402 may support the 5G network. For example, the second communication circuit 2402 may include at least one of the second CP 214, the second RFIC 224, the second RFFE 234, the third RFIC 226, or the fourth RFIC 228 of FIG. 2. The first communication circuit 2401 and the second communication circuit 2402 may be in a configuration in which software is not separated from at least some hardware (e.g., a module or chip) or may be in a configuration in which hardware and software are separated.

When the electronic device 101 is powered-on, the first communication circuit 2401 and the second communication circuit 2402 may be in a turn-on state 2410, and the electronic device 101 (or the first communication circuit 2401) and the LTE base station 340 may be an RRC_IDLE state 2405. Because the electronic device 101 is not connected to a base station or a cell is not detected, the electronic device 101 may not display an indicator.

In step 2415, the LTE base station 340 may broadcast system information. For example, the system information may be at least one of the MIB, SIB1, or SIB2, which is defined by 3GPP standard specification. For example, the system information may include an upper layer indication. The upper layer indication may indicate whether EN-DC is possible in the LTE base station 340.

In step 2420, the first communication circuit 2401 may select the LTE cell of the LTE base station 340 based on the received system information. Additionally or alternatively, when the electronic device 101 is positioned in the cell of another LTE base station, the first communication circuit 2401 may reselect the LTE cell of the LTE base station 340. When the LTE cell of the LTE base station 340 is detected, the electronic device 101 may display the second indicator 462 indicating 4G. Even though the LTE cell is detected, it is possible that the electronic device 101 may not display the second indicator 462 until the electronic device 101 and the LTE base station 340 become in an RRC_CONNECTED state (e.g., upon realizing step 2460).

When the LTE cell is selected (or reselected), the first communication circuit 2401 may perform an RRC connection procedure (e.g., step 2425 to step 2450) with the LTE base station 340 based on 3GPP standard specification. When the RRC connection procedure is completed, the setup (or establishment) of master cell group (MCG) bearer between the first communication circuit 2401 and the LTE base station 340 may be completed (upon realizing step 2460).

In step 2455, the second communication circuit 2402 detects an NR cell. The second communication circuit 2402 may detect the NR cell based on information (e.g., the first information) pre-stored in the memory 130. In this case, the NR cell may be detected while the RRC connection procedure is performed or may be detected after an RRC connection procedure is completed. The second communication circuit 2402 may detect the NR cell based on the MO received from the LTE base station 340. For example, in step 2450, the LTE base station 340 may transmit an RRC connection reconfiguration or attach accept message including the MO. In this case, the second communication circuit 2402 may detect the NR cell based on the MO received in step 2450.

The electronic device 101 may display the first indicator 461-1 or the second indicator 462 based on the second information and whether an NR cell is detected.

For example, when the upper layer indication included in the system information indicates that EN-DC is possible, the restrict DCNR bit included in the attach accept message indicates that EN-DC is possible, and the NR cell is detected, and the electronic device 101 may display the first indicator 461. When the NR cell is detected before completion of the RRC connection procedure, the electronic device 101 may display the first indicator 461 in response to receiving the attach accept message indicating that the restrict DCNR bit indicates "0". When the NR cell is detected after the completion of the RRC connection procedure, the electronic device 101 may display the first indicator 461 in response to the fact that the NR cell is detected.

When the upper layer indication is not used by the operator's policy, the electronic device 101 may display the first indicator 461 based on whether the NR cell is detected and the value of the restrict DCNR bit.

When the NR cell is not detected, when the attach accept message in which the restrict DCNR bit indicates "1", or when the upper layer indication is not used by the operator's policy and, at the same time, the system information in which the upper layer indication is "0" is received, the electronic device 101 may display the second indicator 462.

Figure 25:
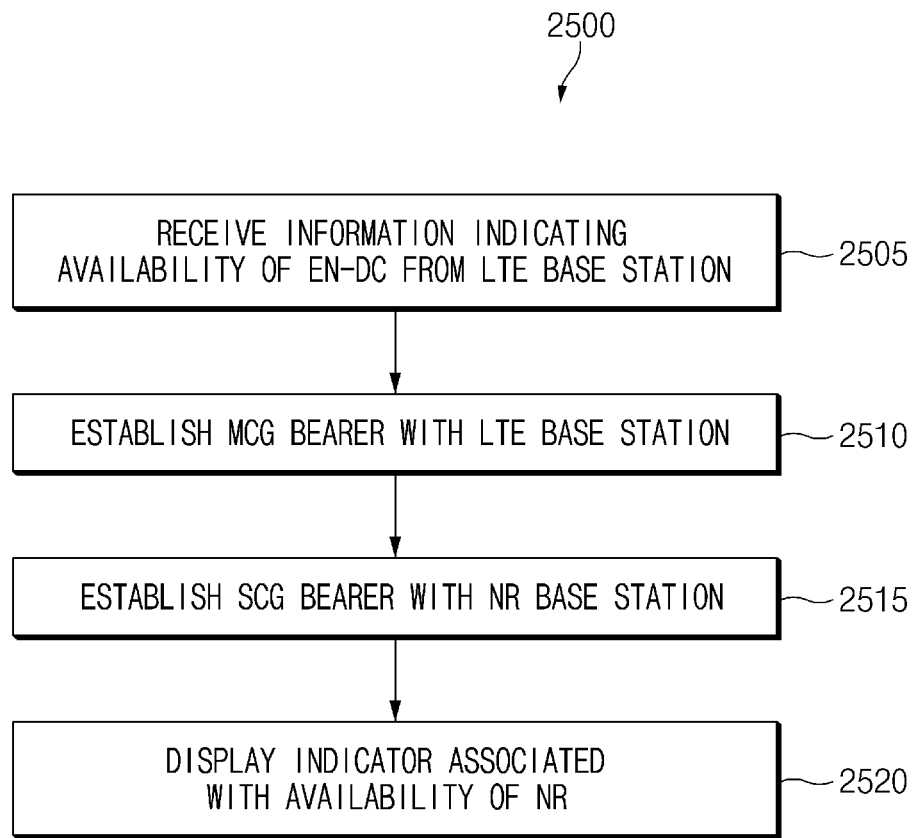
FIG. 25 illustrates an operation flowchart of an electronic device displaying an indicator based on establishment of a secondary cell group (SCG) bearer, according to an embodiment.
Figure 26:
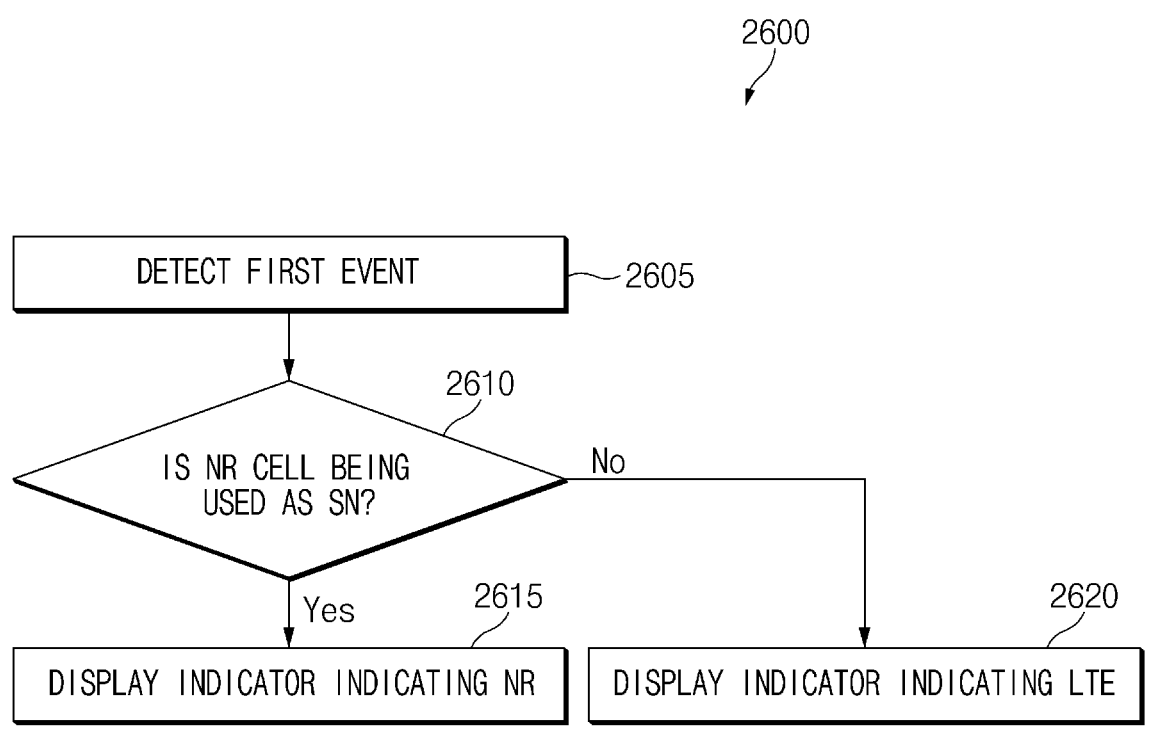
FIG. 26 illustrates an operation flowchart of an electronic device displaying an indicator based on the establishment of an SCG bearer, according to an embodiment.
Figure 27:
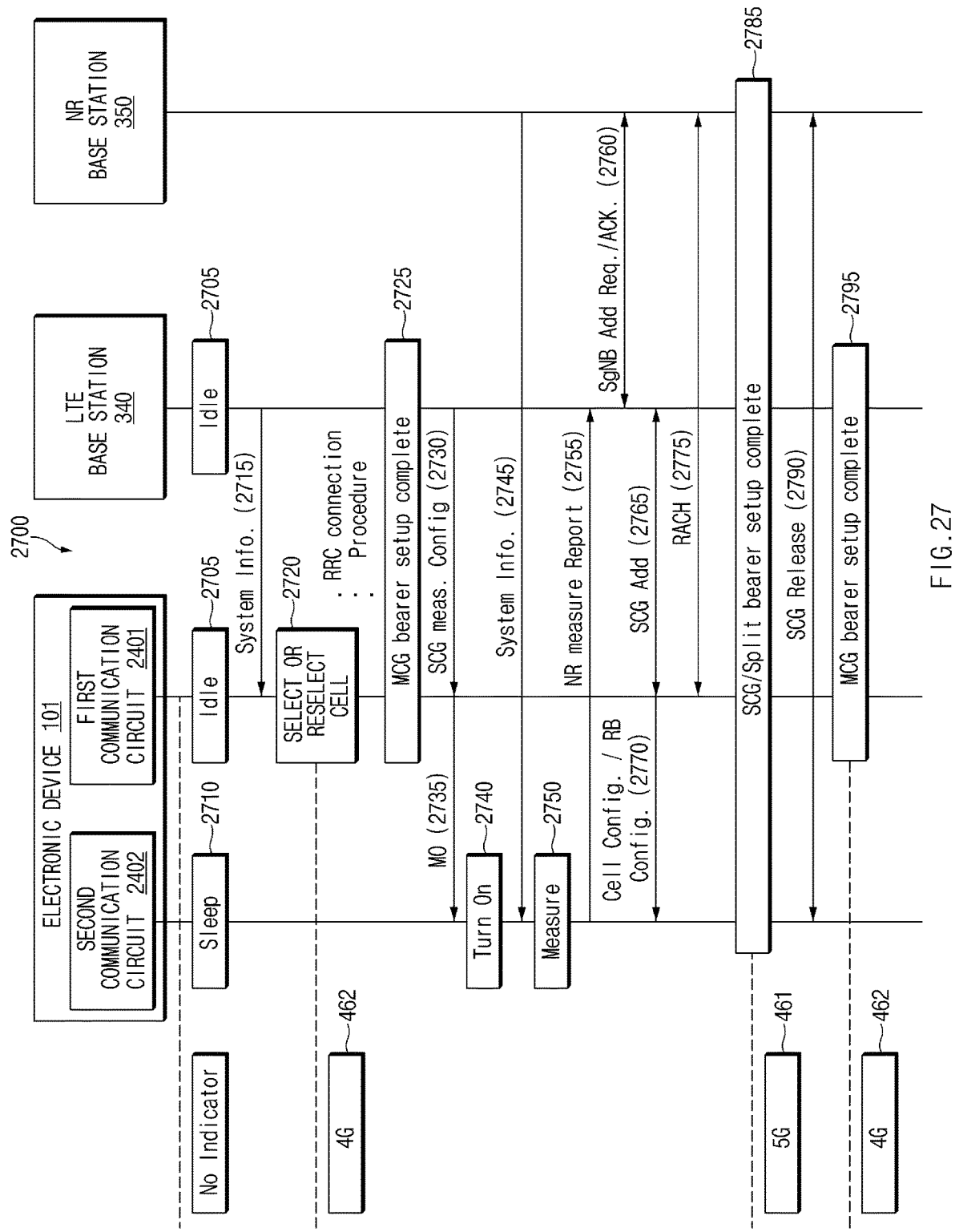
FIG. 27 illustrates a signal flowchart for displaying an indicator based on the establishment of an SCG bearer, according to an embodiment.

FIGS. 25 to 27 are directed to displaying an indicator based on the second condition described in FIG. 4A.

FIG. 25 illustrates an operation flowchart 2500 of the electronic device 101 for displaying an indicator based on the establishment of an SCG bearer, according to an embodiment.

Referring to FIG. 25, in step 2505, the electronic device 101 receives information indicating the availability of EN-DC, from the LTE base station 340.

In step 2510, the electronic device 101 establishes the MCG bearer with the LTE base station 340. For example, the electronic device 101 may establish the MCG bearer based on the RRC connection procedure illustrated in FIG. 24.

In step 2515, the electronic device 101 establishes the SCG bearer with the NR base station 350. For example, the electronic device 101 may measure the signal strength received from the NR base station 350 and may report the measurement result of the signal strength to the LTE base station 340. The LTE base station 340 may determine whether to add the SN, based on the reported measurement result and may transmit control information (e.g., configuration) for the establishment of the SCG bearer to the electronic device 101. The electronic device 101 may establish the SCG bearer with the NR base station 350, based on the received control information.

In step 2520, the electronic device 101 displays the first indicator 461 associated with the availability of the NR, in response to completing the establishment of the SCG bearer.

FIG. 26 illustrates an operation flowchart 2600 of the electronic device 101 displaying an indicator based on the establishment of an SCG bearer, according to an embodiment. The operations illustrated in FIG. 26 may be performed after step 2510 of FIG. 25.

Referring to FIG. 26, in step 2605, the electronic device 101 detects the first event associated with the SCG bearer.

For example, the first event may include the addition of the SCG bearer or the release of the SCG bearer.

In step 2610, the electronic device 101 identifies whether an NR cell is being used as SN, in response to the fact that the first event is detected.

When the NR cell is being used as SN ("YES"), because it means that the NR cell is added as SN by the first event in step 2615, the electronic device 101 may display the first indicator 461-1 indicating NR. The electronic device 101 may display the first indicator 461-1 differently based on the operating frequency of the NR cell being used as SN. For example, the electronic device 101 may display the first indicator 461-1 or the fifth indicator 461-3 of FIG. 4C based on whether the operating frequency of the NR cell being used as SN is not less than 6 GHz. The electronic device 101 may display the first indicator 461 differently based on whether to camp on the NR cell being used as SN or whether data is exchanged in the NR cell being used as SN. For example, the electronic device 101 may display the first indicator 461-1 or the third indicator 461-2 of FIG. 4B. The electronic device 101 may display a plurality of first indicators 461 based on the operating frequency of the NR cell being used as SN and whether the electronic device 101 exchanges data in the NR cell that is being used as SN. For example, the electronic device 101 may display the fifth indicator 461-3 together with the first indicator 461-1, or the fifth indicator 461-3 together with the third indicator 461-2.

When the NR cell is not being used as SN ("NO"), because it means that the SCG (or SCG bearer) is released by the first event, in step 2620, the electronic device 101 may display a second indicator 462 indicating LTE.

The electronic device 101 may display an indicator based on not only a second condition but also the second information associated with an indicator display policy. For example, the second table information that defines the condition for displaying an indicator based on the second condition in the second information may be expressed as Table 5 below.

TABLE 5

| | | | | Operator's policy | | | |
|---|---|---|---|---|---|---|---|
| | | | | Upper Layer Indication is used | | Upper Layer indication is not used | |
| | | | | Operation of terminal | | | |
| | | | | NR measurement in RRC_IDLE is not supported | NR measurement in RRC_IDLE is supported | NR measurement in RRC_IDLE is not supported | NR measurement in RRC_IDLE is supported |
| State 1 | | Restricted DCNR bit = 1 | | 4G | 4G | 4G | 4G |
| State 2 | Restricted | Upper Layer Indication = 0 | | 4G | 4G | — | — |
| State 3 | DNCR = 0 | Upper Layer Indication = 1 | RRC_IDLE | no detection of NR cell | 4G | 4G | 4G | 4G |
| State 4 | | | | detection of NR cell | — | 4G | — | 4G |
| State 5 | | | RRC_Connected | no detection of NR cell | 4G | 4G | 4G | 4G |
| State 6 | | | | detection of NR cell | No SN addition | 4G | 4G | 4G | 4G |
| State 7 | | | | | SN addition | 5G | 5G | 5G | 5G |

Referring to Table 5, because the electronic device 101 displays the first indicator 461 indicating 5G only when the NR cell is added as SN, when SN is not added (e.g., state 1 to state 6), the electronic device 101 may display the second indicator 462 indicating 4G.

When the restrict DCNR bit is "0", when the bit value of the upper layer indication is "1", and when the NR cell is added as SN (state 7) while the electronic device 101 and the LTE base station 340 is in the RRC_CONNECTED state, the electronic device 101 may display the first indicator 461-1 indicating 5G.

FIG. 27 illustrates a signal flowchart 2700 for displaying an indicator based on the establishment of an SCG bearer, according to an embodiment.

Referring to FIG. 27, the first communication circuit 2401 and the LTE base station 340 may be in an RRC_IDLE state 2705, and the second communication circuit 2402 may be in a sleep state 2710. Because the electronic device 101 is not connected to a base station or a cell is not detected, the electronic device 101 may not display an indicator.

In step 2715, the LTE base station 340 broadcasts system information. For example, the system information may be at least one of MIB, SIB1, or SIB2. For example, the system information may include upper layer indication. The upper layer indication may indicate that EN-DC is possible in the LTE base station 340.

In step 2720, the first communication circuit 2401 may select the LTE cell of the LTE base station 340 based on the received system information. Additionally, when the electronic device 101 is positioned in the cell of another LTE base station, the first communication circuit 2401 may reselect the LTE cell of the LTE base station 340. When the LTE cell of the LTE base station 340 is detected, the electronic device 101 may display the second indicator 462 indicating 4G. In addition, even though the LTE cell is detected, until the first communication circuit 2401 and the LTE base station 340 become in an RRC_CONNECTED state (e.g., step 2725), the electronic device 101 may not display the second indicator 462.

The first communication circuit 2401 may perform an RRC connection procedure with the LTE base station 340, in response to the LTE cell of the LTE base station 340 being detected. For example, the RRC connection procedure may be performed based on step 2425 to step 2450 illustrated in FIG. 24. When the RRC connection procedure is completed, the setup of MCG bearer between the first communication circuit 2401 and the LTE base station 340 may be completed (step 2725).

The first communication circuit 2401 may receive the restrict DCNR bit indicating "0" through the RRC connection procedure (e.g., step 2450 of FIG. 24). The electronic device 101 may determine that EN-DC is possible in the LTE base station 340, based on the upper layer indication and the restrict DCNR bit.

After the setup of the MCG bearer is completed, in step 2730, the LTE base station 340 transmits control information (e.g., SN meas. Config.) for SN measurement to the first communication circuit 2401. In step 2735, the first communication circuit 2401 transmits the MO for measuring an NR cell to the second communication circuit 2402, based on the received control information. When the MO is received, the second communication circuit 2402 operates in a turn-on state in step 2740 to measure the NR cell.

The second communication circuit 2402 operating in a turn-on state may perform a procedure (e.g., step 2745 to step 2775) for establishing (or setting up) the SCG bearer (or split bearer) with the NR base station 350, based on 3GPP standard specification.

After the establishment of the SCG bearer between the second communication circuit 2402 and the NR base station 350 is completed (SCG/Split bearer setup complete), the electronic device 101 may display the first indicator 461 indicating 5G.

After the establishment of the SCG bearer is completed, in step 2790, the second communication circuit 2402 may perform the release procedure of SCG (or SCG bearer) with the NR base station 350. When the establishment of the MCG bearer is completed (e.g., step 2795) after step 2790, the electronic device 101 displays the second indicator 462 indicating 4G.

FIGS. 28 to 31 describe embodiments of displaying an indicator based on the third condition described in FIG. 4A.

Figure 28:
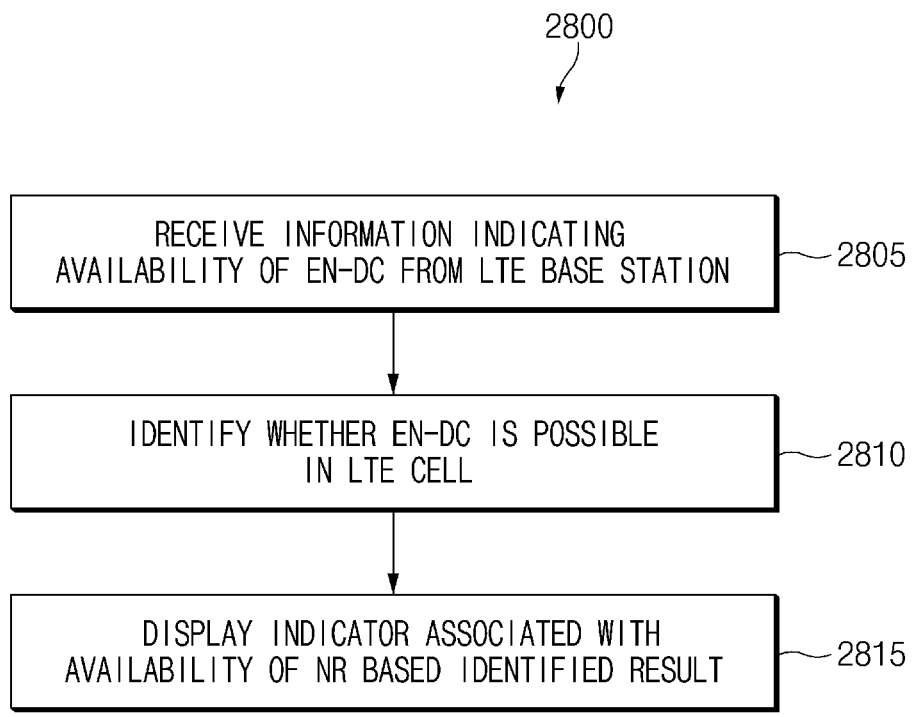
FIG. 28 illustrates an operation flowchart of an electronic device displaying an indicator based on availability of EN-DC, according to an embodiment.

FIG. 28 illustrates an operation flowchart 2800 of an electronic device displaying an indicator based on the availability of EN-DC, according to an embodiment.

Referring to FIG. 28, in step 2805, the electronic device 101 receives information indicating the availability of EN-DC, from the LTE base station 340. The information indicating the availability of EN-DC may be at least one or more of upper layer indication included in SIB2, restrict DCNR bit, the RAT type included in a UE capability inquiry message, or an MO.

In step 2810, the electronic device 101 identifies whether EN-DC is possible in an LTE cell. For example, the electronic device 101 may identify whether EN-DC is possible, based on at least one of the information received in step 2805.

In step 2815, the electronic device 101 displays an indicator (e.g., the second indicator 462 of FIG. 4A) associated with the availability of NR, based the identified result.

Figure 29:
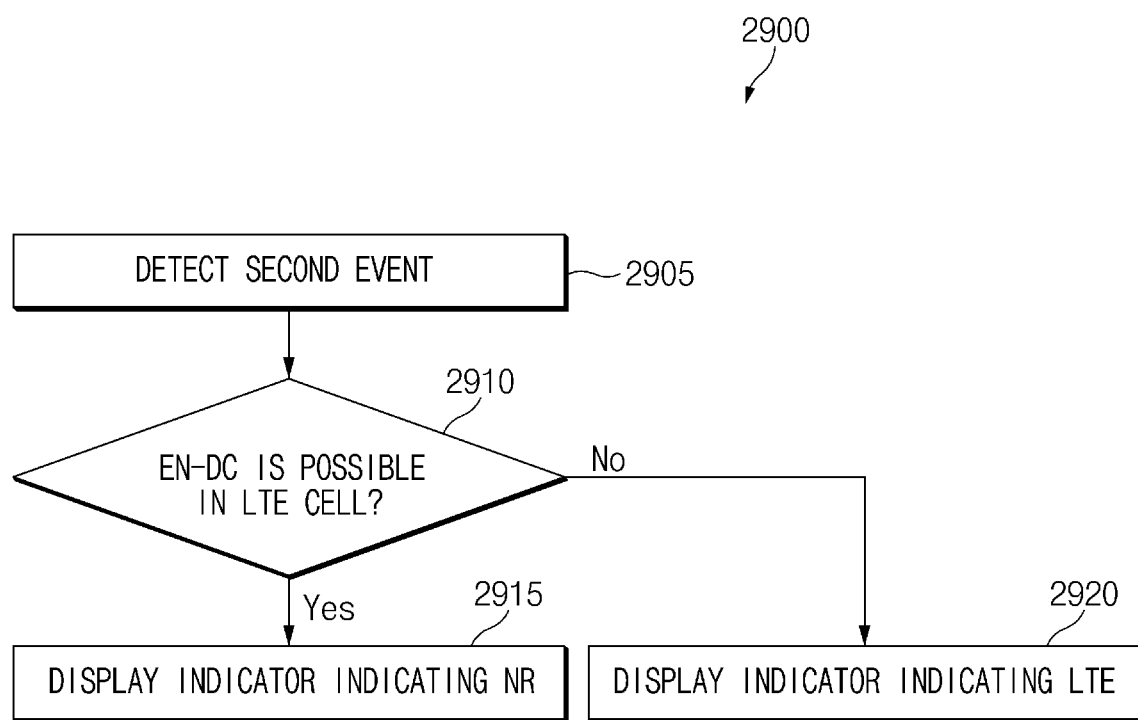
FIG. 29 illustrates an operation flowchart of an electronic device displaying an indicator based on availability of EN-DC, according to an embodiment.

FIG. 29 illustrates an operation flowchart 2900 of the electronic device 101 displaying an indicator based on the availability of EN-DC, according to an embodiment. The operations illustrated in the operation flowchart 2900 may be performed after step 2815 of FIG. 28.

Referring to FIG. 29, in step 2905, the electronic device 101 detects a second event associated with the mobility of the electronic device 101. For example, the second event may be at least one of handover, cell reselection, or tracking area update (TAU).

In step 2910, the electronic device 101 identifies whether EN-DC is possible in an LTE cell, in response to the second event being detected. The electronic device 101 may identify whether EN-DC is possible based on information previously obtained through step 2805. The electronic device 101 may update information previously obtained in step 2805 by receiving additional information indicating the availability of EN-DC from the LTE base station 340 after the second event is detected.

When it is identified that EN-DC is possible in the LTE cell ("YES"), in step 2915, the electronic device 101 may display a first indicator 461-1 indicating NR. The electronic device 101 may display the first indicator 461 differently based on the operating frequency in which EN-DC is possible. For example, the electronic device 101 may display the first indicator 461-1 or the fifth indicator 461-3 of FIG. 4C based on whether the operating frequency in which EN-DC is possible is not less than 6 GHz. Additionally, the electronic device 101 may display the first indicator 461 differently based on whether the electronic device 101 exchanges data in a cell in which EN-DC is possible. For example, the electronic device 101 may display the first indicator 461-1 or the third indicator 461-2 of FIG. 4B. In addition, the electronic device 101 may display a plurality of first indicators 461 based on the operating frequency of a cell in which EN-DC is possible and whether the electronic device 101 exchanges data in the cell in which EN-DC is possible. The electronic device 101 may display the fifth indicator 461-3 and the first indicator 461-1 together, or display the fifth indicator 461-3 and the third indicator 461-2 together.

When it is identified that EN-DC is not possible in the LTE cell ("NO"), in step 2920, the electronic device 101 displays a second indicator 462 indicating LTE.

The electronic device 101 may display an indicator based on not only the third condition but also the second information associated with an indicator display policy. For example, third table information that defines the condition for displaying an indicator based on the third condition in the second information may be expressed as Table 6 below

TABLE 6

| | | | | Operator's policy | | | |
|---|---|---|---|---|---|---|---|
| | | | | Upper Layer Indication is used | | Upper Layer Indication is not used | |
| | | | | Operation of terminal | | | |
| | | | | NR measurement in RRC_IDLE is not supported | NR measurement in RRC_IDLE is supported | NR measurement in RRC_IDLE is not supported | NR measurement in RRC_IDLE is supported |
| State 1 | | Restricted DCNR bit = 1 | | 4G | 4G | 4G | 4G |
| State 2 | Restricted | Upper Layer Indication = 0 | | 4G | 4G | — | — |
| State 3 | DCNR = 0 | Upper Layer Indication = 1 | RRC_IDLE | no detection of NR cell | 5G | 5G | 5G | 5G |
| State 4 | | | | detection of NR cell | — | 5G | — | 5G |
| State 5 | | | RRC_Connected | no detection of NR cell | 5G | 5G | 5G | 5G |
| State 6 | | | | detection of NR cell | No SN addition | 5G | 5G | 5G | 5G |
| State 7 | | | | | SN addition | 5G | 5G | 5G | 5G |

Referring to Table 6, when the value of the restrict DCNR bit is "0" and when the value indicated by the upper layer indication is "1" (e.g., state 3 to state 7), the electronic device 101 may display the first indicator 461 indicating 5G regardless of other information. Additionally or alternatively, when the value of the restrict DCNR bit is "1" (state 1), the electronic device 101 may display the second indicator 462 indicating 4G regardless of other information. Additionally or alternatively, when the upper layer indication is used by the operator's policy and when the value indicated by the upper layer indication is "0" (e.g., at least part of state 2), the electronic device 101 may display the second indicator 462 indicating 4G regardless of other information.

Figure 30:
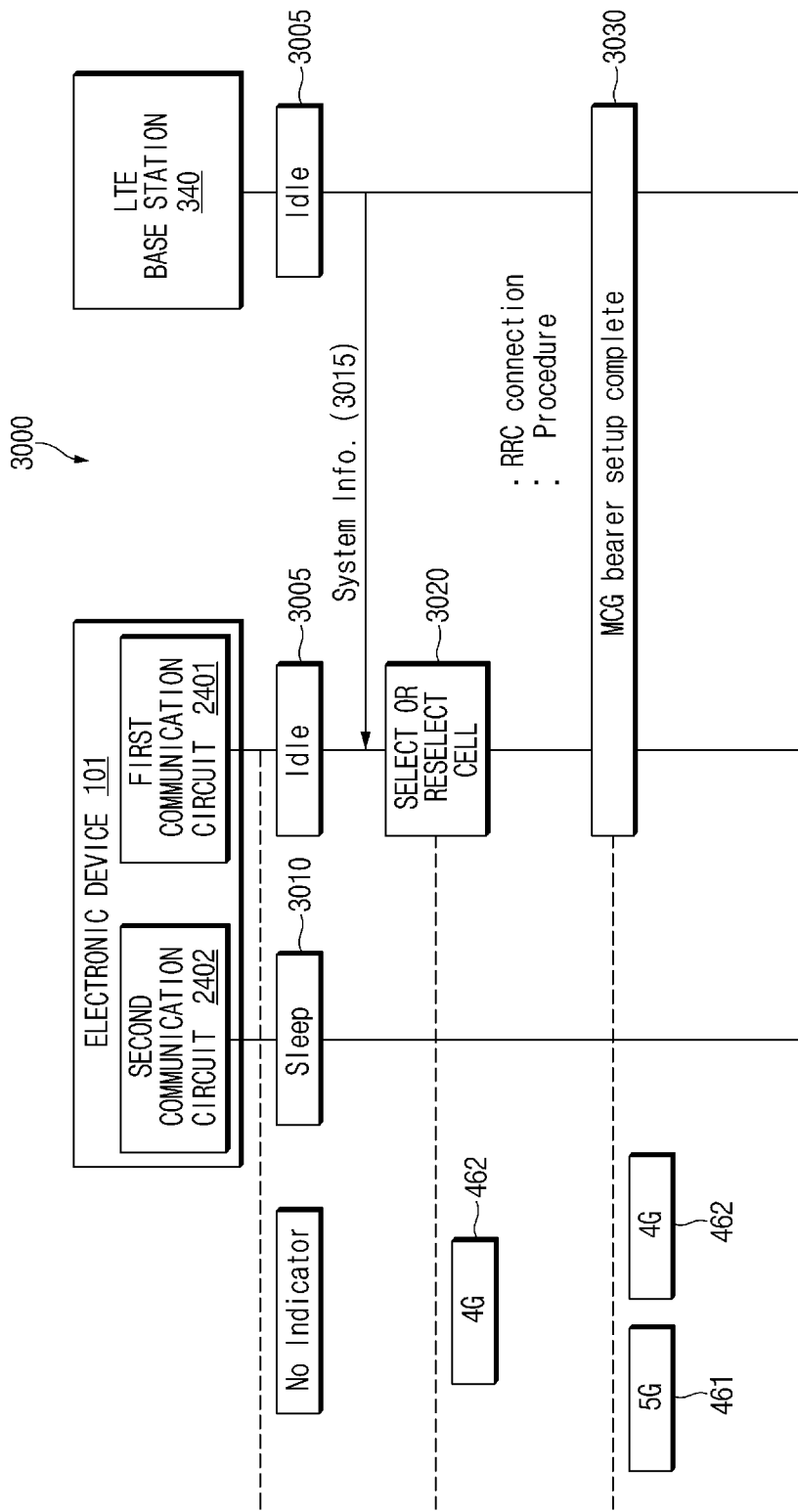
FIG. 30 illustrates a signal flowchart for displaying an indicator based on availability of EN-DC, according to an embodiment.

FIG. 30 illustrates a signal flowchart 3000 for displaying an indicator based on the availability of EN-DC, according to an embodiment.

Referring to FIG. 30, the first communication circuit 2401 and the LTE base station 340 may be in an RRC_IDLE state 1305, and the second communication circuit 2402 may be in a sleep state 1310. Because the electronic device 101 is not connected to a base station or a cell is not detected, the electronic device 101 may not display an indicator.

In step 3015, the LTE base station 340 broadcasts system information. For example, the system information may be at least one of MIB, SIB1, or SIB2. The system information may include upper layer indication. The upper layer indication may indicate whether EN-DC is possible in the LTE base station 340.

In step 3020, the first communication circuit 2401 selects the LTE cell of the LTE base station 340 based on the received system information. Additionally, when the electronic device 101 is positioned in the cell of another LTE base station, the first communication circuit 2401 may reselect the LTE cell of the LTE base station 340. When the LTE cell of the LTE base station 340 is detected, the electronic device 101 may display the second indicator 462 indicating 4G. In addition, even though the LTE cell is detected, until the first communication circuit 2401 and the LTE base station 340 become in an RRC_CONNECTED state (e.g., step 3030), the electronic device 101 may not display the second indicator 462.

The first communication circuit 2401 may perform an RRC connection procedure with the LTE base station 340 in response to the LTE cell of the LTE base station 340 being detected. For example, the RRC connection procedure may be performed based on step 2425 to step 2450 illustrated in FIG. 24. When the RRC connection procedure is completed, the setup of MCG bearer between the first communication circuit 2401 and the LTE base station 340 is completed in step 3030.

The electronic device 101 may display the first indicator 461-1 or the second indicator 462 based on at least a piece of information indicating the availability of EN-DC after the setup of the MCG bearer is completed. For example, when the bit value of the upper layer indication received through the upper layer operation 3015 is "1" and when the value of the restrict DCNR bit received (e.g., received through the attach accept message of FIG. 24) through an RRC connection procedure is "0", because it indicates that EN-DC is possible in the LTE cell, the electronic device 101 may display the first indicator 461. Additionally, when the value of the restrict DCNR bit is "1", the electronic device 101 may display the second indicator 462. In addition, when the upper layer indication is used by the operator's policy and when the value of the upper layer indication is "0", the electronic device 101 may display the second indicator 462.

Figure 31:
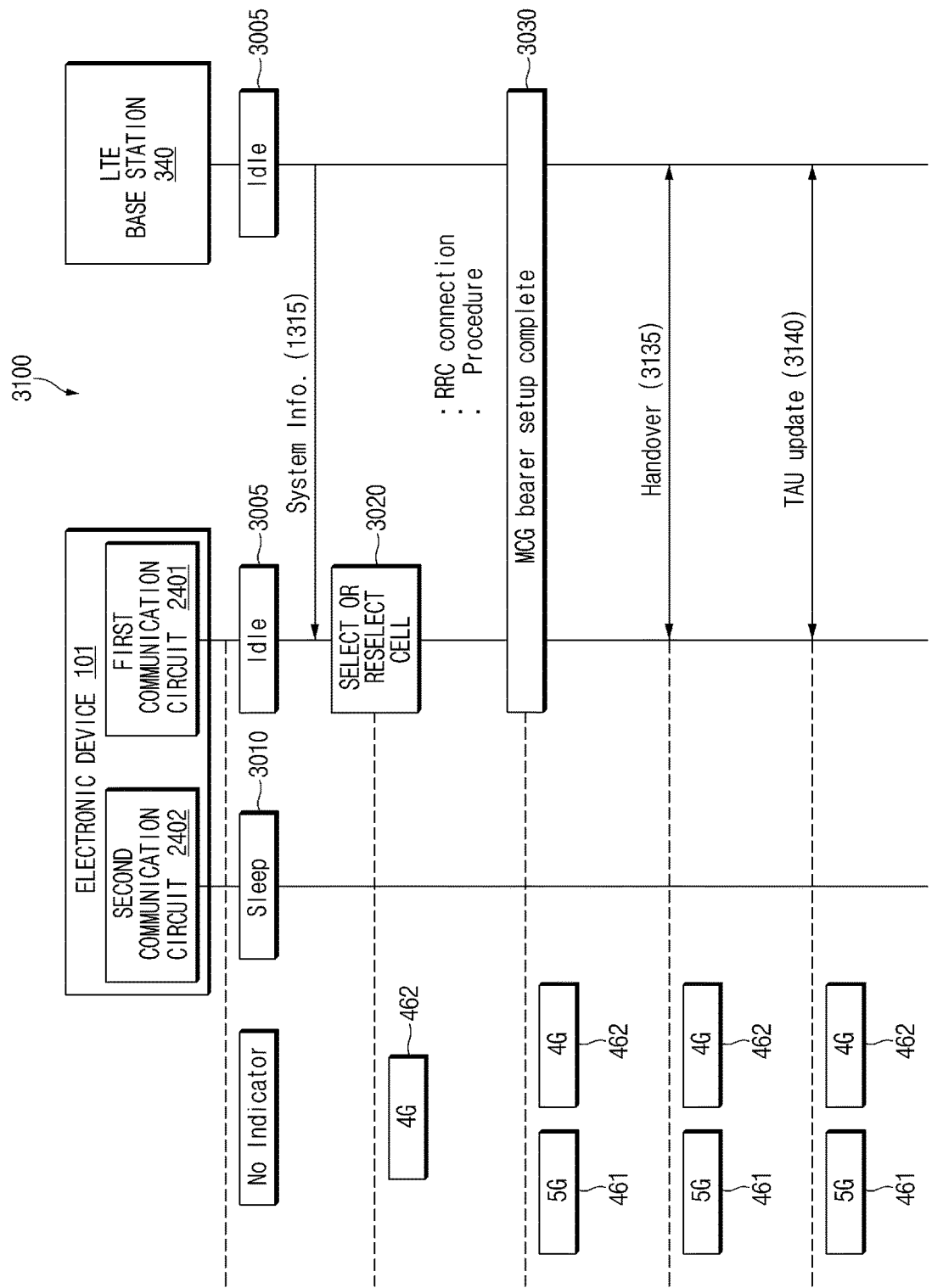
FIG. 31 illustrates a signal flowchart for displaying an indicator based on the availability of EN-DC, according to an embodiment.

FIG. 31 illustrates a signal flowchart 3100 for displaying an indicator based on the availability of EN-DC, according to an embodiment.

Referring to FIG. 31, after the establishment of the MCG bearer between the first communication circuit 2401 and the LTE base station 340 is completed in step 3030, the first communication circuit 2401 performs handover in step 3135 or performs a TAU update in step 3140. The execution order of step 3135 and step 3140 is not limited to that which is illustrated in FIG. 31, and the first communication circuit 2401 may skip one of step 3135 and step 3140.

The electronic device 101 updates information of the availability of EN-DC in step 3135 or step 3140. For example, the first communication circuit 2401 may receive upper layer indication from the LTE base station 340 through step 3135. In addition, the first communication circuit 2401 receives the restrict DCNR bit from the LTE base station 340 in step 3140. The electronic device 101 may display the first indicator 461-1 or the second indicator 462 based on the updated information. For example, when the bit value of the updated upper layer indication is "1" and when the value of the updated restrict DCNR bit is "0", the electronic device 101 may display the first indicator 461-1. Additionally, when the value of the updated restrict DCNR bit is "1", the electronic device 101 may display the second indicator 462. Further, when the upper layer indication is used by the operator's policy and when the value of the updated upper layer indication is "0", the electronic device 101 may display the second indicator 462.

Figure 32A:
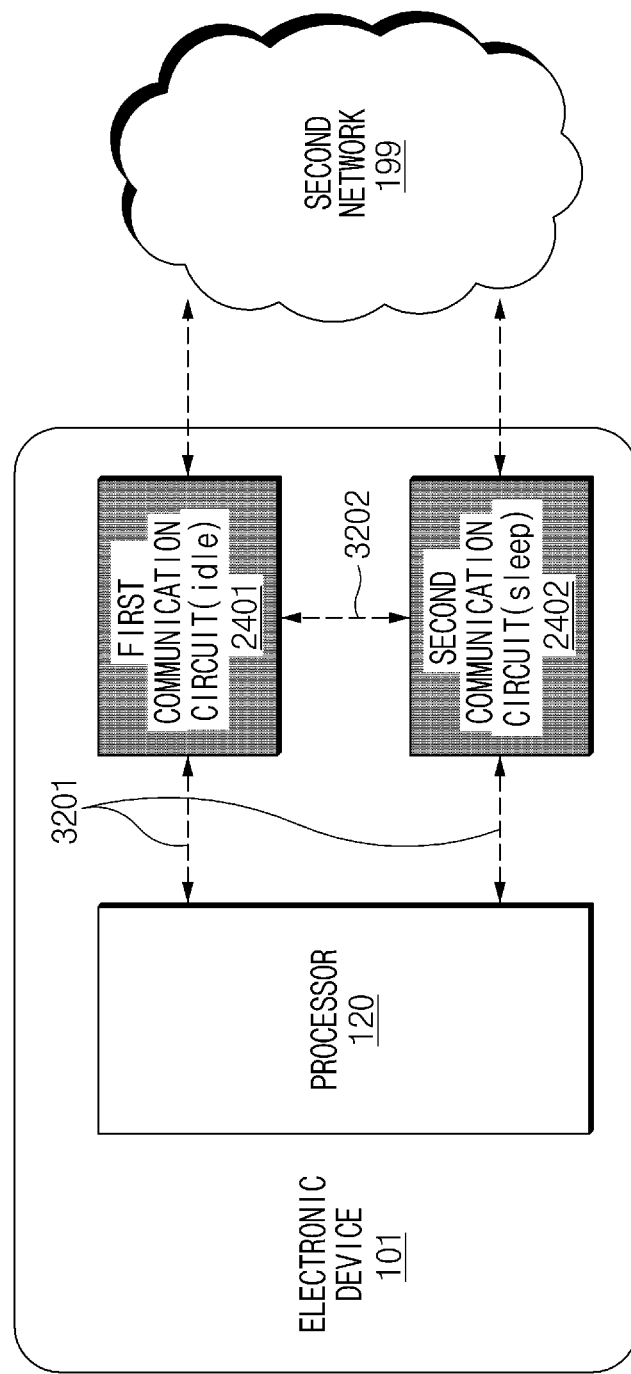
FIG. 32A illustrates an example of an interface between components of an electronic device, according to an embodiment.
Figure 32B:
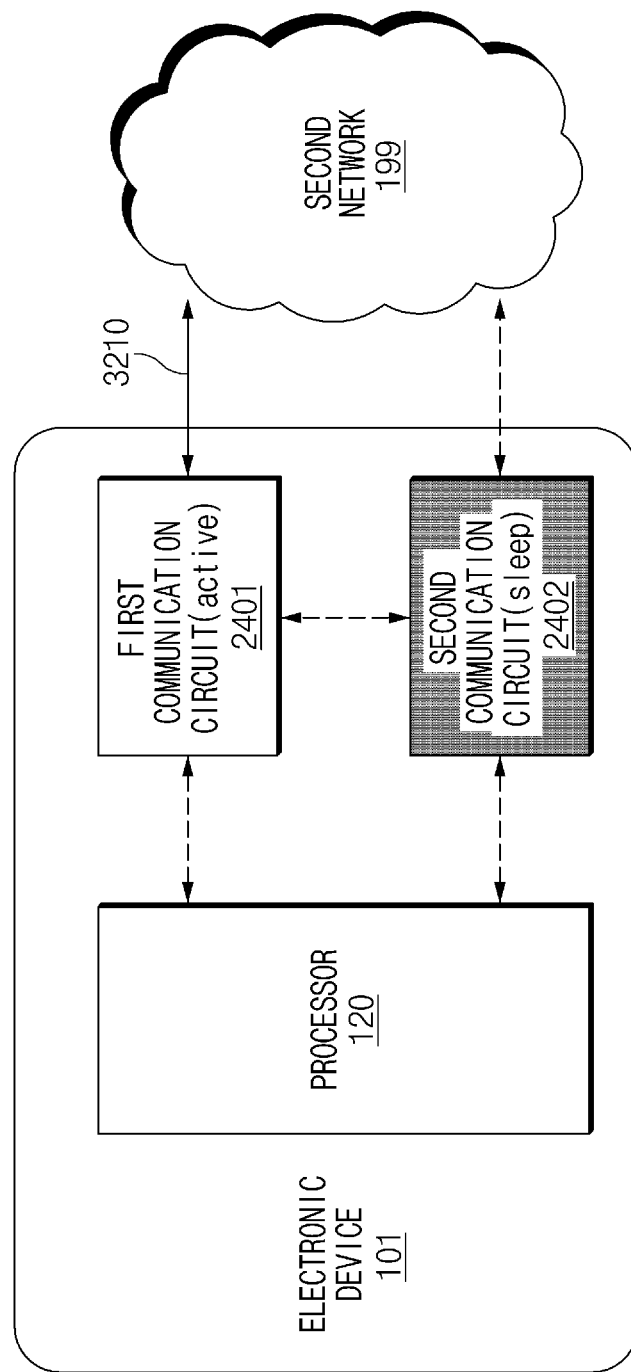
FIG. 32B illustrates an example of an interface between components of an electronic device, according to an embodiment.
Figure 32C:
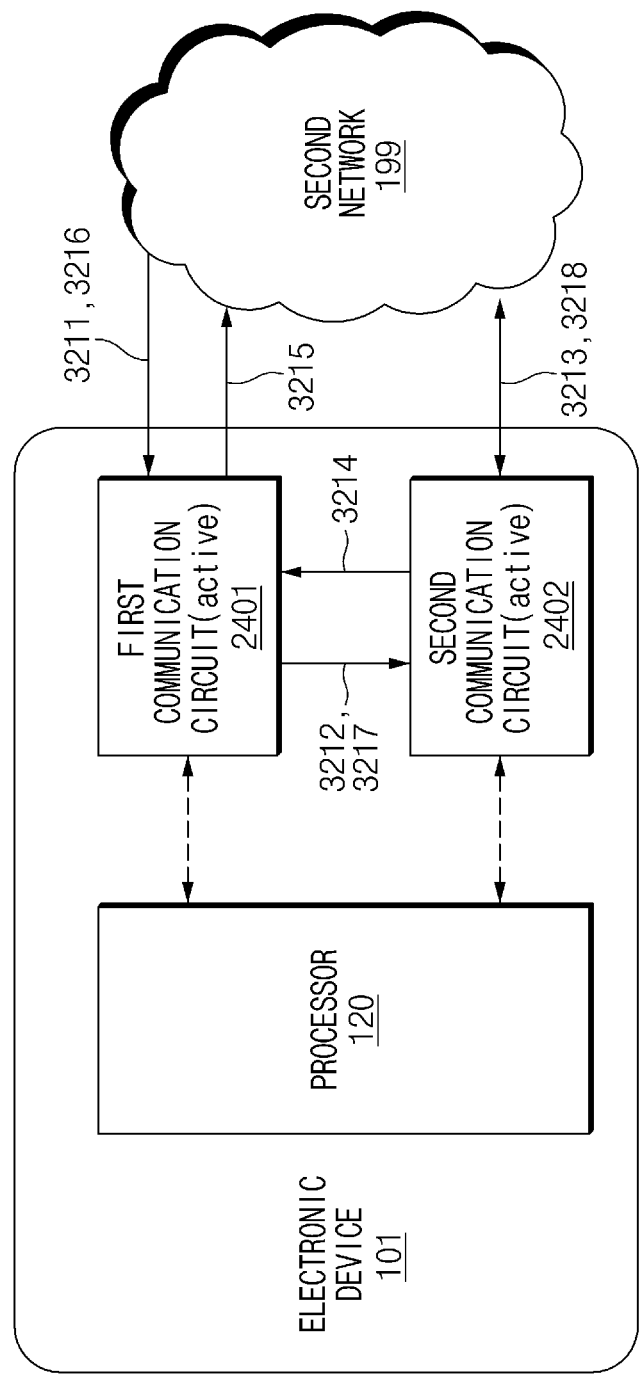
FIG. 32C illustrates an example of an interface between components of an electronic device, according to an embodiment.

FIGS. 32A to 32C illustrate an example of an interface between components of the electronic device 101. In FIGS. 32A to 32C, an arrow indicating a dotted line among the arrows indicating an interface may mean a state where the interaction among components is possible, and an arrow indicating a solid line may mean a state where the interaction among components is being performed. The operations of the first communication circuit 2401 and the second communication circuit 2402 described below may refer to the operations illustrated in the signal flowchart illustrated in FIG. 27. However, a similar principle may be applied to the signal flowcharts of FIG. 24 or FIG. 30.

Referring to FIG. 32A, the processor 120 may interact with the first communication circuit 2401 or the second communication circuit 2402 through an application processor to communication processor (AP2CP) interface 3201. For example, the AP2CP interface 3201 may include at least one of a shared memory scheme, universal asynchronous receiver/transmitter (UART) or peripheral component inter-connect-express (PCIe).

The first communication circuit 2401 and the second communication circuit 2402 may interact through the communication processor to communication processor (CP2CP) interface 3202. For example, the CP2CP interface 3202 may include at least one of a shared memory scheme, PCIe, or UART.

The first communication circuit 2401 or the second communication circuit 2402 may interact with the second network 199 (e.g., the LTE base station 340 or the NR base station 350 of FIG. 3) via a wireless interface (or wireless channel).

When the first communication circuit 2401 and the second communication circuit 2402 do not interact with the second network 199, the first communication circuit 2401 and the second communication circuit 2402 may be in an idle state (or a sleep state). For example, immediately after the electronic device 101 is booted, the first communication circuit 2401 and the second communication circuit 2402 may be in the idle state (or sleep state).

FIG. 32B illustrates a state where the first communication circuit 2401 is active. In the activated state, the first communication circuit 2401 performs wireless communication with the second network 199 based on the 4G protocol in step 3210. For example, step 3210 may be at least part of the synchronization between the electronic device 101 and the LTE base station 340, an attach procedure, or the RRC connection procedure illustrated in FIG. 24. While step 3210 is performed, the second communication circuit 2402 may maintain the sleep state to reduce current consumption.

FIG. 32C illustrates a state where the second communication circuit 2402 and the first communication circuit 2401 is active. The operations described in FIG. 32C may correspond to operations that occur after the operations in FIG. 32B.

For example, after the RRC connection procedure between the electronic device 101 and the LTE base station 340 is completed, in step 3211, the first communication circuit 2401 receives control information (e.g., SN meas. Config.) for SN measurement from the second network 199 (e.g., the LTE base station 340). In step 3212, the first communication circuit 2401 transmits at least part of control information for SN measurement including MO through the CP2CP interface 3202 such that the second communication circuit 2402 is capable of performing SN measurement (or NR cell measurement). The MO may be based on the control information received by the first communication circuit 2401 from the second network 199. The second communication circuit 2402 receiving the at least part of control information for SN measurement including the MO may be in an active state (or turn-on state). In step 3213, the second communication circuit 2402 measures the NR cell of the NR base station 350 based on the MO. In step 3214, the second communication circuit 2402 reports at least part of the NR cell measurement result to the first communication circuit 2401 via the CP2CP interface 3202. In step 3215, the first communication circuit 2401 reports the NR cell measurement result to the second network 199 via the wireless channel.

In step 3216, the first communication circuit 2401 receives a message for instructing the addition of the SCG bearer, from the second network 199 via the wireless channel. In step 3217, the first communication circuit 2401 transmits at least part (e.g., Cell config. and/or RB Config.) of control information required to add the SCG bearer, to the second communication circuit 2402 via the CP2CP interface 3202 in response to receiving the message. In step 3218, the second communication circuit 2402 establishes the SCG bearer with the second network 199 (e.g., the NR base station 350) based on the received control information.

As described above, two chips (e.g., the first communication circuit 2401 and the second communication circuit 2402) included in the electronic device 101 may separately perform wireless communication with the second network 199 and may effectively manage power consumption by independently maintaining the active state.

Figure 33:
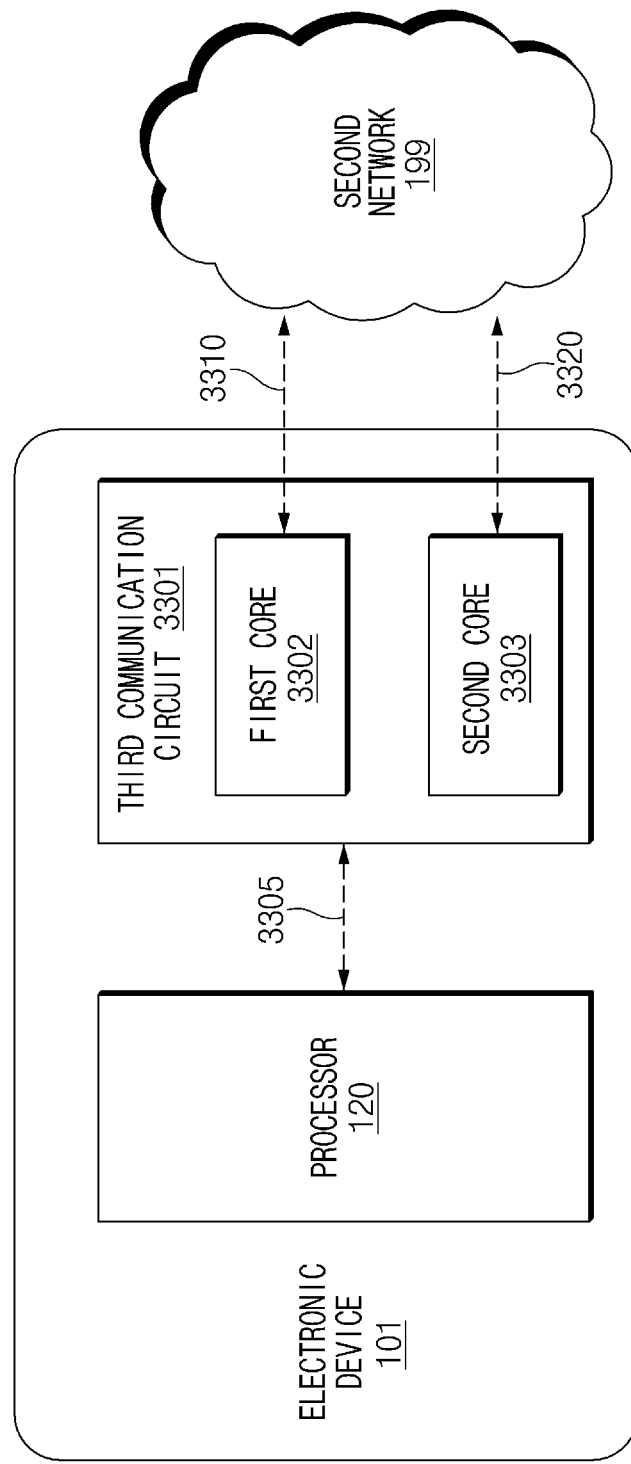
FIG. 33 illustrates an example of an interface between components of an electronic device, according to an embodiment.

FIG. 33 illustrates an example of an interface between components of the electronic device 101.

Referring to FIG. 33, the first communication circuit 2401 and the second communication circuit 2402 may be integrated into a single chip (e.g., a third communication circuit 3301). In this case, the third communication circuit 3301 may include a first core 3302 performing a function that is the same as or similar to a function of the first communication circuit 2401 and a second core 3303 performing a function that is the same as or similar to a function of the second communication circuit 2402. For example, the first core 3302 and the second core 3303 may be a software (or hardware) unit that processes signals of different frequency bands or different protocols.

The third communication circuit 3301 may perform the operations illustrated in FIGS. 32A to 32C using the first core 3302 and the second core 3303. For example, the third communication circuit 3301 may transmit or receive data to or from the LTE base station 340 on the wireless channel using the first core 3302 and may transmit or receive data to or from the NR base station 350 on the wireless channel using the second core 3303.

The third communication circuit 3301 may interact with the processor 120 via the AP2CP interface 3305. For example, the AP2CP interface 3305 may include at least one of a shared memory scheme, PCIe, or UART.

As described above, an electronic device may include a communication module or a communication circuit, a display, and a processor operatively connected to the communication module and the display. The processor may be configured to receive network capability information from a first base station through the communication module, to detect an event associated with the display of a network indicator indicating a type of network to which the electronic device is connected, and to display the network indicator through the display based at least on the network capability information.

The 5G network type may include a case in which the base station supports the 4G network and a core network to which the base station is connected supports the 5G network, or a case in which the base station supports the 4G network, the core network supports the 4G network, and the electronic device is connected to a second base station supporting the 5G network through DC.

The processor may be configured to display the network indicator in a status bar positioned at the upper end of the display.

The processor may be configured to detect an event associated with the display of the network indicator, through at least one of detecting, by the electronic device, a cell of the base station through a cell searching procedure, camping, by the electronic device, on the cell of the base station, performing, by the electronic device, data transmission with the base station, positioning the electronic device within the cell coverage of the second base station, or performing, by the electronic device, data transmission with the second base station.

The network capability information may include at least one of information indicating at least one of the network type of the base station or the network type of the core network, information indicating whether the access to the core network of the base station is barred, information indicating whether the second base station is present among base stations adjacent to the base station, or identification information of the second base station.

The processor may be configured to receive the network capability information through system information broadcast from the base station.

The processor may be configured to receive network slice information indicating at least one network slice instance from the base station, and to display a service indicator indicating eMBB, URLLC, or mMTC through the display, based at least on the network slice information and the network service type capable of being supported by the electronic device.

The processor may be configured to detect that a PDU session between the processor and the core network is released and to display whether a network service is available, through the display based at least on the SSC mode of the released PDU session.

As described above, the method of an electronic device supporting the 4G network and the 5G network may include receiving network capability information from a first base station, detecting an event associated with the display of a network indicator indicating a type of network to which the electronic device is connected, and displaying the network indicator through the display based at least on the network capability information.

The 5G network in the network type may include a case where the base station supports the 4G network and a core network to which the base station is connected supports the 5G network, or a case where the base station supports the 4G network, the core network supports the 4G network, and the electronic device is connected to a second base station supporting the 5G network through DC.

The detecting of the event associated with the display of the network indicator may include at least one of detecting, by the electronic device, a cell of the base station through a cell searching procedure, camping, by the electronic device, on the cell of the base station, performing, by the electronic device, data transmission with the base station, positioning the electronic device within the cell coverage of the second base station, or performing, by the electronic device, data transmission with the second base station.

The network capability information may include at least one of information indicating at least one of the network type of the base station or the network type of the core network, information indicating whether the access to the core network of the base station is barred, information indicating whether the second base station is present among base stations adjacent to the base station, or identification information of the second base station.

The receiving of the network capability information may include receiving the network capability information through system information broadcast from the base station.

The method may further include receiving network slice information indicating at least one network slice instance from the base station, and displaying a service indicator indicating eMBB, URLLC, or mMTC based at least on the network slice information and the network service type capable of being supported by the electronic device.

The method may further include detecting that the PDU session between the electronic device and the core network is released, and displaying whether the network service is available, based at least on the SSC mode of the released PDU session.

As described above, an electronic device may include a touch screen display, at least one communication circuit configured to provide first wireless communication with a first base station using a first frequency range and to provide second wireless communication with a second base station using a second frequency range different from the first frequency range, a processor operatively connected to the display and the at least one communication circuit, and at least one memory operatively connected to the processor. The memory stores instructions that, when executed, cause the processor to receive information, from the first base station, indicating that the first base station and the second base station communicate with each other by using the communication circuit, select the first base station by using the communication circuit, and display a graphic user interface associated with the second wireless communication on the display when selecting the first base station, after selecting the first base station, when exchanging data and/or a control message with the first base station by using the first wireless communication, or when exchanging the data and/or the control message with the second base station by using the second wireless communication after selecting the first base station.

The first wireless communication may include LTE of the 4G defined 3GPP, the second wireless communication may include NR communication of the 5G defined by 3GPP.

The graphic user interface may at least partly include an image indicating at least one of the 5G or the NR.

The information indicating that the first base station and the second base station communicate with each other may be included in at least one SIB received from the first base station.

The first base station and the second base station may be connected to the electronic device through DC.

As described above, according to an embodiment, an electronic device may include a display, at least one communication circuit providing LTE defined in 3GPP and NR defined in 3GPP, at least one processor operatively connected to the display and the communication circuit, and a memory operatively connected to the processor and storing first information associated with NR cell searching. The memory may store instructions that, when executed, cause the processor to receive a SIB including information indicating that E-UTRAN EN-DC is possible from the LTE base station by using the communication circuit, to perform the NR cell searching based at least partly on the first information by using the communication circuit when the electronic device is in an RRC_IDLE state with the LTE base station to display an indicator associated with availability of the NR on a partial region of the display based at least partly on the result of the NR cell searching.

The first information may include at least one of an identifier of an LTE cell, an identifier of at least one NR cell, which has been used as the EN-DC in the LTE cell, communication operator information associated with the at least one NR cell, frequency information of the at least one NR cell, band information of the at least one NR cell, information for signal measurement of the at least one NR cell, signal measurement result of the at least one NR cell, or channel information about the at least one NR cell.

The instructions may cause the processor to identify whether there is a history in which an NR cell is added in the LTE cell, based on the first information, to display the indicator associated with the availability of the NR through the display, and to display an indicator associated with the availability of the LTE through the display when the history in which the NR cell is added in the LTE cell is not present.

The memory may further store second information associated with a display policy of the indicator, and the instructions may cause the processor to perform the NR cell searching based on the second information.

The instructions may cause the processor to display the indicator through the display when at least one NR cell is detected based on the NR cell searching.

The instructions may cause the processor to detect the at least one NR cell and to display the indicator when the electronic device is in an RRC_CONNECTED state with the LTE base station.

The instructions may cause the processor to control the color or the transparency of the indicator, in response to camping on the detected NR cell or transmitting or receiving data in the detected NR cell.

The instructions may cause the processor to control the indicator to further indicate the operating frequency, based on an operating frequency of at least one of the LTE base station or the detected NR cell.

The instructions may cause the processor to detect the at least one NR cell and to display the indicator when the electronic device is in the RRC_IDLE state with the LTE base station.

The instructions may cause the processor to detect the at least one NR cell and to display the indicator after receiving an attach accept message from the LTE base station.

As described above, a method of an electronic device may include receiving an SIB including information indicating that EN-DC is possible from an LTE base station, when the electronic device is in an RRC_IDLE state with the LTE base station, performing NR cell searching based at least partly on first information associated with the NR cell searching, which is pre-stored in the electronic device; and displaying an indicator associated with availability of NR, based at least partly on the result of the NR cell searching.

The first information may include at least one of an identifier of an LTE cell, an identifier of at least one NR cell, which has been used as the EN-DC in the LTE cell, communication operator information associated with the at least one NR cell, frequency information of the at least one NR cell, band information of the at least one NR cell, information for signal measurement of the at least one NR cell, signal measurement result of the at least one NR cell, or channel information about the at least one NR cell.

The method may further include identifying whether there is a history that an NR cell is added in the LTE cell based on the first information, and when there is the history that the NR cell is added in the LTE cell, displaying the indicator, or when there is no history that the NR cell is added in the LTE cell, performing the NR cell searching.

Performing of the NR cell searching may further include performing the NR cell searching based on second information associated with a display policy of the indicator.

Displaying of the indicator may further include displaying the indicator when at least one NR cell is detected based on the NR cell searching.

The method may further include controlling the color or the transparency of the indicator, in response to camping on the detected NR cell or transmitting or receiving data in the detected NR cell.

The method may further include controlling the indicator to further indicate the operating frequency, based on an operating frequency of at least one of the LTE base station or the detected NR cell.

Displaying of the indicator may further include displaying the indicator when the at least one NR cell is detected and the electronic device is in an RRC_CONNECTED state with the LTE base station.

Displaying of the indicator may further include receiving an attach accept message from the LTE base station in response to the fact that the at least one NR cell is detected, and displaying the indicator in response to receiving the attach accept message.

As described above, an electronic device may include a display, at least one communication circuit providing LTE defined in 3GPP and NR defined in 3GPP, at least one processor operatively connected to the display and the communication circuit, and a memory operatively connected to the processor. The memory may store instructions that, when executed, cause the processor to receive an SIB including first information indicating that EN-DC is possible, from an LTE base station by using the communication circuit, to perform an RRC connection procedure with the LTE base station based on at least part of the SIB by using the communication circuit when the electronic device is in an RRC_IDLE state with the LTE base station, to receive an attach accept message including second information indicating that the EN-DC is possible from the LTE base station while performing the RRC connection procedure, and to display a first indicator associated with the availability of NR on a partial region of the display based on the first information and the second information in response to the attach accept message being received.

The first information may include an upper layer indication defined in 3GPP, and the second information may include a restrict DCNR bit defined in 3GPP.

The instructions may cause the processor to display the first indicator when the first information and the second information indicate that the EN-DC is possible, and to display the second indicator associated with the availability of LTE on the partial region of the display when the first information and the second information indicate that the EN-DC is not possible.

The instructions may cause the processor to perform a handover with the LTE base station by using the communication circuit, to receive the updated first information from the LTE base station while performing the handover, and to display the first indicator based on the updated first information and the second information.

The instructions may cause the processor to perform a TAU with the LTE base station by using the communication circuit, to receive the updated second information from the LTE base station while performing the TAU, and to display the first indicator based on the updated second information and the first information.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The electronic device may provide an environment in which a user employs wireless communication by considering the transmission speed and the data charges based on the type of network, by displaying the type of network to which the electronic device is connected.

The electronic device may provide allow the user to determine or identify the network service type by displaying the type of network service provided from the 5G network.

The electronic device may display an indicator that matches the intent of not only the user, but also the operator who manages the network.

Additionally, a variety of effects directly or indirectly understood through this disclosure may be provided.

While the present disclosure has been particularly shown and described with reference to various certain embodiments thereof, it will be understood by those of ordinary skilled in the art that various changes in form and details may be made therein without departing from the spirit and scope of the present disclosure as defined by the appended claims and their equivalents.

What is claimed is:

1. A portable communication device comprising:
    a touch screen display;
    first communication circuitry configured to support a long-term evolution (LTE) communication;
    second communication circuitry configured to support a new radio (NR) communication;
    a memory storing operator information indicating an operator of a mobile network and operator policy information including condition information for displaying a network indicator; and
    at least one processor configured to:
        receive, from an LTE base station corresponding to the mobile network via the first communication circuitry, a system information block (SIB) and a non-access stratum (NAS) message,
        select or reselect an LTE cell,
        perform a radio resource control (RRC) connection procedure, the RRC connection procedure comprising receiving a restrict dual connectivity NR (DCNR) bit included in an Attach Accept from the LTE base station, and a value of the restricted DCNR indicating availability of the LTE base station for dual connectivity of the LTE communication and the NR communication,
        based on the operator information, the operator policy information, and a value of the restricted DCNR indicating that the LTE base station is not available for the dual connectivity, display, among a first, a second, and a third indicators, the first indicator indicating connection via the LTE communication,
        based on the operator information, the operator policy information, and the value of the restrict DCNR bit indicating that the LTE base station is available for the dual connectivity, display, among the first, the second and the third indicators, the second indicator indicating connection via the LTE base station available for the dual connectivity, and
        based on establishing, while displaying the second indicator, a secondary cell group (SCG) bearer connection with a NR base station by using the second communication circuit, display the third indicator indicating connection via the NR communication.

2. The portable communication device of claim 1, wherein the at least one processor is further configured to:
    based on establishing the SCG bearer connection, display the third indicator to replace the second indicator which was previously displayed.

3. The portable communication device of claim 1, wherein the at least one processor is further configured to:
    based on establishing the SCG bearer connection, display the third indicator along with the second indicator.

4. The portable communication device of claim 1, wherein the memory comprises a subscriber identification module.

5. The portable communication device of claim 1,
    wherein the first indicator corresponds to LTE, and
    wherein the second indicator corresponds to 5G.

6. The portable communication device of claim 1, wherein the at least one processor is further configured to:
    after receiving the SIB and the NAS message, establish a master cell group (MCG) bearer connection with the LTE base station.

7. The portable communication device of claim 1, wherein the at least one processor is further configured to:
    activate the first communication circuitry before receiving the SIB and the NAS message; and
    activate the second communication circuitry between establishing the MCG bearer connection and establishing the SCG bearer connection.

8. The portable communication device of claim 1, wherein the at least one processor is further configured to:
    receive a public land mobile network (PLMN) identifier from the LTE base station; and
    store the PLMN identifier in the memory as at least part of the operator information.

9. The portable communication device of claim 1, wherein the SIB includes an upper layer indicator, the upper layer indicator indicating whether the mobile network to which the portable communication device is connected is capable of supporting evolved terrestrial radio access network (E-UTRAN) NR-dual connectivity (EN-DC).

10. The portable communication device of claim 1, wherein the first communication circuitry and the second communication circuitry are integrated into one chip.

11. A method for displaying a network indicator by a portable communication device comprising:
    receiving, from a Long-Term Evolution (LTE) base station of a mobile network, a system information block (SIB) and a non-access stratum (NAS) message;
    selecting or reselecting an LTE cell of the LTE base station;
    performing a radio resource control (RRC) connection procedure;
    receiving an Attach Accept from the LTE base station as a part of the RRC connection procedure, the Attach Accept a restrict dual connectivity new radio (DCNR) bit, and a value of the restricted DCNR indicating availability of the LTE base station for dual connectivity of LTE communication and NR communication;
    based on operator information of the mobile network, condition information of the mobile network for displaying the network indicator, and a value of the restricted DCNR indicating that the LTE base station is not available for the dual connectivity, displaying, among a first, a second, and a third indicators, the first indicator indicating connection via the LTE communication;
    based on the operator information, the condition information, and the value of the restrict DCNR bit indicating that the LTE base station is available for the dual connectivity, displaying, among the first, the second and the third indicators, the second indicator indicating connection via the LTE base station available for the dual connectivity; and
    based on establishing, while displaying the second indicator, a secondary cell group (SCG) bearer connection with a NR base station, displaying the third indicator indicating connection via the NR communication.

12. The method of claim 11, wherein the displaying the third indicator comprises displaying the third indicator to replace the second indicator which was previously displayed.

13. The method of claim 11, wherein the displaying the third indicator comprises displaying the third indicator along with the second indicator.

14. The method of claim 11, wherein the condition information is stored on a subscriber identification module of the portable communication device.

15. The method of claim 11,
    wherein the first indicator corresponds to LTE, and
    wherein the second indicator corresponds to 5G.

16. The method of claim 11, further comprising:
  after receiving the SIB and the NAS message, establishing a master cell group (MCG) bearer connection with the LTE base station.

17. The method of claim 11, further comprising:
  receiving a public land mobile network (PLMN) identifier from the LTE base station; and
  storing the PLMN identifier as at least part of the operator information.

18. The method of claim 11, wherein the SIB includes an upper layer indicator, the upper layer indicator indicating whether the mobile network to which the portable communication device is connected is capable of supporting evolved terrestrial radio access network (E-UTRAN) NR-dual connectivity (EN-DC).

* * * * *